(12) United States Patent
Omura et al.

(10) Patent No.: US 12,297,373 B2
(45) Date of Patent: May 13, 2025

(54) COATING COMPOSITION, COATED ARTICLE AND METHOD FOR FORMING MULTILAYER COATING FILM

(71) Applicant: KANSAI PAINT CO., LTD., Amagasaki (JP)

(72) Inventors: Masahiro Omura, Aichi (JP); Miho Komatsu, Aichi (JP)

(73) Assignee: KANSAI PAINT CO., LTD., Amagasaki (JP)

( * ) Notice: Subject to any disclaimer, the term of this patent is extended or adjusted under 35 U.S.C. 154(b) by 602 days.

(21) Appl. No.: 16/958,007

(22) PCT Filed: Dec. 27, 2018

(86) PCT No.: PCT/JP2018/048348
§ 371 (c)(1),
(2) Date: Jun. 25, 2020

(87) PCT Pub. No.: WO2019/131957
PCT Pub. Date: Jul. 4, 2019

(65) Prior Publication Data
US 2021/0371681 A1    Dec. 2, 2021

(30) Foreign Application Priority Data
Dec. 28, 2017  (JP) ................. 2017-254157

(51) Int. Cl.
| | | |
|---|---|---|
| C09D 7/62 | (2018.01) | |
| B05D 1/36 | (2006.01) | |
| B05D 5/06 | (2006.01) | |
| B05D 7/00 | (2006.01) | |
| B05D 7/14 | (2006.01) | |
| C08K 3/013 | (2018.01) | |
| C08K 9/02 | (2006.01) | |
| C09C 1/00 | (2006.01) | |
| C09C 1/40 | (2006.01) | |
| C09C 1/64 | (2006.01) | |
| C09C 3/06 | (2006.01) | |
| C09D 5/29 | (2006.01) | |
| C09D 133/08 | (2006.01) | |

(52) U.S. Cl.
CPC .......... *C09D 7/62* (2018.01); *B05D 1/36* (2013.01); *B05D 5/065* (2013.01); *B05D 5/067* (2013.01); *B05D 7/14* (2013.01); *B05D 7/532* (2013.01); *C08K 3/013* (2018.01); *C08K 9/02* (2013.01); *C09C 1/0021* (2013.01); *C09C 1/0039* (2013.01); *C09C 1/407* (2013.01); *C09C 1/64* (2013.01); *C09C 3/063* (2013.01); *C09D 5/29* (2013.01); *C09D 133/08* (2013.01); *B05D 2202/10* (2013.01); *B05D 2425/02* (2013.01); *B05D 2430/00* (2013.01); *B05D 2502/00* (2013.01); *C08K 2201/003* (2013.01); *C08K 2201/016* (2013.01); *C09C 2200/1004* (2013.01); *C09C 2200/102* (2013.01); *C09C 2200/308* (2013.01)

(58) Field of Classification Search
None
See application file for complete search history.

(56) References Cited

U.S. PATENT DOCUMENTS

| | | | |
|---|---|---|---|
| 5,718,950 A | 2/1998 | Komatsu et al. | |
| 10,220,598 B2* | 3/2019 | Yamane | C09C 1/0081 |
| 2008/0233304 A1* | 9/2008 | Chilla | B05D 7/16 |
| | | | 427/485 |
| 2009/0075100 A1 | 3/2009 | Kitamura | |
| 2009/0162696 A1 | 6/2009 | Kitamura et al. | |
| 2016/0168387 A1* | 6/2016 | Shimizu | C09C 1/642 |
| | | | 106/404 |
| 2016/0200922 A1* | 7/2016 | Sugamoto | C09D 7/61 |
| | | | 427/160 |
| 2017/0275497 A1 | 9/2017 | Kuroda et al. | |
| 2018/0265711 A1* | 9/2018 | Corten | B05D 7/532 |
| 2020/0238333 A1* | 7/2020 | Itoh | C09D 17/001 |

FOREIGN PATENT DOCUMENTS

| | | |
|---|---|---|
| CN | 1128682 A | 8/1996 |
| CN | 1536041 A | 10/2004 |
| JP | 11-116861 A | 4/1999 |
| JP | 2001-149853 A | 6/2001 |

(Continued)

OTHER PUBLICATIONS

Communication dated Mar. 3, 2022 issued by the State Intellectual Property Office of P.R. China in counterpart Chinese application No. 201880083341.6.

Office Action dated Jul. 2, 2021, issued by the State Intellectual Property Office of P.R. China in counterpart Chinese Patent Application No. 201880083341.6.

Office Action dated Jul. 8, 2021, issued by the Canadian Intellectual Property Office in counterpart Canadian Patent Application No. 3,087,167.

Communication dated Oct. 6, 2021 issued by the European Intellectual Property Office in counterpart European Application No. 18896561.0.

(Continued)

*Primary Examiner* — Tamra L. Dicus
(74) *Attorney, Agent, or Firm* — Sughrue Mion, PLLC

(57) ABSTRACT

A coating composition includes a binder component (A), a flake-like aluminum pigment (B) having an average particle diameter (d50) of 18 μm to 25 μm, and a flake-like pigment (C) being a flake-like pigment other than flake-like aluminum pigments and having an average particle diameter (d50) of 8 μm to 30 μm. A content of the flake-like aluminum pigment (B) is 10 parts by mass to 50 parts by mass and a content of the flake-like pigment (C) is 0.5 parts by mass to 10 parts by mass, based on 100 parts by mass of the binder component (A). A content ratio (B)/(C) of the flake-like aluminum pigment (B) to the flake-like pigment (C) is 2/1 to 50/1 in terms of a solid content mass ratio.

5 Claims, No Drawings

(56) References Cited

FOREIGN PATENT DOCUMENTS

| | | |
|---|---|---|
| JP | 2002-121492 A | 4/2002 |
| JP | 2002-155242 A | 5/2002 |
| JP | 2003-201445 A | 7/2003 |
| JP | 2005-239801 A | 9/2005 |
| JP | 2008-521585 A | 6/2008 |
| JP | 2008-237939 A | 10/2008 |
| JP | 2012-17364 A | 1/2012 |
| WO | 2016/042824 A1 | 3/2016 |

OTHER PUBLICATIONS

International Search Report dated Mar. 12, 2019 issued by the International Searching Authority in counterpart International Application No. PCT/JP2018/048348 (PCT/ISA/210).

International Written Opinion dated Mar. 12, 2019 issued by the International Searching Authority in counterpart International Application No. PCT/JP2018/048348 (PCT/ISA/237).

Communication dated Mar. 5, 2019 issued by the Japanese Intellectual Property Office in counterpart Japanese Application No. 2018-246182.

* cited by examiner

US 12,297,373 B2

COATING COMPOSITION, COATED ARTICLE AND METHOD FOR FORMING MULTILAYER COATING FILM

CROSS-REFERENCE TO RELATED APPLICATIONS

This application is a National Stage of International Application No. PCT/JP2018/048348, filed Dec. 27, 2018, claiming priority based on Japanese Patent Application No. 2017-254157, filed Dec. 28, 2017, the contents of all of which are incorporated herein by reference in their entirety.

TECHNICAL FIELD

The present invention relates to a coating composition, a coated article, and a method for forming a multilayer coating film.

BACKGROUND ART

Purposes of coating an object with a coating composition are mainly to give aesthetics and protect a material, and a coating film having a metallic color may be used in the field of automobiles and the like from the viewpoint of aesthetics. In addition, a flake-like aluminum pigment is common to be contained in order to obtain a coating film having such a metallic color.

The flake-like aluminum pigment is oriented so as to be parallel to a surface of an object, and exhibits a unique design of having a brilliant shine as well as color tones thereof changed depending on a viewing direction.

Among them, the characteristic that the color tones change depending on the viewing direction is called a flip-flop property, and when the change in the color tones is large, the flip-flop property is high and the brilliance of a coating film containing the flake-like aluminum pigment is excellent.

The characteristic of having a brilliant shine is called particle feeling, and developments of a metallic color with a high particle feeling, in which each particle of the flake-like aluminum pigment is visible, have been conducted.

For example, Patent Literature 1 discloses a metallic coaling composition containing: an aluminum flake pigment (A) having an average particle diameter d50 of 13 µm or more and 40 µm or less and an average thickness of 0.4 µm or more and 2.5 µm or less; and an aluminum flake pigment (B) having an average particle diameter d50 of 4 µm or more and 30 µm or less and an average thickness of 0.1 µm or more and less than 0.4 µm, in which a solid content mass ratio ((A)/(B)) of the pigment (A) to the pigment (B) is 90/10 to 10/90, and a total value ((A)+(B)) of the solid content mass of the pigment (A) and the pigment (B) is 5 parts by mass to 50 parts by mass relative to 100 parts by mass of the resin solid content of the metallic coating composition.

In addition, Patent Literature 1 describes that the metallic coating composition can form a metallic coating film excellent in particle feeling, brilliance, a flip-flop property, and a hiding property.

CITATION LIST

Patent Literature

Patent Literature 1: JP 2005-239801 A

SUMMARY OF INVENTION

Technical Problem

In the metallic coating composition including the flake-like aluminum pigment blended, it is common that metallic unevenness occurs due to a state of alignment of the flake-like aluminum pigment in the coaling film, or the like.

However, in the technique described in Patent Literature 1, the particle feeling, the brilliance, the flip-flop property, and the hiding property have been studied, but prevention of the occurrence of metallic unevenness has not been studied.

The present invention has been made in view of the above circumstances in the related art, and an object thereof is to provide a coating composition that can form a coating film having a high particle feeling in which occurrence of metallic unevenness has been prevented.

Solution to Problem

As a result of intensive studies to solve the above problems, the present inventors have found that the above problems can be solved by using a specific flake-like pigment at a constant proportion. Thus, the present invention has been completed.

That is, the present invention relates to the following <1> to <8>.

<1> A coating composition comprising:
a binder component (A);
a flake-like aluminum pigment (B) having an average particle diameter (d50) within a range of 18 µm to 25 µm; and
a flake-like pigment (C) being a flake-like pigment other than flake-like aluminum pigments and having an average particle diameter (d50) within a range of 8 µm to 30 µm,
wherein a content of the flake-like aluminum pigment (B) is within a range of 10 parts by mass to 50 parts by mass based on 100 parts by mass of the binder component (A), and a content of the flake-like pigment (C) being a flake-like pigment other than flake-like aluminum pigments is within a range of 0.5 parts by mass to 10 parts by mass based on 100 parts by mass of the binder component (A),
wherein a content ratio (B)/(C) of the flake-like aluminum pigment (B) to the flake-like pigment (C) being a flake-like pigment other than flake-like aluminum pigments is within a range of 2/1 to 50/1 in terms of a solid content mass ratio.

<2> The coating composition according to <1>,
wherein an average thickness of the flake-like aluminum pigment (B) is within a range of 0.10 µm to 0.80 µm.

<3> The coating composition according to <1> or <2>,
wherein an average thickness of the flake-like pigment (C) being a flake-like pigment other than flake-like aluminum pigments is within a range of 0.20 µm to 0.60 µm.

<4> The coating composition according to any one of <1> to <3>,
wherein the flake-like pigment (C) being a flake-like pigment other than flake-like aluminum pigments contains at least one kind selected from the group consisting of mica pigments coated with titanium oxide, mica pigments coated with titanium oxide and iron oxide, aluminum oxide pigments coated with titanium oxide, and aluminum oxide pigments coated with titanium oxide and iron oxide.

<5> The coating composition according to any one of <1> to <4>, wherein a cured coating film obtained by curing the coating composition has a flip-flop value, at a thickness of 15 μm, within a range of 2.0 to 30.0, the flip-flop value being determined by the following formula:

Flip-flop value=L*15 value/L*75 value wherein L*15 value is a L* value at a light receiving angle of 15°, and L*75 value is a L* value at a light receiving angle of 75°.

<6> The coating composition according to any one of <1> to <5>, wherein the cured coating film obtained by curing the coating composition has a graininess value (G value), at a thickness of 15 μm, within a range of 5.0 to 10.0.

<7> A coated article comprising a cured coating film on an object, the cured coating film being obtained by curing the coating composition according to any one of <1> to <6>.

<8> A method for forming a multilayer coating film, the method comprising:
 (1) a step of applying a base coating composition (X to an object to form an uncured base coating film;
 (2) a step of applying a clear coating composition (Y) to the uncured base coating film to form an uncured clear coating film; and
 (3) a step of heating the uncured base coating film and the uncured clear coating film to simultaneously cure the two coating films,
 wherein the base coating composition is the coating composition according to any one of <1> to <6>.

ADVANTAGEOUS EFFECTS OF INVENTION

The present invention can provide a coating composition that can form a coating film having a high particle feeling in which occurrence of metallic unevenness has been prevented.

The present invention can also provide a coating composition that can form a coating film excellent in flip-flop property and distinctness of image.

Description of Embodiments

Hereinafter, the present invention is described in detail below, but these are preferred and exemplary embodiments, and the present invention is not limited to these contents.
[Coating Composition]

A coating composition in the present invention contains a binder component (A), a flake-like aluminum pigment (B) having an average particle diameter (d50) within a range of 18 μm to 25 μm, and a flake-like pigment (C) being a flake-like pigment other than flake-like aluminum pigments and having an average particle diameter (d50) within a range of 8 μm to 30 μm.
[Binder Component A]

As the binder component (A) used n the present invention, a common binder component, which is used in a coating field in the past and contains a base resin and optionally a curing agent, may be used. Examples of the base resin include acrylic resins, polyester resins, alkyd resins, polyurethane resins, and the like, and a base resin having crosslinkable functional groups such as hydroxyl groups, carboxyl groups, or epoxy groups is preferred.

In particular, the binder component (A) preferably contains a combination of a hydroxyl group-containing resin (A1) as a base resin and a curing agent (A3).
<Hydroxyl Group-Containing Resin (A1)>

The hydroxyl group-containing resin (A1) is a resin having at least one hydroxyl group in one molecule.

From the view point of water resistance of the obtained coating film or the like, the hydroxyl group-containing resin (A1) has a hydroxyl value generally within a range of 1 mgKOH/g to 300 mgKOH/g, more preferably within a range of 5 mgKOH/g to 250 mgKOH/g, and still more preferably within a range of 10 mgKOH/g to 180 mgKOH/g.

The hydroxyl group-containing resin (A1) may also have an acid group in the molecule. Examples of the acid group include carboxyl groups, sulfonic acid groups, phosphate groups, and the like, and particularly, the carboxyl groups are preferred.

The coaling composition in the present invention is preferably an aqueous coating composition from the viewpoint of reducing environmental loads. In this case, it is preferable that the hydroxyl group-containing resin (A1) is water-soluble or water-dispersible by neutralizing an acid group, preferably a carboxyl group, with a basic compound. Examples of the above basic compound include: hydroxides of alkali metals or alkaline earth metals, such as sodium hydroxide, potassium hydroxide, lithium hydroxide, calcium hydroxide, and barium hydroxide: ammonia: primary monoamine such as ethylamine, propylamine, butylamine, benzylamine, monoethanolamine, neopentanolamine, 2-aminopropanol, 2-amino-2-methyl-1-propanol, and 3-aminopropanol; secondary monoamine such as diethylamine, diethanolamine, di-n-propanolamine, di-iso-propanolamine, N-methylethanolamine, and N-ethylethanolamine; tertiary monoamine such as dimethylethanolamine, trimethylamine, triethylamine, triisopropylamine, methyldiethanolamine, and 2-(dimethylamino)ethanol; and polyamine such as diethylenetriamine, hydroxyethylaminoethylamine, ethylaminoethylamine, and methylaminopropylamine. These basic compounds may be used within a range of generally 0.1 to 1.5 equivalents, and preferably 0.2 to 1.2 equivalents relative to the acid groups of the hydroxyl group-containing resin (A1).

In the present description, the term "aqueous coating composition" refers to a term contrasted with organic solvent-based coating compositions, and means a coating composition in which coating film-forming resin components, pigments and the like are dispersed and/or dissolved in generally water or a medium (aqueous medium) containing water as a main component. In the case where the coating composition in the present invention is an aqueous coating composition, the content of water in the composition is generally within a range of 10 mass % to 90 mass %, preferably within a range of 20 mass % to 80 mass %, and more preferably within a range of 30 mass % to 70 mass %.

From the viewpoint of storage stability of the coating composition and water resistance of the obtained coating film, the hydroxyl group-containing resin (A1) has an acid value generally within a range of 1 mgKOH/g to 200 mgKOH/g, preferably within a range of 2 mgKOH/g to 150 mgKOH/g, and more preferably within a range of 3 mgKOH/g to 90 mgKOH/g. In the case where a hydroxyl group-containing resin having an acid value of 10 mgKOH/g or less is used as the hydroxyl group-containing resin (A1), the hydroxyl group-containing resin may be as an aqueous coating composition by mixing with an emulsifier, followed by stirring by applying a mechanical shear force thereto to forcibly disperse the hydroxyl-containing resin in water, instead of neutralizing the hydroxyl group-containing resin by using the basic compound.

Examples of the hydroxyl group-containing resin (A1) include polyester resins, acrylic resins, polyether resins, polycarbonate resins, polyurethane resins, epoxy resins, alkyd resins, and the like, and one of these resins may be used alone, or two or more kinds thereof may be used in combination. Among them, the hydroxyl group-containing resin (A1) preferably contains at least one selected from the group consisting of hydroxyl group-containing acrylic resins (A1-1) and hydroxyl-containing polyester resins (A1-2), and more preferably contains the hydroxyl group-containing acrylic resin (A1-1).

(Hydroxyl Group-Containing Acrylic Resin (A1-1))

The hydroxyl group-containing acrylic resin (A1-1) is generally produced by copolymerizing, based on a common method such as solution polymerization in organic solvents or emulsion polymerization in aqueous media, a hydroxyl group-containing polymerizable unsaturated monomer (a) and another polymerizable unsaturated monomer (b) copolymerizable with the hydroxyl group-containing polymerizable unsaturated monomer (a).

The hydroxyl group-containing polymerizable unsaturated monomer (a) is a compound having at least one hydroxyl group and at least one polymerizable unsaturated group in one molecule, and examples thereof include: monoesters of (meth)acrylic acid and dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; modified ε-caprolactone of these monoesters; N-hydroxymethyl (meth)acrylamide; allyl alcohol; (meth)acrylate having a polyoxyethylene chain having a hydroxyl group at its molecular terminal; and the like.

However, in the present invention, a monomer corresponding to the polymerizable unsaturated monomer having an ultraviolet absorbing functional group (xvii) described below is defined as the another polymerizable unsaturated monomer (b) copolymerizable with the hydroxyl group-containing polymerizable unsaturated monomer (a), and the monomer is excluded from the scope of the hydroxyl group-containing polymerizable unsaturated monomer (a). The hydroxyl group-containing polymerizable unsaturated monomer (a) may be used alone or may be used in combination of two or more kinds thereof.

In the present description, the polymerizable unsaturated group means an unsaturated group that can be radically polymerized. Examples of such polymerizable unsaturated groups include a vinyl group, a (meth)acryloyl group, a (meth)acrylamide group, a vinyl ether group, an allyl group, a propenyl group, an isopropenyl group, a maleimide group, and the like.

In the present description, the term "(meth)acrylate" refers to acrylate or methacrylate, and the term "(meth)acrylic acid" means acrylic acid or methacrylic acid. In addition, the term "(meth)acryloyl" means acryloyl or methacryloyl. Further, the term "(meth)acrylamide" means acrylamide or methacrylamide.

The another polymerizable unsaturated monomer (b) copolymerizable with the hydroxyl group-containing polymerizable unsaturated monomer (a) can be preferably selected and used depending on desired properties of the hydroxyl group-containing acrylic resin (A1-1). Specific examples of the monomer (b) include compounds described in (i) to (xix) below. One of these compounds may be used alone, or two or more kinds thereof may be used in combination.

(i) Alkyl or cycloalkyl (meth)acrylates: examples thereof include methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-hexyl (meth)acrylate, n-octyl (meth)acrylate, 2-ethylhexyl (meth)acrylate, nonyl (meth)acrylate, dodecyl (meth)acrylate, tridecyl (meth)acrylate, stearyl (meth)acrylate, isostearyl (meth)acrylate, cyclohexyl (meth)acrylate, methylcyclohexyl (meth)acrylate, tert-butyl-cyclohexyl (meth)acrylate, cyclododecyl (meth)acrylate, tricyclodecanyl (meth)acrylate, and the like.

(ii) Polymerizable unsaturated monomer having an isobornyl group: examples thereof include isobonyl (meth)acrylate and the like.

(iii) Polymerizable unsaturated monomer having an adamantyl group: examples thereof include adamantyl (meth)acrylate and the like.

(iv) Polymerizable unsaturated monomer having a tricyclodecenyl group: examples thereof include tricyclodecenyl (meth)acrylate and the like.

(v) Aromatic ring-containing polymerizable unsaturated monomer: examples thereof include benzyl (meth)acrylate, styrene, α-methylstyrene, vinyl toluene, and the like.

(vi) Polymerizable unsaturated monomer having an alkoxysilyl group: examples thereof include vinyl trimethoxy silane, vinyl triethoxy silane, vinyl tris(2-methoxyethoxy) silane, γ-(meth)acryloyloxypropyltrimethoxysilane, γ-(meth)acryloyloxypropyltriethoxysilane, and the like.

(vii) Polymerizable unsaturated monomer having a fluorinated alkyl group: examples thereof include perfluoroalkyl (meth)acrylate such as perfluorobutytethyl (meth)acrylate, and perfluorooctylethyl (meth)acrylate; fluoroolefin; and the like.

(viii) Polymerizable unsaturated monomer having photopolymerizable functional groups such as a maleimide group (ix) Vinyl compounds: examples thereof include N-vinylpyrrolidone, ethylene, butadiene, chloroprene, vinyl propionate, vinyl acetate, and the like.

(x) Carboxyl group-containing polymerizable unsaturated monomer: examples thereof include (meth)acrylic acid, maleic acid, crotonic acid, β-carboxyethyl acrylate, and the like.

(xi) Nitrogen-containing polymerizable unsaturated monomer: examples thereof include (meth)acrylonitrile, (meth)acrylamide, N,N-dimethylaminoethyl (meth)acrylate, N,N-diethylaminoethyl (meth)acrylate, N,N'dimethylaminopropyl (meth)acrylamide, methylene bis(meth)acrylamide, ethylene bis(meth)acrylamide, 2-(methacryloyloxy)ethyltrimethylammonium chloride, adducts of glycidyl (meth)acrylate with amines, and the like.

(xii) Polymerizable unsaturated monomer having two or more polymerizable unsaturated groups in one molecule: examples thereof include allyl (meth)acrylate, ethylene glycol di(meth)acrylate, 1,4-butandiol di(meth)acrylate, neopentyl glycol di(meth)acrylate, 1,6-hexanediol di(meth)acrylate, and the like.

(xiii) Epoxy group-containing polymerizable unsaturated monomers: examples thereof include glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether, and the like.

(xiv) (Meth)acrylate having a polyoxyethylene chain having an alkoxy group at a molecular terminal (xv) Polymerizable unsaturated monomer having a sulfonic acid group: examples thereof include 2-acrylamide-2- methylpropanesulfonic acid, 2-sulfoethyl (meth)acrylate, alkylsulfonic acid, and 4-styrenesulfonic acid; sodium or ammonium salts of these sulfonic acids; and the like.

(xvi) Polymerizable unsaturated monomer having a phosphate group: examples thereof include acid phosphoxyethyl (meth)acrylate, acid phosphooxypropyl (meth)acrylate, acid phosphooxy poly(oxyethylene) glycol (meth)acrylate, acid phosphooxy poly(oxypropylene) glycol (meth)acrylate, and the like.

(xvi) Polymerizable unsaturated monomer having an ultraviolet absorbing functional group: examples thereof include 2-hydroxy-4-(3-methacryloyloxy-2-hydroxypropoxy) benzophenone, 2-hydroxy-4-(3-acryloyloxy-2-hydroxypropoxy) benzophenone, 2,2'-dihydroxy-4-(3-methacryloyloxy-2-hydroxypropoxy) benzophenone, 2,2'-dihydroxy-4-(3-acryloyloxy-2-hydroxypropoxy) benzophenone, 2-)2'-hydroxy-5'-methacryloyloxyethylphenyl)-2H-benzotriazole, and the like.

(xviii) Light stable polymerizable unsaturated monomer: examples thereof include 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, and the like.

(xix) Polymerizable unsaturated monomer having a carbonyl group: examples thereof include acrolein, diacetone acrylamide, diacetone methacrylamide, acetoacetoxyethyl methacrylate, formylstyrene, vinyl alkyl ketones having 4 to 7 carbon atoms (e.g., vinyl methyl ketone, vinyl ethyl ketone, and vinyl butyl ketone), and the like.

The hydroxyl group-containing acrylic resin (A1-1) may also be used in combination with a so-called urethane-modified acrylic resin in which a part of the hydroxyl groups in the resin is subjected to urethanization reaction with a polyisocyanate compound to perform extension to have a high molecular weight.

The hydroxyl group-containing polymerizable unsaturated monomer (a) is used generally within a range of 1 mass % to 50 mass %, preferably within a range of 2 mass % to 40 mass %, more preferably within a range of 3 mass % to 30 mass %, based on the total amount of the monomer (a) and the monomer (b).

From the viewpoint of storage stability and water resistance of the obtained coating film, the hydroxyl group-containing acrylic resin (A1-1) has a hydroxyl value generally within a range of 1 mgKOH/g to 200 mgKOH/g, preferably within a range of 2 mgKOH/g to 150 mgKOH/g, and more preferably within a range of 5 mgKOH/g to 100 mgKOH/g.

In addition, from the viewpoint of the water resistance of the obtained coating film, the hydroxyl group-containing acrylic resin (A1-1) has an acid value generally within a range of 1 mgKOH/g to 200 mgKOH/g, preferably within a range of 2 mgKOH/g to 150 mgKOH/g, and more preferably within a range of 5 mgKOH/g to 80 mgKOH/g.

Further, from the viewpoint of appearance and water resistance of the obtained coating film, the hydroxyl group-containing acrylic resin (A1-1) has a weight average molecular weight generally within a range of 2,000 to 5,000,000, preferably within a range of 4,000 to 1,000,000, and more preferably 8,000 to 500,000.

In the present description, the number average molecular weight and the weight average molecular weight are values obtained by converting retention time (retention capacity), measured by using gel permeation chromatography (GPC), into a molecular weight of polystyrene, based on retention time (retention capacity) of standard polystyrene having a known molecular weight, measured under the same conditions. Specifically, the retention lime can be measured by using "HLC-8120GPC" (trade name, manufactured by Tosoh Corporation) as a gel permeation chromatograph device, using four columns of "TSKgel G4000HXL", "TSKgel G3000HXL", "TSKgel G2500HXL" and "TSKgel G2000HXL" (trade names, all manufactured by Tosoh Corporation), and using a differential refractometer as a detector under the conditions of mobile phase of tetrahydrofuran, a measurement temperature of 40° C., and a flow rate of 1 ml/min.

In the case where the coating composition in the present invention is an aqueous coating composition, from the viewpoint of prevention of occurrence of metallic unevenness in a formed coating film and improvement of a flip-flop property, the hydroxyl group-containing acrylic resin (A1-1) preferably contains a water-dispersible hydroxyl group-containing acrylic resin (A1-1') which has a core/shell type multilayer structure constituted by components including: a core which is a copolymer (1) obtained by copolymerizing 0.1 mass % to 30 mass % of polymerizable unsaturated monomer (c) having at least two polymerizable unsaturated groups in one molecule with 70 mass % to 99.9 mass % of polymerizable unsaturated monomer (d) having one polymerizable unsaturated group in one molecule; and a shell which is a copolymer (II) obtained by copolymerizing 1 mass % to 35 mass % of hydroxyl group-containing polymerizable unsaturated monomer (a), 5 mass % to 60 mass % of hydrophobic polymerizable unsaturated monomer (e), and 5 mass % to 94% of polymerizable unsaturated monomer (f) being a polymerizable unsaturated monomer other than the hydroxyl group-containing polymerizable unsaturated monomer (a) and the hydrophobic polymerizable unsaturated monomer (e).

Examples of the polymerizable unsaturated monomer (c) having at least two polymerizable unsaturated groups in one molecule and constituting the core include allyl (meth)acrylate, ethylene glycol di(meth)acrylate, 1,3-butylene glycol di(meth)acrylate, tetraethylene glycol di(meth)acrylate. 1,3-butylene glycol di(meth)acrylate. trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethanedi (methacrylate, 1,1,1-trishydroxymethylethanetri (meth)acrylate, 1,1,1-trishydroxymethylpropane tri(meth)acrylate, triallyl isocyanurate, diallyl terephthalate, divinylbenzene, and the like, and one of these monomers may be used alone or two or more kinds thereof may be used in combination.

The polymerizable unsaturated monomer (c) having at least two polymerizable unsaturated groups in one molecule may be used generally within a range of 0.1 mass % to 30 mass %, preferably within a range of 0.5 mass % to 10 mass %, and more preferably within a range of 1 mass % to 5 mass %, based on a total mass of the monomer (c) and the monomer (d).

In addition, the polymerizable unsaturated monomer (d) having one polymerizable unsaturated group in one molecule and constituting the core is a polymerizable unsaturated monomer copolymerizable with the polymerizable unsaturated monomer (e) having at least two polymerizable unsaturated groups in one molecule, and examples thereof includes a compound containing one polymerizable unsaturated group, such as a vinyl group, a (meth)acryloyl group, or an allyl group, in one molecule.

Specific examples of the polymerizable unsaturated monomer (d) having one polymerizable unsaturated group in one molecule include: alkyl or cycloalkyl (meth)acrylates such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (methacrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (trade name, manufactured by Osaka Organic Chemical Industry Ltd.), cyclohexyl (meth)acrylate, methylcyclohexyl (meth)acrylate, tert-butylcyclohexyl (meth) acrylate, and cyclododecyl (meth)acrylate; a polymerizable unsaturated monomer having an isobornyl group, such as isobonyl (meth)acrylate; a polymerizable unsaturated monomer having an adamantyl group, such as adamantyl (meth)acrylate; vinyl aromatic compounds such as styrene, α-methylstyrene, and vinyl toluene; a hydroxyl group-containing polymerizable unsaturated monomer such as monoesters of (meth)acrylic acid and dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate, ε-caprolactone-modified monoesters of the (meth)acrylic acid and dihydric alcohol having 2 to 8 carbon atoms, allyl alcohol, and (meth)acrylate having a polyoxyethylene chain having a hydroxyl group at the molecular terminal; a carboxyl group-containing polymerizable unsaturated monomer such as (meth)acrylic acid, maleic acid, crotonic acid, and β-carboxyethyl acrylate; a nitrogen-containing polymerizable unsaturated monomer such as (meth)acrylonitrile, (meth)acrylamide, dimethylaminopropyl (meth)acrylamide, dimethylaminoethyl (meth)acrylate, and adducts of glycidyl (meth) acrylate with amines; and the like, and one of these monomers may be used alone, or two or more kinds thereof may be used in combination.

On the other hand, as described above, examples of the hydroxyl-containing polymerizable unsaturated monomer (a) constituting the shell include: monoesters of (meth) acrylic acid and dihydric alcohol having 2 to 8 carbon atoms, such as 2-hydroxyethyl (meth)acrylate, 2-hydroxypropyl (meth)acrylate, 3-hydroxypropyl (meth)acrylate, and 4-hydroxybutyl (meth)acrylate; ε-caprolactone-modified monoesters of the (meth)acrylic acid and dihydric alcohol having 2 to 8 carbon atoms: allyl alcohol; (meth)acrylate having a polyoxyethylene chain having a hydroxyl group at the molecular terminal; and the like, and one of these compounds may be used alone, or two or more kinds thereof may be used in combination.

The hydroxyl group-containing polymerizable unsaturated monomer (a) is used generally within a range of 1 mass % to 35 mass %, preferably within a range of 5 mass % to 25 mass %, and more preferably within a range of 8 mass % to 20 mass %, based on the total amount of the monomer (a), the monomer (e), and the monomer (f).

In addition, a polymerizable unsaturated monomer containing a linear, branched or cyclic, saturated or unsaturated hydrocarbon group having 6 or more carbon atoms is included in the scope of the hydrophobic polymerizable unsaturated monomer (e) constituting the shell, and examples thereof include: alkyl or cycloalkyl (meth)acrylate such as n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, "Isostearyl Acrylate" (trade name, manufactured by Osaka Organic Chemical Industry Ltd.), cyclohexyl (meth) acrylate, methylcyclohexyl (meth)acrylate, tert-butylcyclohexyl (meth)acrylate, and cyclododecyl (meth)acrylate; a polymerizable unsaturated monomer having a isobornyl group, such as isobornyl (meth)acrylate; a polymerizable unsaturated monomer having an adamantyl group, such as adamantyl (meth)acrylate; vinyl aromatic compounds such as styrene, α-methylstyrene, and vinyl toluene; and the like, and one of these compounds may be used alone, or two or more kinds thereof may be used in combination. Among the hydrophobic polymerizable unsaturated monomer (e) used in the water-dispersible hydroxyl group-containing acrylic resin (A1-1'), the vinyl aromatic compounds are preferred, and styrene is particularly preferred, from the viewpoint of smoothness and distinctness of image of the formed coating film.

The hydrophobic polymerizable unsaturated monomer (c) is used generally within a range of 5 mass % to 60 mass %, preferably within a range of 8 mass % to 40 mass %, and more preferably within a range of 11 mass % to 25 mass %, based on the total amount of the monomer (a), the monomer (e), and the monomer (f).

In addition, examples of the polymerizable unsaturated monomer (f) being a polymerizable unsaturated monomer other than the hydroxyl group-containing polymerizable unsaturated monomer (a) and the hydrophobic polymerizable unsaturated monomer (e), and constituting the shell include; alkyl (meth)acrylate such as methyl (meth)acrylate, ethyl (meth)acrylate, n-propyl (meth)acrylate, isopropyl (meth)acrylate, n-butyl (meth)acrylate, isobutyl (meth)acrylate, and tert-butyl (meth)acrylate; a carboxyl group-containing polymerizable unsaturated monomer such as (meth) acrylic acid, maleic acid, crotonic acid, and β-carboxyethyl acrylate; and the like, and one of these compounds may be used alone, or two or more kinds thereof may be used in combination.

From the viewpoint of smoothness of the formed coating film, the polymerizable unsaturated monomer (f) being a polymerizable unsaturated monomer other than the hydroxyl group-containing polymerizable unsaturated monomer (a) and the hydrophobic polymerizable unsaturated monomer (e) preferably contains a carboxyl group-containing polymerizable unsaturated monomer (g) as a part of the components.

Examples of the carboxyl group-containing polymerizable unsaturated monomer (g) include (meth)acrylic acid, maleic acid, crotonic acid, and β-carboxyethyl acrylate, and among them, (meth)acrylic acid is preferred.

From the viewpoint of stability of the water-dispersible hydroxyl group-containing acrylic resin (A1-1') in an aqueous medium, and smoothness and water resistance of the formed coating film, the carboxyl group-containing polymerizable unsaturated monomer (g) is used generally within a range of 1 mass % to 40 mass %, preferably within a range of 6 mass % to 25 mass %, and more preferably within a range of 11 mass % to 19 mass %, based on the total mass of the monomer (a), the monomer (c), and the monomer (f).

From the view point of water resistance of the formed coating film, the water-dispersible hydroxyl group-containing acrylic resin (A1-1') has a hydroxyl value generally within a range of 1 mgKOH/g to 70 mgKOH/g, preferably within a range of 2 mgKOH/g to 60 mgKOH/g, and more preferably within a range of 5 mgKOH/g to 45 mgKOH/g.

From the viewpoint of storage stability and water resistance of the formed coating film, the water-dispersible hydroxyl group-containing acrylic resin (A1-1') has an acid value generally within a range of 5 mgKOH/g to 90 mgKOH/g, preferably within a range of 10 mgKOH/g to 70 mgKOH/g, and more preferably within a range of 15 mgKOH/g to 50 mgKOH/g.

From the viewpoint of prevention of occurrence of metallic unevenness in a formed coating film and improvement of a flip-flop property, it is preferable that the polymerizable unsaturated monomer having only one polymerizable unsaturated group in one molecule is used as the monomer (a), monomer (e) and monomer (f), and the shell of the water-dispersible hydroxyl group-containing acrylic resin (A1-1') is uncrosslinked.

The water-dispersible hydroxyl group-containing acrylic resin (A1-1') can be obtained by adding a monomer mixture (II) which contains 1 mass % to 35 mass % of the hydroxyl group-containing polymerizable unsaturated monomer (a), 5 mass % to 60 mass % of the hydrophobic polymerizable unsaturated monomer (e), and 5 mass % to 94 mass % of the polymerizable unsaturated monomer (f) being a polymerizable unsaturated monomer other than the monomer (a) and the monomer (d), to an emulsion which is obtained by emulsion-polymerizing a monomer mixture (I) containing 0.1 mass % to 30 mass % of the polymerizable unsaturated monomer (c) having at least two polymerizable unsaturated groups in one molecule, and 70 mass % to 99.9 mass % of the polymerizable unsaturated monomer (d) having one polymerizable unsaturated group in one molecule, and polymerizing them.

The emulsion polymerization of the monomer mixture can be performed by a common method, for example, by using a polymerization initiator in the presence of an emulsifier.

As the emulsifier, anionic emulsifiers or nonionic emulsifiers are preferred. Examples of the anionic emulsifiers include sodium salts or ammonium salts of an organic acid such as alkyl sulfonic acid, alkylbenzene sulfonic acid, and alkyl phosphoric acid, and examples of the nonionic emulsifiers include polyoxyethylene oleyl ether, polyoxyethylene stearyl ether, polyoxyethylene lauryl ether, polyoxyethylene tridecyl ether, polyoxyethylene phenyl ether, polyoxyethylene nonyl phenyl ether, polyoxyethylene octyl phenyl ether, polyoxyethylene monolaurate, polyoxyethylene monostearate, polyoxyethylene monooleate, sorbitan monolaurate, sorbitan monostearate, sorbitan monostearate, sorbitan triolate, polyoxyethylene sorbitan monolaurate, and the like.

A polyoxyalkylene group-containing anionic emulsifier having an anionic group and a polyoxyalkylene group such as a polyoxyethylene group or a polyoxypropylene group in one molecule, or a reactive anionic emulsifier having the anionic group and a radical polymerizable unsaturated group in one molecule may be used, and among them, the reactive anionic emulsifier is preferably used.

Examples of the reactive anionic emulsifier include sodium salts or ammonium salts of sulfonic acid compounds having radical polymerizable unsaturated groups such as a (meth)allyl group, a (meth)acryloyl group, a propenyl group, or a butenyl group. Among them, ammonium salts of a sulfonic acid compound having a radical polymerizable unsaturated group are preferred because they give excellent water resistance to the formed coating film. Examples of the ammonium salts of the sulfonic acid compound include commercially available products such as "Latemul S-180A" (trade name, manufactured by Kao Corporation).

Among the ammonium salts of the sulfonic acid compound having the radical polymerizable unsaturated group, an ammonium salt of a sulfonic acid compound having a radical polymerizable unsaturated group and a polyoxyalkylene group is further preferred. Examples of the ammonium salts of the sulfonic acid compound having the radical polymerizable unsaturated group and the polyoxyalkylene group include commercially available products such as "Aqualon KH-10" (trade name, manufactured by DKS Co. Ltd.) and "SR-1025A" (trade name, manufactured by Adeka Corporation).

The emulsifier may be used generally within a range of 0.1 mass % to 15 mass %. preferably within a range of 0.5 mass % to 10 mass %, and more preferably within a range of 1 mass % to 5 mass %, based on a total amount of all monomers used.

The polymerization initiator may be any of oil-soluble polymerization initiators and water-soluble polymerization initiators, and examples thereof include organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropyl carbonate, tert-butyl peroxyacetate, and diisopropylbenzene hydroperoxide; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis (2-methylpropionate), azobis[2-methyl-N-(2-hydroxyethyl)-propionamide], and azobis{2-methyl-N-[2-(1-hydroxybutyl)]-propionamide}; persulfate such as potassium persulfate, ammonium persulfate, and sodium persulfate; and the like. One of these compounds may be used alone, or two or more kinds thereof may be used in combination.

If necessary, a reducing agent such as sugar, sodium formaldehyde sulfoxylate, iron complex, or the like may be used in combination with the polymerization initiator, as a redox polymerization system.

The polymerization initiator may be used generally within a range of 0.1 mass % to 5 mass %, and preferably within a range of 0.2 mass % to 3 mass %, based on a total amount of all monomers used. A method for adding the polymerization initiator is not particularly limited, and may be appropriately selected depending on the kind, amount, or the like. For example, the polymerization initiator may be contained in the monomer mixture or an aqueous medium in advance, or may be collectively added or added dropwise during the polymerization.

The water-dispersible hydroxyl group-containing acrylic resin (A1-1') can be obtained by adding the monomer mixture (II) which contains the hydroxyl group-containing polymerizable unsaturated monomer (a), the hydrophobic polymerizable unsaturated monomer (e), and the polymerizable unsaturated monomer (f) being a polymerizable unsaturated monomer other than the monomer (a) and the monomer (e), to the emulsion obtained as above.

The monomer mixture (II) may preferably contain components such as a polymerization initiator, a chain transfer agent, a reducing agent, and an emulsifier as listed above, if necessary.

In addition, the monomer mixture (II) can be added dropwise as it is, and the monomer mixture (II) is preferably dispersed in an aqueous medium and dropped as a monomer emulsion. The particle diameter of the monomer emulsion in this case is not particularly limited.

The polymerization of the monomer mixture (II) can be performed, for example, by adding the monomer mixture (II), which may be emulsified, to the emulsion at once or dropwise, and heating the mixture to an appropriate temperature while performing the stirring.

The water-dispersible hydroxyl group-containing acrylic resin (A1-1') obtained as described above can have a core/shelf type multilayer structure in which a copolymer (I), which is formed from the monomer mixture (I) containing the polymerizable unsaturated monomer (c) having at least two polymerizable unsaturated groups in one molecule and the polymerizable unsaturated monomer (d) having one polymerizable unsaturated group in one molecule, constitutes the core, and a copolymer (II), which is formed from the monomer mixture (II) containing the hydroxyl group-containing polymerizable unsaturated monomer (a), the hydrophobic polymerizable unsaturated monomer (e), and the polymerizable unsaturated monomer (f) being a polymerizable unsaturated monomer other than the above monomers (a) and (e), constitutes the shell.

In addition, the water-dispersible hydroxyl group-containing acrylic resin (A1-1') may be resin particles formed of three or mere layers by adding, between a step of obtaining the copolymer (I) and a step of obtaining the copolymer (II), a step of performing emulsion polymerization by supplying polymerizable unsaturated monomers (one kind or two or more kinds of mixtures) forming another resin layer.

In the present invention, the "shell" which is the water-dispersible hydroxyl group-containing acrylic resin (A1-1') means a polymer layer existing on the outermost layer of resin particles, the "core" means a polymer layer of an inner layer of resin particles excluding the shell part, and the "core/shell type structure" means a structure having the above core and shell. Regarding the core/shell type structure, a layer structure in which a core is completely covered with a shell is common, but the amount of monomers of the shell may be insufficient to form the layer structure depending on the mass ratio of the core and the shell. In such a case, the core/shell type structure is not necessary to be the complete layer structure as described above. The core/shell type structure may be a structure in w which a part of a core is covered with a shell, or may be a structure in which a polymerizable unsaturated monomer, which is a constituent element of the shell, is graft-polymerized with a part of the core. In addition, the concept of the multilayer structure in the core/shell type structure also applies to the case where a multilayer structure is formed in the core in the water-dispersible hydroxyl group-containing acrylic resin (A1-1').

From the viewpoint of prevention of occurrence of metallic unevenness in a formed coating film and improvement of a flip-flop property, a ratio of the copolymer (I) to the copolymer (II) in the water-dispersible hydroxyl group-containing acrylic resin (A1-1') having a core/shell type multilayer structure is generally within a range of 10/90 to 90/10, preferably within a range of 50/50 to 85/15, and more preferably within a range of 65/35 to 80/20, in terms of a solid content mass ratio of copolymer (I)/copolymer (II).

The water-dispersible hydroxyl group-containing acrylic resin (A1-1') obtained as described above can have an average particle diameter generally within a range of 10 nm to 1,000 nm, and preferably within a range of 20 nm to 500 nm. The average particle diameter of the above hydroxyl group-containing acrylic resin is a value measured at a measurement temperature of 20° C. by a coulter counter method. The measurement can be performed by using, for example, "COULTER N4 type" (trade name, manufactured by Beckman Coulter Corporation).

In order to improve the mechanical stability of the aqueous dispersion particles of the obtained w ater-dispersible hydroxyl group-containing acrylic resin (A1-1'), it is desirable to neutralize acidic groups such as carboxyl groups of the water-dispersible hydroxyl group-containing acrylic resin (A1-1') with a neutralizing agent. The neutralizing agent can be used without particular limitation as long as it can neutralize the acidic groups, and examples thereof include sodium hydroxide, potassium hydroxide, trimethylamine, 2-(dimethylamino)ethanol, 2-amino-2-methyl-1-propanol, triethylamine, and aqueous ammonia. It is desirable that these neutralizing agents are used in an amount at which the pH of an aqueous dispersion of the water-dispersible hydroxyl group-containing acrylic resin (A1-1') after neutralization is about 6.5 to 9.0.

In the coating composition in the present invention, the hydroxyl group-containing acrylic resin (A1-1) preferably contains an acrylic resin (A1-1') having a hydroxyl group and a phosphate group, from the viewpoint of prevention of occurrence of metallic unevenness in a formed coating film and improvement of a flip-flop property.

The above acrylic resin (A1-1") having a hydroxyl group and a phosphate group can be produced by copolymerizing monomer components including the above hydroxyl group-containing polymerizable unsaturated monomer (a) and the above polymerizable unsaturated monomer (xvi) having a phosphate group, and another polymerizable unsaturated monomer blended as necessary by a common method, for example, a method such as solution polymerization in organic solvents or emulsion polymerization in water. Among them, the solution polymerization is preferred.

In the above acrylic resin (A1-1") having a hydroxyl group and a phosphate group, a usage proportion of the hydroxyl group-containing polymerizable unsaturated monomer (a), the polymerizable unsaturated monomer (xvi) having a phosphate group, and another polymerizable unsaturated monomer may be in the following range based on the total amount of these monomers.

Hydroxyl group-containing polymerizable unsaturated monomer (a): 1 mass % to 50 mass %, preferably 5 mass % to 40 mass %, and more preferably 10 mass % to 30 mass %.

Phosphate group-containing polymerizable unsaturated monomer (xvi): 1 mass % to 70 mass %, preferably 10 mass % to 55 mass %, and more preferably 20 mass % to 45 mass %.

Another polymerizable unsaturated monomer: 0 mass % to 98 mass %, preferably 5 mass % to 85 mass %, and more preferably 25 mass % to 70 mass %.

The above acrylic resin (A1-1") having a hydroxyl group and a phosphate group has a hydroxyl value generally within a ranee of 15 mgKOH/g to 200 mgKOH/g, preferably within a range of 20 mgKOH/g to 140 mgKOH/g, and more preferably within a range of 30 mgKOH/g to 100 mgKOH/g.

The acrylic resin (A1-1") having a hydroxyl group and a phosphate group has an acid value generally within a range of 10 mgKOH/g to 200 mgKOH/g, preferably within a range of 40 mgKOH/g to 170 mgKOH/g, and more preferably within a range of 60 mgKOH/g to 150 mgKOH/g.

The acrylic resin (A1-1") having a hydroxyl group and a phosphate group has a number average molecular weight generally within a range of 2,000 to 100,000, preferably within a range of 4,000 to 50,000, and more preferably within a range of 8,000 to 30,000.

(Hydroxyl Group-Containing Polyester Resin (A1-2))

In the coating composition in the present invention, the hydroxyl group-containing polyester resin (A1-2) is used as a base resin of the binder component (A), so that the smoothness of the obtained coating film can be improved.

The hydroxyl group-containing polyester resin (A1-2) can be generally produced by an esterification reaction or a transesterification reaction of acid components and alcohol components.

As the above acid components, a compound generally used as an acid component in the production of the polyester resin may be used. Examples of such acid components include aliphatic polybasic acids, alicyclic polybasic acids, aromatic polybasic acids, and the like.

Generally, the above aliphatic polybasic acid is an aliphatic compound having two or more carboxyl groups in one molecule, an acid anhydride of the aliphatic compound, or an esterified product of the aliphatic compound. Examples of the aliphatic polybasic acid include: an aliphatic polycarboxylic acid such as succinic acid, glutaric acid, adipic acid, pimelic acid, suberic acid, azelaic acid, sebacic acid, undecanedioic acid, dodecanedioic acid, brassic acid, octadecandioic acid, citric acid, and butanetetracarboxylic acid; an anhydride of the aliphatic polycarboxylic acid; an esterified product of low alkyl, which has 1 to 6 carbon atoms, preferably 1 to 4 carbon atoms, of the aliphatic polycarboxylic acid; and the like. One of these aliphatic polybasic acids may be used alone, or two or more kinds thereof may be used in combination. From the viewpoint of the smoothness of the obtained coating film, adipic acid and/or adipic anhydride are/is particularly preferably used as the above aliphatic polybasic acid.

The alicyclic polybasic acid is generally a compound having one or more alicyclic structures and two or more carboxyl groups in one molecule, an acid anhydride of the compound, or an esterified product of the compound. The alicyclic structure can be mainly a 4- to 6-membered ring structure. Examples of the alicyclic polybasic acid include: an alicyclic polyvalent carboxylic acid such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid and 1,3,5-cyclohexanetricarboxylic acid; an anhydride of the alicyclic polyvalent carboxylic acid; an esterified product of low alkyl, which has 1 to 6 carbon atoms, preferably 1 to 4 carbon atoms, of the alicyclic polyvalent carboxylic acid; and the like. One of these alicyclic polybasic acids may be used alone, or two or more kinds thereof may be used in combination. As the alicyclic polybasic acid, from the viewpoint of smoothness of the obtained coating film, 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid, and 4-cyclohexene-1,2-dicarboxylic anhydride are preferably used, and among them, 1,2-cyclohexanedicarboxylic acid and/or 1,2-cyclohexanedicarboxylic anhydride are/is more preferably used.

Generally, the aromatic polybasic acid is an aromatic compound having two or more carboxyl groups in one molecule, an acid anhydride of the aromatic compound, or an esterified product of the aromatic compound. Examples of the aromatic polybasic acid include: an aromatic polycarboxylic acid such as phthalic acid, isophthalic acid, terephthalic acid, naphthalenedicarboxylic acid, 4,4'-biphenyldicarboxylic acid, trimellitic acid, and pyromellitic acid; an anhydride of the aromatic polycarboxylic acid; an esterified product of low alkyl, which has 1 to 6 carbon atoms, preferably 1 to 4 carbon atoms, of the aromatic polycarboxylic acid: and the like. One of these aromatic polybasic acids may be used alone, or two or more kinds thereof may be used in combination. As the above aromatic polybasic acid, phthalic acid, phthalic anhydride, isophthalic acid, trimellitic acid, and trimellitic anhydride are preferably used among them.

In addition, an acid component other than the aliphatic polybasic acids, the alicyclic polybasic acids and the aromatic polybasic acids may also be used. The acid component is not particularly limited, and examples thereof include: fatty acids such as coconut oil fatty acids, cottonseed oil fatty acids, hemp oil fatty acids, rice bran oil fatty acids, fish oil fatty acids, tall oil fatty acids, soybean oil fatty acids, linseed oil fatty acids, tung oil fatty acids, rapeseed oil fatty acids, castor oil fatty acids, dehydrated castor oil fatty acids, and safflower oil fatty acids: a monocarboxylic acid such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; a hydroxycarboxylic acid such as lactic acid, 3-hydroxybutanoic acid, and 3-hydroxy-4-ethoxybenzoic acid; and the like. One of these acid components may be used alone, or two or more kinds thereof may be used in combination.

As the alcohol component, a polyhydric alcohol having two or more hydroxyl groups in one molecule is preferably used. Examples of the polyhydric alcohol include: dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecane dimethanol, neopentyl glycol hydroxypivalate, hydrogenated bisphenol A, hydrogenated bisphenol F, and dimethylolpropionic acid; polylactone diols obtained by adding a lactone compound such as ε-caprolactone to these dihydric alcohols; ester diol compounds such as bis(hydroxyethyl) terephthalate; polyether diol compounds such as an alkylene oxide adduct of bisphenol A, polyethylene glycol, polypropylene glycol, and polybutylene glycol; alcohols having three or more hydroxyl groups, such as glycerin, trimethylolethane, trimethylolpropane, diglycerin, triglycerin, 1,2,6-hexanetriol, pentaerythritol, dipentaerythritol, tris(2-hydroxyethyl) isocyanuric acid, sorbitol, and mannit; polylactone polyol compounds obtained by adding lactone compounds such as ε-caprolactone to these alcohols having three or more hydroxyl groups; glycerin fatty acid esters; and the like.

In addition, an alcohol component other than the polyhydric alcohol may be used. The alcohol component is not particularly limited, and examples thereof include: monoalcohols such as methanol, ethanol, propyl alcohol, butyl alcohol, stearyl alcohol, and 2-phenoxyethanol; alcohol compounds obtained by allowing a monoepoxy compound to react with acids, such as propylene oxide, butylene oxide, and "Cajura E10" (trade name, manufactured by Momentive Specialty Chemicals, glycidyl esters of synthetic hyperbranched saturated fatty acids); and the like.

A method for producing the hydroxyl group-containing polyester resin (A1-2) is not particularly limited, and the production can be performed based on a common method. For example, the hydroxyl group-containing polyester resin (A1-2) can be produced by a method of performing an esterification reaction or a transesterification reaction of the acid component and the alcohol component by heating the acid component and the alcohol component at a temperature of about 150° C. to about 250° C. for about 5 hours to about 10 hours in a nitrogen gas flow.

When the above acid component and the alcohol component are subjected to the esterification reaction or the transesterification reaction, these components may be added to a reaction vessel all at once or one or both thereof may be added in several parts. In addition, after synthesizing the hydroxyl group-containing polyester resin first, the obtained hydroxyl group-containing polyester resin is allowed to react with an acid anhydride to be half-esterified, so as to obtain a carboxyl group-containing polyester resin and a hydroxyl group-containing polyester resin. After synthesizing the carboxyl group-containing polyester resin, the above alcohol components are added and the hydroxyl group-containing polyester resin may be produced.

During the above esterification reaction or the transesterification reaction, as catalysts for promoting the reaction, common catalysts such as dibutyltin oxide, antimony trioxide, zinc acetate, manganese acetate, cobalt acetate, calcium acetate, lead acetate, tetrabutyl titanate, and tetraisopropyl titanate may be used.

The above hydroxyl group-containing polyester resin (A1-2) can be modified with a fatty acid, a monoepoxy compound, a polyisocyanate compound, or the like during or after the production of the resin.

Examples of the fatty acid include coconut oil fatty acids, cottonseed oil fatty acids, hemp oil fatty acids, rice bran oil fatty acids, fish oil fatty acids, tall oil fatty acids, soybean oil fatty acids, linseed oil fatty acids, tung oil fatty acids, rapeseed oil fatty acids, castor oil fatty acids, dehydrated castor oil fatty acids, safflower oil fatty acids, and the like. As the above monoepoxy compound, for example, "Cajura E10P" (trade name, manufactured by Momentive Specialty Chemicals, glycidyl esters of synthetic hyperbranched saturated fatty acids) may be preferably used.

Examples of the above poly isocyanate compound include: an aliphatic diisocyanate compound such as lysine diisocyanate, hexamethylene diisocyanate, and trimethylhexane diisocyanate; an alicyclic diisocyanate compound such as hydrogenated xylylene diisocyanate, isophorone diisocyanate, methylcyclohexane-2,4-diisocyanate, methylcyclohexane-2,6-diisocyanate, 4,4'-methylenebis (cyclohexyl isocyanate), and 1,3-(isocyanatomethyl) cyclohexane; an aromatic diisocyanate compound such as tolylene diisocyanate, xylylene diisocyanate, and diphenylmethane diisocyanate; organic polyisocyanate such as polyisocyanate having three or more —NCO groups like lysine triisocyanate; adducts of each of these organic polyisocyanates with polyhydric alcohols, low molecular weight polyester resins, water, etc.; cyclized polymers (for example, isocyanurate) of each of these organic polyisocyanates, and biuret-based adducts; and the like. Each of these poly isocyanate compounds may be used alone, or two or more thereof may be used in combination.

As the hydroxyl group-containing polyester resin (A1-2), a content of alicyclic polybasic acid in the acid components as a raw material is preferably 20 mol % to 100 mol %, more preferably 25 mol % to 95 mol %, and still more preferably 30 mol % to 90 mol % based on the total amount of the acid component, from the viewpoint of excellent smoothness and water resistance of the obtained coating film. In particular, it is preferable that the alicyclic polybasic acid is 1,2-cyclohexanedicarboxylic acid and/or an acid anhydride of 1,2-cyclohexanedicarboxylic acid from the viewpoint of smoothness of the obtained coaling film.

From the viewpoint of the water resistance of the obtained coating film, the hydroxyl group-containing polyester resin (A1-2) has a hydroxyl value generally within a range of 1 mgKOH/g to 200 mgKOH/g, preferably in a range of 2 mgKOH/g to 180 mgKOH/g, and more preferably within a range of 5 mgKOH/g to 170 mgKOH/g.

From the viewpoint of the smoothness and the water resistance of the obtained coating film, the hydroxyl group-containing polyester resin (A1-2) has a number average molecular weight generally within a range of 500 to 50,000, preferably within a range of 1,000 to 30,000, and more preferably within a range of 1,200 to 10,000.

In the case where the coating composition in the present invention is an aqueous coating composition, the hydroxyl group-containing polyester resin (A1-2) preferably has carboxyl groups. In this case, the hydroxyl group-containing polyester resin (A1-2) has an acid value generally within a range of 5 mgKOH/g to 150 mgKOH/g, preferably within a range of 10 mgKOH/g to 100 mgKOH/g, and more preferably within a range of 15 mgKOH/g to 80 mgKOH/g.

(Hydroxyl Group-Containing Polyurethane Resin (A1-3))

In the coating composition in the present invention, the hydroxyl group-containing polyurethane resin (A1-3) is used as a base resin of the binder component (A), so that the chipping resistance of the obtained coating film can be improved.

Examples of the hydroxyl group-containing polyurethane resin (A1-3) include: aliphatic diisocyanates and/or cyclic diisocyanates; at least one kind of diol selected from the group consisting of polyether diol, polyester diol, and polycarbonate diol; and a compound which is obtained by allowing a low molecular weight polyhydroxy compound to react with dimethylolalkanoic acid to prepare a urethane prepolymer, neutralizing the urethane prepolymer with a tertiary amine and emulsifying and dispersing the obtained product in water, then performing mixing with an aqueous medium optionally containing chain extenders such as polyamines, crosslinking agents and or terminators, and allowing the reaction to occur until isocyanate groups are substantially eliminated.

According to the above method, a water-dispersible hydroxyl group-containing polyurethane resin having an average particle diameter of about 0.001 µm to about 3 µm may be mentioned.

In the coating composition in the present invention, a resin (A2) which does not substantially contain a hydroxyl group (hereinafter, referred to as "hydroxyl group-free resin"), other than the hydroxyl group-containing resin (A1), may also be used as a base resin of the binder component (A).

<Hydroxyl Group-Free Resin (A2)>

Examples of the hydroxyl group-free resin (A2) include polyurethane resins, polyester resins, acrylic resins, alkyd resins, silicone resins, fluororesins, epoxy resins, and the like, and among them, the polyurethane resins are preferred from the viewpoint of the chipping resistance and the water resistance of the obtained coating film. These resins may have, for example, functional groups such as a carboxyl group or an epoxy group, and particularly preferably have a carboxyl group. One of these resins may be used alone, or two or more kinds thereof may be used in combination, and they are preferably used in combination with the hydroxyl group-containing resin (A1).

<Curing Agent (A3)>

The curing agent (A3) is a functional group-containing compound that is capable of reacting with a crosslinkable functional group such as a hydroxyl group existing in the hydroxyl group-containing resin (A1), a carboxyl group or epoxy group that is optionally existed, so as to cure the coaling composition in the present invention. Examples of the curing agent (A3) include amino resins, polyisocyanate compounds, blocked polyisocyanate compounds, epoxy group-containing compounds, carboxyl group-containing compounds, carbodiimide group-containing compounds, and the like, and one of these compounds may be used alone, or two or more kinds thereof may be used in combination. Among them, the amino resins, the polyisocyanate compounds, and the blocked polyisocyanate compounds, which can react with the hydroxyl group, are preferred from the viewpoint of prevention of occurrence of metallic unevenness of the obtained coating film, particle feeling, improvement of the flip-flop property, the water resistance and the chipping resistance, and further, the amino resins are particularly preferred from the viewpoint of the storage stability of the obtained coating composition.

As the above amino resin, a partially methylolated amino resin or a completely methylolated amino resin obtained by the reaction between an amino component and an aldehyde component may be used. Examples of the amino component include melamine, urea, benzoguanamine, acetoguanamine, steroganamin, spiroganamin, dicyandiamide, and the like. Examples of the aldehyde component include formaldehyde, paraformaldehyde, acetaldehyde, benzaldehyde, and the like.

A compound, which is obtained by partially or completely etherifying a methylol group of the methylolated amino resin with an appropriate alcohol, may be used. Examples of the alcohol used for the etherification include methyl alcohol, ethyl alcohol, n-propyl alcohol, isopropyl alcohol, n-butyl alcohol, isobutyl alcohol, 2-ethyl-1-butanol, 2-ethyl-1-hexanol, and the like.

As the amino resin, the melamine resin is preferred. In particular, preferred examples thereof include a methyl etherified melamine resin obtained by partially or completely etherifying a methylol group of the partially or completely methylolated melamine resin with methyl alcohol, a butyl etherified melamine resin obtained by partially or completely etherifying a methylol group of the partially or completely methylolated melamine resin with butyl alcohol, and a methyl-butyl mixed etherified melamine resin obtained by partially or completely etherifying a methylol group of the partially or completely methylolated melamine resin with methyl alcohol and butyl alcohol, and the methyl-butyl mixed etherified melamine resin is more preferred.

Among them, from the viewpoint of giving a coating film excellent in the water resistance or the like, it is particularly preferable to use a coating composition in which a hydroxyl group-containing polyester resin, which is produced by using acid components in which the total content of the aliphatic polybasic acid and the alicyclic polybasic acid in the acid components as a raw material is within a range of 30 mol % to 97 mol % and a content of the aromatic polybasic acids is within a range of 3 mol % to 70 mol %, based on the total amount of the acid components, is used as the hydroxyl group-containing resin (A1), and at least one kind of alkyl etherified melamine resin selected from the methyl etherified melamine resin, the butyl etherified melamine resin, and the methyl-butyl mixed etherified melamine resin, which are described above, is used as the curing agent (A3).

The above melamine resin has a weight average molecular weight generally within a range of 400 to 6,000, preferably within a range of 700 to 4,000, and more preferably within a range of 1,000 to 3,000.

As the melamine resin, commercially available products may be used, and examples thereof include "Clymel 202", "Cymel 203", "Cymel 204", "Cymel 211", "Cymel 238", "Cymel 250", "Cymel 251", "Cymel 303", "Cymel 323", "Cymel 324", "Cymel 325", "Cymel 327", "Cymel 350", "Cymel 385", "Cymel 1156", "Cymel 1158", "Cymel 1116", "Cymel 1130" (all manufactured by ALLNEX LTD., trade name), "Urban 120", "Urban 20HS", "Urban 20SE60", "Urban 2021", "Urban 2028", "Urban 28-60" (all manufactured by Mitsui Chemicals, Inc., trade name), and the like.

In the case where the melamine resin is used as the curing agent (A3), it is possible to use the following compounds as catalysts: sulfonic acids such as paratoluenesulfonic acid, dodecylbenzene sulfonic acid, and dinonylnaphthalene-sulfonic acid; alkyl phosphate such as monobutyl phosphoric acid, dibutyl phosphoric acid, mono-2-ethylhexyl phosphoric acid, and di-2-ethylhexyl phosphoric acid; and salts of these acids and amines.

The above polyisocyanate compound has at least two isocyanate groups in one molecule, and examples thereof include aliphatic polyisocyanate, alicyclic polyisocyanate, araliphatic polyisocyanate, aromatic polyisocyanate, derivatives of the polyisocyanates, and the like.

Examples of the above aliphatic polyisocyanates include: aliphatic diisocyanate such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); aliphatic triisocyanate such as 2-isocyanatoethyl 2,6-diisocyanatohexanoate, 1,6-diisocyanate-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of the above alicyclic polyisocyanate include: alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), methyl-2,4-cyclohexane diisocyanate, methyl-2,6-cyclohexane diisocyanate, 1,3- or 1,4-bis(isocyanatomethyl) cyclohexane (common name: hydrogenated xylylene diisocyanate) or a mixture thereof, and norbornane diisocyanate; alicyclic triisocyanates such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane; and the like.

Examples of the above araliphatic polyisocyanates include: araliphatic diisocyanates such as 1,3- or 1,4-xylylene diisocyanate or a mixture thereof, ω,ω'-diisocyanato-1,4-diethylbenzene, and 1,3- or 1,4-bis(1-isocyanate-1-methylethyl)benzene (common name: tetramethylxylylene diisocyanate) or a mixture thereof; araliphatic triisocyanates such as 1,3,5-triisocyanatomethylbenzene; and the like.

Examples of the above aromatic polyisocyanates include: aromatic diisocyanates such as m-phenylene diisocyanate, p-phenylene diisocyanate, 4,4'-diphenyl diisocyanate, 1,5-naphthalenediisocyanate, 2,4'- or 4,4'-diphenylmethane diisocyanate or a mixture thereof, 2,4- or 2,6-tolylene diisocyanate or a mixture thereof, 4,4'-toluidine diisocyanate, and 4,4'-diphenyl ether diisocyanate; aromatic triisocyanate such as triphenylmethane-4,4',4"-triisocyanate, 1,3,5-triisocyanatobenzene, and 2,4,6-triisocyanatotoluene; aromatic tetraisocyanates such as 4,4'-diphenylmethane-2,2',5,5'-tetraisocyanate; and the like.

Examples of the derivatives of the polyisocyanates include a dimer, trimer, biuret, allophanate, uretdione, urethoimine, isocyanurate, oxadiazinetrione, polymethylene polyphenyl polyisocyanate (crude MDI; polymeric MDI), and crude TDI, of the above polyisocyanate compounds.

One of the above polyisocyanates and derivatives thereof may be used alone, or two or more kinds thereof may be used in combination. Among these polyisocyanates, one of aliphatic diisocyanates, alicyclic diisocyanates, and derivatives of them may be suitably used alone, or two or more kinds thereof may be suitably used in combination.

As the above polyisocyanate compound, prepolymers, which are obtained by subjecting the above polyisocyanates and derivatives thereof, and polyhydric alcohols, a low molecular weight polyester resin or water to a urethane reaction under the conditions where isocyanate groups are excess, may also be used.

From the viewpoint of water resistance of the obtained coating film, the polyisocyanate compound is preferably used at a ratio where the equivalent ratio (NCO/OH) of the isocyanate groups in the polyisocyanate compound to the hydroxyl groups in the hydroxyl group-containing resin (A1) is generally within a range of 0.5 to 2.0, particularly within a range of 0.8 to 1.5.

The blocked polyisocyanate compound is a compound in which the isocyanate group of the polyisocyanate compound is blocked with a blocking agent.

Examples of the above blocking agent include: phenol-based blocking agents such as phenol, cresol, xylenol, nitrophenol, ethyl phenol, hydroxydiphenyl, butylphenol, isopropyl phenol, nonylphenol, octylphenol, and methyl hydroxybenzoate; lactam-based blocking agents such as ε-caprolactam, δ-valerolactam, γ-butyrolactam, and β-propiolactam; aliphatic alcohol-based blocking agents such as methanol, ethanol, propyl alcohol, butyl alcohol, amyl alcohol, and lauryl alcohol; ether-based blocking agents such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol; alcohol-based blocking agents such as benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate; oxime-based blocking agents such as form amide oxime, acetamide oxime, acetoxime, methyl ethyl ketoxime, diacetyl monooxime, benzophenone oxime, and cyclohexane oxime; active methylene-based blocking agents such as dimethyl malonate, diethyl malonate, ethyl acetoacetate, methyl acetoacetate, and acetylacetone; mercaptan-based blocking agents such as butyl mercaptan, tert-butyl mercaptan, hexyl mercaptan, tert-dodecyl mercaptan, 2-mercaptobenzothiazole, thiophenol, methylthiophenol, and ethyl thiophenol; acid amide-based blocking agents such as acetanilide, acetanisidide, acetotoluide, acrylamide, methacrylamide, acetamide, stearic acid amide, and benzamide; imide-based blocking agents such as succinimide, phthalic imide, and maleic imide; amine-based blocking agents such as diphenylamine, phenylnaphthylamine, xylidine, N-phenylxylidine, carbazole, aniline, naphthylamine, butylamine, dibutylamine, and butylphenylamine; imidazole-based blocking agents such as imidazole and 2-ethylimidazole; urea-based blocking agents such as urea, thiourea, ethylene urea, ethylene thiourea, and diphenyl urea; carbamate-based blocking agents such as phenyl N-phenylcarbamate; imin-based blocking agents such as ethyleneimine and propylene imine; sulfite-based blocking agents such as sodium bisulfite and potassium bisulfite; azole compounds; and the like. Examples of the azole compounds include: pyrazoles or derivatives of pyrazole such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazoles or derivatives of imidazole such as imidazole, benzimidazole, 2-methylimidazole, 2-ethylimidazole, and 2-phenylimidazole; derivatives of imidazoline such as 2-methylimidazoline and 2-phenylimidazoline; and the like.

Among them, oxime blocking agents, active methylene blocking agents, and pyrazoles or pyrazole derivatives are preferred as the blocking agent.

As the blocking agent, hydroxycarboxylic acids having one or more hydroxyl groups and one or more carboxyl groups, such as hydroxypivalic acid and dimethylolpropionic acid, may also be used.

In the case where the coating composition in the present invention is an aqueous coating composition, it is possible to preferably use a blocked polyisocyanate compound having water dispersibility imparted by blocking the isocyanate groups by using the above hydroxycarboxylic acid, and then neutralizing the carboxyl group of the hydroxycarboxylic acid.

In the case where the hydroxyl group-containing resin (A1) and/or the hydroxyl group-free resin (A2) have/has a crosslinkable functional group such as a carboxyl group or an epoxy group, a curing agent having crosslinkable functional group capable of reacting with the functional group may be used as the curing agent (A3).

Examples of such curing agent include an epoxy group-containing compound, a carboxyl group-containing compound, and a carbodiimide group-containing compound, which can react with the above crosslinkable functional group, and among them, a polycarbodiimide compound which can react with the carboxyl group is preferred.

The polycarbodiimide compound is a compound having at least two carbodiimide groups in one molecule, and for example, a compound obtained by subjecting isocyanate groups of isocyanate group-containing compounds to a decarbonized reaction, may be used.

In the case where the coating composition in the present invention is an aqueous coating composition, a water-soluble or water-dispersible polycarbodiimide compound is preferably used as the above polycarbodiimide compound, from the viewpoint of the smoothness of the obtained coating film. The water-soluble or water-dispersible polycarbodiimide compound can be used without particular limitation as long as it is a polycarbodiimide compound that can be stably dissolved or dispersed in an aqueous medium.

Specific examples of the water-soluble polycarbodiimide compound include commercially available products such as "Carbodilite SV-02", "Carbodilite V-02", "Carbodilite V-02-L2" and "Carbodilite V-04" (trade name, all manufactured by Nisshinbo). In addition, specific examples of the water-dispersible polycarbodiimide compound include commercially available products such as "Carbodilite E-01" and "Carbodilite E-02" (trade name, all manufactured by Nisshinbo).

One of these polycarbodiimide compounds may be used alone, or two or more kinds thereof may be used in combination.

Regarding a usage proportion of the hydroxyl group-containing resin (A1) and the curing agent (A3) in the coating composition in the present invention, the content of the hydroxyl group-containing resin (A1) is generally within a range of 30 mass % to 95 mass %, preferably within a range of 50 mass % to 90 mass %, and more preferably within a range of 60 mass % to 80 mass %, and the content of the curing agent (A3) is generally within range of 5 mass % to 70 mass %, preferably within a range of 10 mass % to 50 mass %, and more preferably within a range of 20 mass % to 40 mass %, based on a total amount of the hydroxyl group-containing resin (A1) and the curing agent (A3), from the viewpoint of improvement of adhesion and chipping resistance of a coating film.

In the case where the hydroxyl group-containing resin (A1) contains the hydroxyl group-containing acrylic resin (A1-1) as at least a part thereof, the content of the hydroxyl group-containing acrylic resin (A1-1) in the coating composition in the present invention is generally within a range of 2 mass % to 80 mass %, preferably within a range of 10 mass % to 60 mass %, and more preferably within a range of 20 mass % to 50 mass %, based on the total amount of the hydroxyl group-containing resin (A1) and the curing agent (A3).

In the case where the hydroxyl group-containing resin (A1) contains the hydroxyl group-containing polyester resin (A1-2) as at least a part thereof, the content of the hydroxyl group-containing polyester resin (A1-2) in the coating composition in the present invention is generally within a range of 2 mass % to 80 mass %, preferably within a range of 5 mass % to 60 mass %, and more preferably within a range of 10 mass % to 50 mass %, based on the total amount of the hydroxyl group-containing resin (A1) and the curing agent (A3).

In the case where the hydroxyl group-containing resin (A1) contains the hydroxyl group-containing polyurethane resin (A1-3) as at least a part thereof, the content of the hydroxyl group-containing polyurethane resin (A1-3) in the coating composition in the present invention is generally within a range of 1 mass % to 80 mass %, preferably within a range of 3 mass % to 60 mass %, and more preferably within a range of 5 mass % to 40 mass %, based on the total amount of the hydroxyl group-containing resin (A1) and the curing agent (A3).

[Flake-Like Aluminum Pigment (B)]

The flake-like aluminum pigment (B) used in the present invention has an average particle diameter (d50) within a range of 18 µm to 25 µm. This is because, in the case where the average particle diameter (d50) is 18 µm or more, a coating film with a high particle feeling is formed, and in the case where the average particle diameter (d50) is 25 µm or less, the occurrence of metallic unevenness is prevented, and a coating film excellent in the clarity is formed.

From the viewpoint of the particle feeling of the formed coating film, prevention of occurrence of metallic unevenness, and distinctness of image, the average particle diameter (d50) of the flake-like aluminum pigment (B) is preferably within a range of 18 µm to 23 µm, and more preferably within a range of 19 µm to 21 µm.

The average particle diameter (d50) indicates the median diameter in a volume-basis particle size distribution measured by a laser diffraction scattering method using a Microtrac particle size distribution measuring apparatus, MT3300 (trade name, manufactured by Nikkiso Co., Ltd.).

In the case where two or more kinds of flake-like aluminum pigments (B) are used as the above flake-like aluminum pigment (B), the average particle diameter (d50) of the flake-like aluminum pigment (B) is a value calculated by the following formula.

$$d50 = W_1 \times d_1 + W_2 \times d_2 + \ldots W_n \times d_n$$

In the formula, $W_1, W_2, \ldots W_n$ are a mass fraction of each flake-like aluminum pigment (B), and $d_1, d_2, \ldots d_n$ are an average particle diameter (d50) of each flake-like aluminum pigment (B).

Examples of the flake-like aluminum pigment (B) used in the present invention include a milling-type flake-like aluminum pigment (B) produced by grinding and milling aluminum, using a grinding aid, in a ball mill or an attritor mill in the presence of a grinding medium.

As the grinding aid in the production step of the milling-type flake-like aluminum pigment (B), higher fatty acids such as oleic acid, stearic acid, isostearic acid, lauric acid, palmitic acid and myristic acid, aliphatic amines, aliphatic amides, and fatty alcohols are used. As the grinding medium, aliphatic hydrocarbons such as mineral spirits are used.

The milling-type flake-like aluminum pigment (B) can be roughly classified into a leafing type and a non-leafing type depending on the kind of the grinding aid.

When the leafing-type pigment is blended in the coating composition, flakes are arranged (leafed) on the surface of the coating film obtained by applying the coating composition, giving a finish with a strong metallic feeling, and since the pigment has a heat-reflecting action and exerts rust-preventing power, this type is often used for factory equipment such as a tank, a duct, piping, and roofing, and various building materials.

The leafing type flake-like aluminum pigment (B) can be used as the flake-like aluminum pigment (B) used in the present invention, but in that case, it is required to pay attention to the adhesion with the upper clear coating film, because the leafing-type flake-like aluminum pigment (B) is oriented on the surface of the coating film by an effect of surface tension of the grinding aid, depending on the blending amount thereof, in a process of forming the coating film.

From this viewpoint, a non-leafing type flake-like aluminum pigment (B) is preferably used.

As the non-leafing type flake-like aluminum pigment (B), a flake-like aluminum pigment whose surface is not particularly treated may be used, and it is possible to use a flake-like aluminum pigment whose surface is coated with a resin, a flake-like aluminum pigment subjected to a silica treatment, and a flake-like aluminum pigment whose surface is treated with phosphoric acid, molybdic acid, tungstic acid, a silane coupling agent or the like. A flake-like aluminum pigment which has been subjected to one kind of treatment from the above various surface treatments may be used, and a flake-like aluminum pigment which has been subjected to a plural kinds of treatments may be used.

A flake-like colored aluminum pigment may be used as the flake-like aluminum pigment (B). Examples of the flake-like colored aluminum pigment include a pigment obtained by coating a surface of the flake-like aluminum pigment (B) with a coloring pigment and further coating the surface with a resin, a pigment obtained by coating the surface of the flake-like aluminum pigment (B) with metal oxides such as iron oxide, and the like.

In the present invention, the flake-like aluminum pigment (B) preferably contains an uncolored flake-like aluminum pigment (B1) from the viewpoint of improvement of the flip-flop property and improvement of the particle feeling of a formed coating film.

In the case where the above uncolored flake-like aluminum pigment (B1) is used as the flake-like aluminum pigment (B), a content of the uncolored flake-like aluminum pigment (B1) is within a range of 60 mass % to 100 mass %, preferably within a range of 80 mass % to 100 mass %, and more preferably within a range of 90 mass % to 100 mass %, based on the flake-like aluminum pigment (B) in the present coating composition.

An average thickness of the flake-like aluminum pigment (B) is preferably within a range of 0.10 µm to 0.80 µm, more preferably within a range of 0.20 µm to 0.75 µm, and still more preferably within a range of 0.30 µm to 0.70 µm.

This is preferred because, in the case where the average thickness of the flake-like aluminum pigment (B) is 0.10 µm or more, deformation and breakage of the flake-like aluminum pigment (B) during stirring of a coating composition hardly occurs, and in the case where the average thickness is 0.80 µm or less, a coating film excellent in the flip-flop property is formed.

The average thickness of the flake-like aluminum pigment (B) can be measured by a water surface diffusion area method (avenge thickness=4000/S µm, where S (cm$^2$/g) is water surface diffusion area).

In the case where two or more kinds of flake-like aluminum pigments (B) are used as the above flake-like aluminum pigment (B), the average thickness of the flake-like aluminum pigment (B) is a value calculated by the following formula.

Average thickness=$W1 \times t1 + W2 \times t2 + \ldots Wn \times tn$

In the formula, W1, W2, ... Wn are a mass fraction of each flake-like aluminum pigment (B), and t1, t2, ... tn are an average thickness of each flake-like aluminum pigment (B).

A content of the flake-like aluminum pigment (B) is within a range of 10 parts by mass to 50 parts by mass based on 100 parts by mass of the binder component (A). This is because, in the case where the content is 10 parts by mass or more, the occurrence of metallic unevenness is prevented and a coaling film excellent in the flip-flop property is formed, and in the case where the content is 50 parts by mass or less, the occurrence of metallic unevenness is prevented and a coating film excellent in the distinctness of image is formed.

From the viewpoint of the particle feeling of the formed coating film, the flip-flop property, prevention of occurrence of metallic unevenness, and distinctness of image, the content of the flake-like aluminum pigment (B) is preferably within a range of 12 parts by mass to 40 parts by mass, and more preferably within a range of 15 parts by mass to 30 parts by mass, based on 100 parts by mass of the binder component (A).

[Flake-Like Pigment (C) Being Flake-Like Pigment Other Than Flake-Like Aluminum Pigments]

The flake-like pigment (C) being a flake-like pigment other than flake-like aluminum pigments used in the present invention is a flake-like pigment other than flake-like aluminum pigments, which has an average particle diameter (d50) within a range of 8 µm to 30 µm. This is because, in the case where the average particle diameter (d50) is 8 µm or more, a coating film preventing the occurrence of metallic unevenness is formed, and in the case where the average particle diameter (d50) is 30 µm or less, the occurrence of metallic unevenness is prevented, and a coating film excellent in the distinctness of image is formed.

From the viewpoint of prevention of occurrence of metallic unevenness and improvement of distinctness of image in the formed coating film, the average particle diameter (d50) of the flake-like pigment (C) being a flake-like pigment other than flake-like aluminum pigments is preferably within a range of 10 µm to 27 µm, and more preferably within a range of 12 µm to 24 µm.

The average particle diameter (d50) indicates the median diameter in a volume-basis particle size distribution measured by a laser diffraction scattering method using a Microtrac particle size distribution measuring apparatus, MT3300 (trade name, manufactured by Nikkiso Co., Ltd.).

In the case where two or more kinds of flake-like pigments (C) being flake-like pigments other than flake-like aluminum pigments are used as the above flake-like pigment (C) being a flake-like pigment other than flake-like aluminum pigments, an average particle diameter (d50) of the flake-like pigment (C) being a flake-like pigment other than flake-like aluminum pigments can be calculated based on a method for calculating the average particle diameter (d50) of the above two or more kinds of flake-like aluminum pigments (B).

As the flake-like pigment (C) being a flake-like pigment other than flake-like aluminum pigments, a flake-like pigment, which is obtained by coating a surface of a transparent or translucent flake-like substrate such as natural mica, synthetic mica, glass, iron oxide, aluminum oxide, or various metal oxides with a metal oxide having a refractive index different from the substrate, may be used. Examples of the above metal oxide include titanium oxide, iron oxide, and the like.

Specific examples of the flake-like pigment (C) being a flake-like pigment other than flake-like aluminum pigments include mica pigments coated with metal oxide shown below, aluminum oxide pigments coated with metal oxide shown below, silica flake pigments coated with metal oxide shown below, and the like.

The mica pigment coated with metal oxide is a pigment in which the substrate is natural mica or synthetic mica and a surface of the substrate is coated with a metal oxide. The natural mica refers to a flake-like substrate obtained by grinding mica of ore. The synthetic mica is synthesized by heating industrial raw materials such as $SiO_2$, MgO, $Al_2O_3$, $K_2SiF_6$, and $Na_2SiF_6$, allowing the industrial raw materials to melt at a high temperature of about 1500° C. and performing cooling to crystallize them. As compared with the natural mica, the synthetic mica includes a small amount of impurities, and has a uniform size, a uniform thickness, and a high whiteness. Specific examples of the synthetic mica as the substrate include fluorophlogopite ($KMg_3AlSi_3O_{10}F_2$), potassium tetrasilicic mica ($KMg_{2.5}AlSi_4O_{10}F_2$), sodium tetrasilicic mica ($NaMg_{2.5}AlSi_4O_{10}F_2$), Na teniolite ($NaMg_2LiSi_4O_{10}F$), LiNa teniolite ($LiMg_2LiSi_4O_{10}F_2$), and the like. As the mica pigment coated with metal oxide, a synthetic mica pigment coated with metal oxide using the synthetic mica as a substrate is preferably used.

Examples of the mica pigment coated with metal oxide include a mica pigment coated with titanium oxide, a mica pigment coated with iron oxide, a mica pigment coated with titanium oxide and iron oxide, a mica pigment coated with low order titanium oxide, and the like. In the present description, the low order titanium oxide is represented by the general formula TiO$_x$ (x=1 to 1.99).

As the mica pigment coated with metal oxide, commercially available products may be used. In the mica pigment coated with metal oxide, examples of the commercially available products of the mica pigment coated with titanium oxide include "TWINCLE PEARL SXA", "TWINCLE PEARL SXB", "TWINCLE PEARL SXD", "TWINCLE PEARL SXC-SO", "TWINCLE PEARL SXB-SO", "TWINCLE PEARL SXD-SO" (all manufactured by Nihon Koken Kogyo Co., Ltd.). "Lumina Exterior Pearl Radiance 1303D". "Lumina Pearl Radiance 1303D MND", "Magnapearl Exterior CFS 1103", (all manufactured by BASF), "IRIODIN 111WNT" (manufactured by MERCK), and the like.

Examples of the commercially available products of the above mica pigment coated with iron oxide include "IRIODIN 504WNT" (manufactured by MERCK), and the like.

Examples of the commercially available products of the above mica pigment coated with titanium oxide and iron oxide include "IRIODIN 602WNT" (manufactured by MERCK), and the like.

The aluminum oxide pigment coated with metal oxide is a pigment in which the substrate is aluminum oxide, and a surface of the substrate is coated with a metal oxide. The aluminum oxide may contain an oxide of another metal.

Examples of the aluminum oxide pigment coated with metal oxide include an aluminum oxide pigment coated with titanium oxide, an aluminum oxide pigment coated with iron oxide, an aluminum oxide pigment coated with titanium oxide and iron oxide, and the like.

As the aluminum oxide pigment coated with metal oxide, commercially available products may be used. In the aluminum oxide pigment coated with metal oxide, examples of the commercially available products of the aluminum oxide pigment coated with titanium oxide include "Xirallic T60-10 SW Crystal Silver" (manufactured by MERCK), and the like.

Examples of the commercially available products of the aluminum oxide pigment coated with iron oxide include "Xirallic F60-50 SW Fireside Copper", "Xirallic F60-51 SW Radiant Red" (manufactured by MERCK), and the like.

Examples of the commercially available products of the aluminum oxide pigment coated with titanium oxide and iron oxide include "Xirallic NXT M260-60 WNT Panthera Silver" (manufactured by MERCK), and the like.

The silica flake pigment coated will metal oxide is a pigment in which flake-like silica is coated with a metal oxide.

Examples of the silica flake pigment coaled with metal oxide include a silica flake pigment coated with titanium oxide, a silica flake pigment coated with iron oxide, and the like.

Among these pigments, from the viewpoint of prevention of occurrence of metallic unevenness, the mica pigment coated with titanium oxide, the mica pigment coated with titanium oxide and iron oxide, the aluminum oxide pigment coated with titanium oxide, and the aluminum oxide pigment coated with titanium oxide and iron oxide are preferred, the mica pigment coated with titanium oxide and the aluminum oxide pigment coated with titanium oxide are more preferred, and the mica pigment coated with titanium oxide is particularly preferred.

In the present invention, the flake-like pigment (C) being a flake-like pigment other than flake-like aluminum pigments preferably contains a flake-like pigment (C1) being u flake-like pigment other than flake-like aluminum pigments and having a silver interference color, from the viewpoint of preventing occurrence of metallic unevenness of the formed coating film. The flake-like pigment (C1) being a flake-like pigment other than flake-like aluminum pigments and having a silver interference color, can be obtained, for example, by adjusting a thickness of a metal oxide that is applied to the surface of the flake-like substrate and has a refractive index different from that of the substrate.

Among them, from the viewpoint of improvement of the flip-flop property and the particle feeling of the formed coating film and prevention of occurrence of metallic unevenness, it is preferable that the above uncolored flake-like aluminum pigment (B1) is used as the above flake-like aluminum pigment (B), and the above flake-like pigment (C1) being a flake-like pigment other than flake-like aluminum pigments and having a silver interference color, is used as the above flake-like pigment (C) being a flake-like pigment other than flake-like aluminum pigments.

As the above flake-like pigment (C1) being a flake-like pigment other than flake-like aluminum pigments and having a silver interference color, commercially available products may be used. Examples of the commercially available products include: mica pigments coated with titanium oxide such as "TWINCLE PEARL SXA", "TWINCLE PEARL SXB", "TWINCLE PEARL SXD", "TWINCLE PEARL SXC-SO", "TWINCLE PEARL SXB-SO", "TWINCLE PEARL SXD-SO" (all manufactured by Nihon Koken Kogyo Co., Ltd.). "Lumina Exterior Pearl Radiance 1303D" "Lumina Pearl Radiance 1303D MND", "Magnapearl Exterior CFS 1103", (all manufactured by BASF), and "IRIODIN 111WNT" (manufactured by MERCK); aluminum oxide pigments coated with titanium oxide such as "Xirallic T60-10 SW Crystal Silver" (manufactured by MERCK); and the like.

In the case where the above flake-like pigment (C1) being a flake-like pigment other than flake-like aluminum pigments and having a silver interference color is used as the flake-like pigment (C) being a flake-like pigment other than flake-like aluminum pigments, a content of the flake-like pigment (C1) being a flake-like pigment other than flake-like aluminum pigments and having a silver interference color is within a range of 60 mass % to 100 mass %, preferably within a range of 80 mass % to 100 mass %, and more preferably within a range of 90 mass % to 100 mass %, based on the flake-like pigment (C) being a flake-like pigment other than flake-like aluminum pigments in the present coating composition.

The above flake-like pigment (C) being a flake-like pigment other than flake-like aluminum pigments may be a pigment to w which a surface treatment for improving dispersibility, water resistance, chemical resistance, weather resistance, or the like is applied.

An average thickness of the flake-like pigment (C) being a flake-like pigment other than flake-like aluminum pigments is preferably within a range of 0.20 μm to 0.60 μm, more preferably within a range of 0.25 μm to 0.50 μm, and still more preferably within a range of 0.27 μm to 0.45 μm.

This is preferred because, in the case where the average thickness of die flake-like pigment (C) being a flake-like pigment other than flake-like aluminum pigments is 0.20 μm or more, deformation and breakage of the flake-like pigment (C) during stirring of the coating composition hardly occurs, and in the case where the average thickness is 0.60 μm or less, the occurrence of metallic unevenness of the formed coating film is prevented.

The average thickness is defined as an average value of at least 100 measured values obtained by observing a cross section of a coating film containing the flake-like pigment (C) being a flake-like pigment other than flake-like aluminum pigments with a microscope and measuring the thickness by using image processing software.

In the case where two or more kinds of flake-like pigments (C) being a flake-like pigments other than flake-like aluminum pigments are used as the above flake-like pigment (C) being a flake-like pigment other than flake-like aluminum pigments, an average thickness of the flake-like pigment (C) being a flake-like pigment other than flake-like aluminum pigments can be calculated based on a method for calculating the average thickness of the above two or more kinds of flake-like aluminum pigments (B).

A content of the flake-like pigment (C) being a flake-like pigment other than flake-like aluminum pigments is within a range of 0.5 parts by mass to 10 parts by mass based on 100 parts by mass of the binder component (A). This is because, in the case where the content is 0.5 parts by mass or more, the occurrence of metallic unevenness of the formed coating film is prevented, and in the case where the content is 10 parts by mass or less, a coating film excellent in the flip-flop property and the distinctness of image is formed.

From the viewpoint of prevention of occurrence of metallic unevenness of the formed coating film and improvement of the flip-flop property and the distinctness of image, the content of the flake-like pigment (C) being a flake-like pigment other than flake-like aluminum pigments is preferably within a range of 1.0 part by mass to 8.0 parts by mass, and more preferably within a range of 1.5 parts by mass to 6.0 parts by mass based on 100 parts by mass of the binder component (A).

A content ratio ((B)/(C)) of the flake-like aluminum pigment (B) to the flake-like pigment (C) being a flake-like pigment other than flake-like aluminum pigments is within a range of 2.0/1 to 50.0/1 in terms of a solid content mass ratio.

This is because, in the case where the solid content mass ratio is 2.0/1 or more, the flip-flop property of the formed coating film improves, and in the case where the solid content mass ratio is 50.0/1 or less, the occurrence of metallic unevenness of the formed coating film is prevented.

The mass ratio is preferably from 30/1 to 20.0/1, more preferably from 4.0/1 to 15.0/1, and still more preferably from 5.1/1 to 10.0/1, from the viewpoint of improvement of the flip-flop property of the formed coating film and prevention of the occurrence of metallic unevenness.

[Another Component (D)]

The coaling composition in the present invention preferably further contains a hydrophobic solvent from the viewpoint of improvement of the smoothness of the obtained coating film.

As the hydrophobic solvent, it is desirable to use an organic solvent having a dissolution mass of 10 g or less, preferably 5 g or less, and more preferably 1 g or less relative to 100 g of water at a temperature of 20° C. Examples of such organic solvents include: hydrocarbon solvents such as rubber volatile oil, mineral spirit, toluene, xylene, and solvent naphtha; alcohol-based solvents such as 1-hexanol, 1-octanol, 2-octanol, 2-ethyl-1-hexanol, 1-decanol, benzyl alcohol, ethylene glycol mono 2-ethylhexyl ether, propylene glycol mono n-butyl ether, dipropylene glycol mono n-butyl ether, tripropylene glycol mono n-butyl ether, propylene glycol mono 2-ethylhexyl ether, and propylene glycol monophenyl ether; ester solvents such as N-butyl acetate, isobutyl acetate, isoamyl acetate, methyl amyl acetate, and ethylene glycol monobutyl ether acetate; and ketone solvents such as methyl isobutyl ketone, cyclohexanone, ethyl n-amyl ketone, and diisobutyl ketone. One of these solvents may be used alone, or two or more kinds thereof may be used in combination.

The alcohol-based hydrophobic solvent is preferably used as the hydrophobic solvent from the viewpoint of the smoothness of the obtained coating film. Among them, an alcohol-based hydrophobic solvent having 7 to 14 carbon atoms is preferred, and at least one kind of alcohol-based hydrophobic solvent selected from the group consisting of 1-octanol, 2-octanol, 2-ethyl-1-hexanol, ethylene glycol mono 2-ethylhexyl ether, propylene glycol mono n-butyl ether, and dipropylene glycol mono n-butyl ether is more preferred.

In the case where the coating composition in the present invention contains the hydrophobic solvent, a content of the hydrophobic solvent is generally within a range of 10 parts by mass to 100 parts by mass, preferably within a range of 20 parts by mass to 80 parts by mass, and more preferably within a range of 30 parts by mass to 60 parts by mass, based on 100 parts by mass of the binder component (A).

The coaling composition in the present invention may contain, as necessary, one of common additives for coating composition, such as a coloring pigment, an extender pigment, a thickener, a curing catalyst, an ultraviolet absorber, a light stabilizer, a defoamer, a plasticizer, an organic solvent, a surface conditioner, or an anti-settling agent, or contain two or more kinds thereof in combination.

Examples of the coloring pigment include titanium oxide, zinc white, carbon black, molybdenum red, prussian blue, cobalt blue, an azo-based pigment, a phthalocyanine-bused pigment, a quinacridone-based pigment, an isoindoline-based pigment, a threne-based pigment, a perylene-based pigment, a dioxazine-based pigment, a diketopyrrolopyrrole-based pigment, and the like.

Examples of the extender pigment include talc, clay, kaolin, barium sulfate, barium carbonate, calcium carbonate, and the like.

Examples of the thickener include: inorganic thickeners such as silicate, metal silicate, montmorillonite, and colloidal alumina; polyacrylic acid-based thickeners such as a copolymer of (meth)acrylic acid and (meth)acrylic acid ester, and sodium polyacrylate; associative thickeners having a hydrophilic part and a hydrophobic part in one molecule and showing a thickening effect effectively since in an aqueous medium, the hydrophobic part is adsorbed on a surface of a pigment or emulsion particles in a coating composition or the hydrophobic parts are associated with each other; cellulose derivative thickeners such as carboxymethyl cellulose, methyl cellulose, hydroxethyl cellulose, cellulose nanofiber, and cellulose nanocrystal; protein-based thickeners such as casein, sodium caseinate, and ammonium caseinate; alginate-based thickeners such as sodium alginate; polyvinyl-based thickeners such as polyvinyl alcohol, polyvinyl pyrrolidone, and a polyvinyl benzyl ether copolymer; polyether-based thickeners such as pluronic polyether, polyether dialkyl ester, polyether dialkyl ether, and a polyether epoxy modified product; maleic anhydride copolymer thickeners such as partial esters of a vinyl methyl ether-maleic anhydride copolymer, polyamide-based thickeners such as polyamideamine salts; and the like.

One of these thickeners may be used alone, or two or more kinds thereof may be used in combination.

As the above thickeners, the polyacrylic acid-based thickeners and/or the associative thickeners are particularly preferred.

Examples of the curing catalyst include organometallic compounds, acid compounds, base compounds, and the like.

Examples of the organometallic compounds include metal catalysts such as tetraisopropyl titanate, tetrabutyl titanate, lithium acetate, iron (III) acetylacetone, zinc 2-ethylhexanoate, copper acetate, vanadium trichloride, tin octylate, dibutyltin diacetate, dibutyltin dioctoate, dibutyltin dilaurate, dibutyltin dimaleate, tetrabutyltin, dibutyltin oxide, tetra-n-butyl-1,3-diacetyloxydistannoxane, tetra-n-propyl-1,3-diacetyloxydistannoxane, and tetra-n-butyl-1,3-dilauryloxydistannoxane, and organotin compounds, such as tin octylate. dibutyltin diacetate, dibutyltin dilaurate, and distanoxanes, are particularly preferred. Further, when low-temperature baking is required, dibutyltin diacetate is preferably used.

Examples of the acid compounds include paratoluenesulfonic acid, dodecylbenzene sulfonic acid, dinonylnaphthalenesulfonic acid, dinonylnaphthalenedisulfonic acid, butyl phosphoric acid, octyl phosphoric acid, and the like, and amine neutralized products of these acids are also preferably used.

Examples of the base compounds include compounds such as trimethylamine, triethylamine, dimethylcyclohexylamine, N-tetramethylhexane-1,6-diamine, N-pentamethyldiethylenetriamine, and 2-methyl-1,4-diazabicyclo [2,2,2] octane.

Examples of the ultraviolet absorber include benzotriazole-based absorbers, triazine-based absorbers, salicylic acid derivative-based absorbers, benzophenone-based absorbers, and the like.

Examples of the light stabilizer include a hindered amine-based light stabilizer.

The coaling composition in the present invention has a solid content generally within a range of 1 mass % to 50 mass %, preferably within a range of 5 mass % to 40 mass %, more preferably within a range of 15 mass % to 35 mass %, and still more preferably within a range of 20 mass % to 30 mass %.

[Method for Producing Coating Composition]

The coaling composition in the present invention can be prepared by mixing the various components described above in a solvent based on common coating methods. As the solvent, for example, an organic solvent, water, or the like may be used.

Examples of the organic solvent include hydrocarbon-based solvents such as heptane, toluene, xylene, octane, and mineral spirit; ester-based solvents such as ethyl acetate, N-butyl acetate, isobutyl acetate, ethylene glycol monomethyl ether acetate, and diethylene glycol monobutyl ether acetate; ketone-based solvents such as methyl ethyl ketone, methyl isobutyl ketone, diisobutyl ketone, and cyclohexanone; alcohol-based solvents such as methanol, ethanol, isopropanol, n-butanol, sec-butanol, and isobutanol; ether-based solvents such as n-butyl ether, dioxane, ethylene glycol monomethyl ether, and ethylene glycol monoethyl ether; aromatic petroleum-based solvents such as Swasol 310, Swasol 1000, and Swasol 1500, which are manufactured by Cosmo Oil Co., Ltd.; and the like.

[Coated Article]

The coated article in the present invention includes, on an object, a cured coating film obtained by curing the coating composition in the present invention.

The cured coating film can be obtained by forming a wet coating film (uncured coating film) by applying the coating composition in the present invention to an object, and then curing the wet coating film.

The object is not particularly limited, and examples thereof include: outer panels of a vehicle body of an automobile such as passenger cars, trucks, motorcycles, and buses; automobile parts; outer panels of household appliances such as mobile phones and audio equipment; and the like. Among these objects, the outer panels of the vehicle body of the automobile and the automobile parts are preferred.

A material of these objects is not particularly limited, and examples thereof include metal materials such as iron, aluminum, brass, copper, tin plate, stainless steel, galvanized steel, and alloyed zinc (Zn—Al, Zn—Ni, Zn—Fe, etc.) plated steel; plastic materials such as various FRP, and resins such as polyethylene resin, polypropylene resin, acrylonitrile-butadiene-styrene (ABS) resin, polyamide resin, acrylic resin, vinylidene chloride resin, polycarbonate resin, polyurethane resin, and epoxy resin; inorganic materials such as glass, cement, and concrete; wood; fiber materials such as paper and cloth; and the like. Among these materials, the metal materials and the plastic materials are preferred.

The above object may be an object in which a surface treatment such as a phosphate treatment, a chromate treatment, and a complex oxide treatment has been applied to the above metal materials or metal surfaces of vehicle bodies molded from the metal materials. Further, the object may be an object in which an undercoat coating film and/or an intermediate coating film such as various electrodeposition coating compositions are/is formed on the metal surface.

The method for coating the coating composition in the present invention is not particularly limited, and examples thereof include air spray coating, airless spray coating, rotary atomization coating, curtain coating, and the like. A wet coating film can be formed by these coating methods. Among these methods, the air spray coating and the rotary atomization coating are preferred. If necessary, static electricity may be applied during coating.

The coating amount of the coating composition in the present invention is generally about 0.5 µm to about 50 µm, preferably about 2 µm to about 40 µm, more preferably about 5 µm to about 30 µm, and even more preferably about 8 µm to about 18 µm, in terms of a cured film thickness.

The curing of the wet coating film can be performed by heating the coating composition in the present invention applied to an object. The heating can be performed by a common heating means. For example, a drying furnace such as a hot air furnace, an electric furnace, or an infrared induction heating furnace may be used. The heating temperature is preferably about 60° C. to about 180° C., more preferably about 90° C. to about 170° C., and still more preferably about 110° C. to about 160° C. The heating time is not particularly limited, and is preferably about 10 minutes to about 60 minutes, more preferably about 20 minutes to about 40 minutes.

Before heat-curing the applied coating composition in the present invention, it is preferable to perform preheating, air blow, or the like under heating conditions at which the coating film is not substantially cured, from the viewpoint of preventing the occurrence of coating defects such as foaming. The preheating temperature is preferably about 40° C. to about 100° C. more preferably about 50° C. to about 90° C., and still more preferably about 60° C. to about 80° C. The preheating lime is preferably about 30 seconds to about 15 minutes, more preferably about 1 minute to about 10 minutes, and still more preferably about 2 minutes to about 5 minutes. In addition, the above air blow can be generally performed by blowing air, which is heated to room temperature or about 25° C. to 80° C., to a coated surface of the object for about 30 seconds to about 15 minutes.

As described above, the coating composition in the present invention contains 10 parts by mass to 50 parts by mass of flake-like aluminum pigments (B) based on 100 parts by mass of the binder component (A).

That is, the coating composition in the present invention contains a relatively large amount of the flake-like aluminum pigment (B) and contains the flake-like aluminum pigment (B) as a main pigment component, so that it is possible to form a coating film having a high flip-flop property and excellent brilliance.

A flip-flop value, at a thickness of 15 μm, of a cured coating film formed by the coating composition in the present invention is preferably within a range of 2.0 to 30.0.

The flip-flop value is more preferably 2.5 or more, still more preferably 3.5 or more, and particularly preferably 4.0 or more. In addition, the flip-flop value is more preferably 15.0 or less, still more preferably 11.0 or less, and particularly preferably 6.0 or less.

In the present description, a flip-flop value (hereinafter, may be referred to as "FF value") is referred to as a degree of change in the reflected light intensity when an observation angle (light receiving angle) is changed. The FF value is calculated based on the following formula using a L* value at a light receiving angle of 15° (L*15 value) and a L* value at a light receiving angle of 75° (L*75 value), which are measured by using a multi-angle spectrophotometer (trade name "MA-68II", manufactured by X-Rite). Specifically, the above L* value at a receiving angle of 15° (L*15 value) is a L* value of light received at an angle of 15° inclined from a specular reflection angle to a direction of measurement light, the measurement light being transmitted from an angle of 45° relative to an axis perpendicular to a surface to be measured, and the above L* value at a light receiving angle of 75° (L*75 value) is a L* value of light received at an angle of 75° inclined from a specular reflection angle to a direction of measurement light, the measurement light being transmitted similarly.

FF value=L*15 value/L*75 value

The larger the FF value is, the larger the change in the L* value (lightness) due to the observation angle (light receiving angle), which indicates that the flip-flop property is excellent.

A graininess value (G value), at a thickness of 15 μm, of the cured coating film (measured by BYK-mac, manufactured by BYK-Gardner) is preferably 5.0 or more, more preferably 5.0 to 10.0, still more preferably 6.0 to 10.0, and even more preferably 7.0 to 10.0.

This is preferred because, in the case where the graininess value (G value) is 5.0 or more, the particle feeling is high, and in the case where the graininess value (G value) is 10.0 or less, the occurrence of metallic unevenness is prevented, and distinctness of image is excellent.

[Method For Forming Multilayer Coating Film]

In the case where a multilayer coating film including a base coating film and a clear coating film is formed on the above object by a two-coat one-bake manner, the coating composition in the present invention may be used for forming a base coating film. The method for forming a coating film in this case can be performed in accordance with the following method I.

<Method I>

The method for forming the multilayer coating film includes:

(1) a step of applying the coating composition in the present invention to an object to form an uncured base coating film;

(2) a step of applying a clear coating composition (Y) to the above uncured base coating film to form an uncured clear coating film; and (3) a step of heating the above uncured base coating film and the above uncured clear coating film to simultaneously cure the two coating films.

The object in the above method 1 is preferably a vehicle body of an automobile on which an undercoat coating film and/or an intermediate coating film are/is formed. In addition, the above uncured coating film includes a coating film in a touch dry stale and a coating film in a semi-cured dry state.

In the case where the coating composition in the present invention is applied by the two-coat one-bake manner in the method I, a coating film thickness is about 0.5 μm to about 50 μm, preferably about 2 μm to about 40 μm, more preferably about 5 μm to about 30 μm, and still more preferably about 8 μm to about 18 μm, in terms of a cured film thickness.

The above uncured base coating film is generally formed by using one kind of base coaling composition, and may be formed by using two or more kinds of base coating compositions. In that case, the coating composition in the present invention may be used as a base coating composition for forming at least the uppermost base coating film.

In the case where two or more kinds of base coating compositions are used, two kinds of base coating compositions are preferably used.

Specifically, for example, a first base coating composition which may use the coating composition in the present invention is applied to an object to form a first base coating film, and then, a second base coating composition using the coating composition in the present invention is applied to the first base coating film to form a second base coating film.

In this case, from the viewpoint of the flip-flop property of the formed coating film, the above first base coating film has a thickness of 5 μm to 15 μm, preferably 7 μm to 13 μm, in terms of a cured film thickness, and further, the above second base coating film has a thickness of 0.5 μm to 8 μm, preferably 1 μm to 8 μm, and more preferably 2 μm to 6 μm, in terms of a cured film thickness.

In addition, a coaling film thickness of the above clear coaling composition (Y) is preferably about 10 μm to about 80 μm, and more preferably about 15 μm to about 60 μm, in terms of a cured Him thickness.

In the method I, after the application of the coating composition in the present invention, it is preferable to perform preheating, air blow, or the like under heating conditions at which the coating film is not substantially cured, from the viewpoint of preventing the occurrence of coating defects such as foaming. The preheating temperature is preferably about 40° C. to about 100° C., more preferably about 50° C. to about 90° C., and still more preferably about 60° C. to about 80° C. The preheating time is preferably about 30 seconds to about 15 minutes, more preferably about 1 minute to about 10 minutes, and still more preferably about 2 minutes to about 5 minutes. In addition, the above air blow can be generally performed by blowing air, which is heated to room temperature or about 25° C. to 80° C., to a coated surface of the object for about 30 seconds to about 15 minutes. After the application of the above clear coating composition (Y), if necessary, it is possible to set an interval of about 1 minute to about 60 minutes at room temperature or perform preheating at about 40° C. to about 80° C. for about 1 minute to about 60 minutes.

Curing of the coating film can be performed by the above-mentioned common heating means. The heating temperature is preferably about 60° C. to about 180° C., more preferably about 90° C. to about 170° C., and still more preferably about 110° C. to about 160° C. The heating time is preferably from about 10 minutes to about 60 minutes, and more preferably from about 20 minutes to about 40 minutes. By this heating, both the base coating film and the clear coating film can be cured simultaneously.

In the case where a multilayer coaling film including an intermediate coating film, a base coating film and a clear coating film is formed on an object such as a vehicle body of an automobile by a three-coat one-bake manner, the coating composition in the present invention may be suitably used for forming base coating film. The method for forming a coating film in this case can be performed in accordance with the following method II.

<Method II>

The method for forming the multilayer coating film includes:

(1) a step of applying an intermediate coating composition to an object to form an uncured intermediate coating film;

(2) a step of applying the coating composition in the present invention to the above uncured intermediate coating film to form an uncured base coating film;

(3) a step of applying a clear coating composition (Y) to the above uncured base coating film to form an uncured clear coating film; and (4) a step of heating the uncured intermediate coating film, the uncured base coating film, and the uncured clear coating film to simultaneously cure them.

In the above method II, the above method I, i.e. the method for forming the coating film, is performed on an uncured intermediate coating film. The object in the method II is preferably a vehicle body of an automobile on which an undercoat coating film is formed. The above undercoat coating film is preferably formed of an electrodeposition coating composition, and more preferably formed of a cationic elect redeposition coating composition.

In the method II, a coated film thickness of the intermediate coating composition is preferably about 10 µm to 60 µm, and more preferably about 20 µm to 40 µm, in terms of a cured film thickness. A coating film thickness of the coating composition in the present invention is about 0.5 µm to about 50 µm, preferably about 2 µm to about 40 µm, more preferably about 5 µm to about 30 µm, and still more preferably about 8 µm to about 18 µm, in terms of a cured film thickness. A coating film thickness of the clear coating composition (Y) is preferably about 10 µm to about 80 µm, and more preferably about 15 µm to about 60 µm, in terms of a cured film thickness.

In the method II, in the case where the coaling composition is used as the intermediate coating composition, it is preferable to perform preheating after the application of the coating composition. The preheating temperature is preferably about room temperature to about 100° C., more preferably about 40° C. to about 90° C., and still more preferably about 60° C. to about 80° C. The preheating time is preferably about 30 seconds to about 15 minutes, more preferably about 1 minute to about 10 minutes, and still more preferably about 2 minutes to about 5 minutes.

It is preferable to perform preheating after the application of the coating composition in the present invention. The preheating temperature is preferably about room temperature to about 100° C., more preferably about 40° C. to about 90° C., and still more preferably about 60° C. to about 80° C. The preheating time is preferably about 30 seconds to about 15 minutes, more preferably about 1 minute to about 10 minutes, and still more preferably about 2 minutes to about 5 minutes.

Also in the method II, the above uncured base coating film is generally formed by using one kind of a base coating composition, and may be formed by using two or more kinds of base coating compositions. In that case, the coating composition in the present invention may be used as a base coating composition for forming at least the uppermost base coating film.

In the case where two or more kinds of base coating compositions are used, two kinds of base coating compositions are preferably used.

After the application of the above clear coating composition (Y), if necessary, it is possible to set an interval of about 1 minute to about 60 minutes at room temperature or perform preheating at about 40° C. to about 80° C. for about 1 minute to about 60 minutes.

The curing of a three-layered coating film composed of an uncured intermediate coating film, an uncured base coating film, and an uncured clear coating film can be performed by the above common heating means. The heating temperature is preferably about 60° C. to about 180° C., more preferably about 90° C. to about 170° C., and still more preferably about 110° C. to about 160° C. The healing lime is preferably from about 10 minutes to about 60 minutes, and more preferably from about 20 minutes to about 40 minutes. By this heating, the three-layered coating film composed of the intermediate coating film, the base coating film, and the clear coating film can be cured simultaneously.

As the clear coating composition (Y) used in the above methods I and II, any common thermosetting clear coating composition used for coating a vehicle body of an automobile may be used. Examples of the thermosetting clear coating composition include base resin having crosslinkable functional groups, an organic solvent-based thermosetting coating composition containing a crosslinking agent, an aqueous thermosetting coating composition containing a crosslinking agent, a powder thermosetting coating composition containing a crosslinking agent, and the like.

Examples of the crosslinkable functional groups contained in the above base resin include carboxyl groups, hydroxyl groups, epoxy groups, silanol groups, and the like. Examples of the kind of the base resin include acrylic resins, polyester resins, alkyd resins, urethane resins, epoxy resins, fluororesins, and the like. Examples of the crosslinking agent include polyisocyanate compounds, blocked polyisocyanate compounds, melamine resins, urea resins, carboxyl group-containing compounds, carboxyl group-containing resins, epoxy group-containing resins, epoxy group-containing compounds, and the like.

The above clear coating composition may be a one-pack coating composition, or may be a multi-component coating composition such as a two-component urethane resin coating composition.

If necessary, the clear coating composition (Y) may contain a coloring pigment, a brilliant pigment, a dye, or the like, to such a degree that transparency is not inhibited, and further, may contain an extender pigment, an ultraviolet absorber, a light stabilizer, a defoamer, a thickener, a rust inhibitor, a surface conditioner, and the like, as appropriate.

The combination of the base resin/crosslinking agent in the clear coating composition (Y) is preferably a carboxyl group-containing resin/epoxy group-containing resin, a hydroxyl group-containing resin/polyisocyanate compound, a hydroxyl group-containing resin-blocked polyisocyanate compound, a hydroxyl group-containing resin/melamine resin, or the like. Among them, the combination of the hydroxyl group-containing resin/polyisocyanate compound is preferred from the viewpoint of the particle feeling of the formed coating film.

As the intermediate coating composition used in the above method II, any common thermosetting intermediate coating composition may be used. For example, a thermosetting coating composition which contains a base resin containing crosslinkable functional groups, a crosslinking agent, a coloring pigment, and an extender pigment may be preferably used.

Examples of the crosslinkable functional groups contained in the above base resin include carboxyl groups, hydroxyl groups, epoxy groups, and the like. Examples of the kind of the base resin include acrylic resins, polyester resins, alkyd resins, urethane resins, and the like. Examples of the crosslinking agent include melamine resins, polyisocyanate compounds, blocked polyisocyanate compounds, and the like.

As the intermediate coating composition, any one of an organic solvent-based coating composition, an aqueous coating composition, and a powder coating composition may be used. Among these coating compositions, the aqueous coating composition is preferably used.

In the above methods I and II, the coating can be applied by a common method such as air spray coating, airless spray coating, rotary atomization coating, or the like.

EXAMPLES

The present invention is specifically described by way of the follow ing examples, but the present invention is not limited thereto.

In Examples, "parts" and "%" mean mass basis unless otherwise specified.

The components used in each of the Examples are as follows.
[Binder component A]
<Hydroxyl Group-Containing Resin (A1)>
(Production of Hydroxyl Group-Containing Acrylic Resin (A1-1))

Production Example 1

128.0 Parts of deionized water and 2.0 parts of "Adecaria Soap SR-1025" (trade name, manufactured by ADEKA, emulsifier, active ingredient: 25%) were added to a reaction vessel equipped with a thermometer, a thermostat, a stirrer, a reflux condenser, a nitrogen inlet tube and a dropper, and stirred and mixed in a nitrogen stream, and the temperature was raised to 80° C.

Subsequently, a 1% portion of the total amount of the following monomer emulsion for the core part and 5.3 parts of 6% ammonium persulfate aqueous solutions were introduced into the reaction vessel, and the system was kept at 80° C. for 15 minutes. Then, the remainder of the monomer emulsion for the core part was added dropwise over three hours to the reaction vessel kept at the same temperature, and aging was performed for one hour after completion of the dropwise addition. Next, the following monomer emulsion for the shell part was added dropwise over one hour, and aging was performed for one hour, then the mixture was cooled to 30° C. while gradually adding 40.0 parts of 5% 2-(dimethylamino) ethanol aqueous solutions to the reaction vessel, and the obtained product was discharged while performing filtering with a 100-mesh nylon cloth, thereby obtaining a water dispersible hydroxyl group-containing acrylic resin (A1-1-1) dispersion having an average particle diameter of 100 nm and a solid content of 30%. The obtained water-dispersible hydroxyl group-containing acrylic resin (A1-1-1) had an acid value of 33 mgKOM/g and a hydroxyl value of 25 mgKOH/g.

Monomer emulsion for core part: 40.0 parts of deionized water. 2.8 parts of "Adecaria Soap SR-1025", 2.1 parts of methylene bisacrylamide, 2.8 parts of styrene, 16.1 parts of methyl methacrylate, 28.0 parts of ethyl acrylate, and 21.0 parts of n-butyl acrylate were mixed with stirring, thereby obtaining the monomer emulsion for the core part.

Monomer emulsion for shell part: 17.0 parts of deionized water, 1.2 parts of "Adecaria Soap SR-1025", 0.03 parts of ammonium persulfate, 3.0 parts of styrene, 5.1 parts of 2-hydroxyethyl acrylate, 5.1 parts of methacrylic acid, 6.0 parts of methyl methacrylate, 1.8 parts of ethyl acrylate, and 9.0 parts of n-butyl acrylate were mixed with stirring, thereby obtaining the monomer emulsion for the shell part.

Production Example 2

35.0 parts of propylene glycol monopropyl ether was added to a reaction vessel equipped with a thermometer, a thermostat, a stirrer, a reflux condenser, a nitrogen inlet tube and a dropper, and the temperature was raised to 85° C. Then, a mixture of 30.0 parts of methyl methacrylate, 20.0 parts of 2-ethylhexyl acrylate, 29.0 parts of n-butyl acrylate, 15.0 parts of 2-hydroxyethyl acrylate, 6.0 parts of acrylic acid, 15.0 parts of propylene glycol monopropyl ether, and 2.3 parts of 2,2'-azobis(2,4-dimethylvaleronitrile) was added dropwise to the reaction vessel kept at the same temperature over four hours, and after the completion of dropwise addition, the mixture was aged for one hour. Then, a mixture of 10.0 parts of propylene glycol monopropyl ether and 1.0 part of 2,2'-azobis(2,4-dimethylvaleronitrile) was added dropwise to the reaction vessel kept at the same temperature over one hour, and after the completion of dropwise addition, the mixture was aged for one hour. Thereafter, 7.4 parts of diethanolamine and 13.0 parts of propylene glycol monopropyl ether were further added, thereby obtaining a hydroxyl group-containing acrylic resin (A1-1-2) solution having a solid content of 55%. The obtained hydroxyl group-containing acrylic resin (A1-1-2) had an acid value of 47 mgKOH/g, a hydroxyl value of 72 mgKOH/g, and a weight average molecular weight of 58,000.

Production Example 3

A mixed solvent of 27.5 parts of methoxypropanol and 27.5 parts of isobutanol was put in a reaction vessel equipped with a thermometer, a thermostat, a stirrer, a reflux condenser, a nitrogen inlet tube and a dropper, followed by heating to 110° C., and then, 121.5 parts of mixtures containing 25.0 parts of styrene, 27.5 parts of n-butyl methacrylate, 20.0 parts of "Isostearyl Acrylate" (trade name, manufactured by Osaka Organic Chemical Industry, Ltd., branched higher alkyl acrylate), 7.5 parts of 4-hydroxybutyl acrylate, 15.0 parts of phosphate group-containing polymerizable monomers shown below, 12.5 parts of 2-methacryloyloxyethyl acid phosphate, 10.0 parts of isobutanol, and 4.0 parts of t-butyl peroxyoctanoate were added to the above mixed solvent over four hours, and further, a mixture containing 0.5 parts of t-butyl peroxyoctanoate and 20.0 parts of isopropanol was added dropwise over one hour. Then, the resulting mixture was aged with stirring for one hour, thereby obtaining an acrylic resin (A1-1-3) solution having a hydroxyl group and a phosphate group, which has a solid content of 50%. The obtained acrylic resin (A1-1-3) having a hydroxyl group and a phosphate group had an acid value of 83 mgKOH/g, a hydroxyl value of 29 mgKOH/g, and a weight average molecular weight of 10,000.

Phosphate group-containing polymerizable monomer: 57.5 parts of monobutyl phosphate and 41.0 parts of isobutanol were put in a reaction vessel equipped with a thermometer, a thermostat, a stirrer, a reflux condenser, a nitrogen inlet tube, and a dropper, and after raising the temperature to 90° C., 42.5 parts of glycidyl methacrylate were added dropwise over two hours. Then, the resulting mixture was further aged with stirring for one hour. Thereafter, 59.0 parts of isopropanol were added, thereby obtaining a phosphate group-containing polymerizable monomer solution having a solid content of 50%. An acid value of the obtained monomer was 285 mgKOH/g.

(Production of Hydroxyl Group-Containing Polyester Resin (A1-2))

Production Example 4

109.0 parts of trimethylolpropane, 141.0 parts of 1,6-hexanediol, 126.0 parts of 1,2-cyclohexanedicarboxylic anhydride, and 120.0 parts of adipic acid were added to a reaction vessel equipped with a thermometer, a thermostat, a stirrer, a reflux condenser, and a water separator, the temperature was raised from 160° C. to 230° C. over three hours, and then the mixture was allowed to react for condensation at 230° C. for four hours while distilling off the generated condensation water with the water separator. Next, in order to add carboxyl groups to the obtained condensation reaction product, 38.3 parts of trimellitic anhydride were added thereto and the mixture was allowed to react at 170° C. for 30 minutes, and then dilution was performed with 2-ethyl-1-hexanol, thereby obtaining a hydroxyl group-containing polyester resin (A1-2-1) solution having a solid content of 70%. The obtained polyester resin had an acid value of 46 mgKOH/g, a hydroxyl value of 150 mgKOH/g, and a number average molecular weight of 1,400.

<Curing Agent (A3)>
Melamine Resin: "Cymel 325" (manufactured by ALLNEX LTD., solid content of 80%)

[Flake-Like Aluminum Pigment (B) Having an Average Particle Diameter (d50) Within a Range of 18 µm to 25 µm]
[Flake-Like Pigment (C) Being Flake-Like Pigment Other Than Flake-Like Aluminum Pigment, and Having an Average Particle Diameter (d50) Within a Range of 8 µm to 30 µm]
(Production of Pigment Dispersion Containing Flake-Like Aluminum Pigment (B) and Flake-Like Pigment (C))

Production Example 5

A pigment dispersion (P-1) was obtained by uniformly mixing, in a stirring mixing vessel, 26.2 parts of "Alpaste MG600" (17.0 parts of solid contents) (trade name, manufactured by Toyo Aluminium K.K., aluminum pigment paste, average particle diameter (d50): 25 µm, average thickness: 0.40 µm, content of aluminum: 65%), 4.0 parts of "TWINCLE PEARL SXB-SO" (trade name, manufactured by Nihon Koken Kogyo Co., Ltd., synthetic mica pigment coated with titanium oxide, average particle diameter (d50): 13 µm, interference color: silver), 35.0 parts of 2-ethyl-1-hexanol, and 10.5 parts of acrylic resin (A1-1-3) solution (5.3 parts of solid contents) having a hydroxyl group and a phosphate group obtained in Production Example 3.

Production Examples 6 to 32

Pigment dispersions (P-2) to (P-28) were obtained in the same manner as in Production Example 5 except that the blending formulation in Production Example 5 was changed to those shown in Table 1 below.

TABLE 1

Unit of blending amount: part(s) by mass

| | | Production Examples | | | | | | | | |
|---|---|---|---|---|---|---|---|---|---|---|
| | Pigment dispersion | 5 P-1 | 6 P-2 | 7 P-3 | 8 P-4 | 9 P-5 | 10 P-6 | 11 P-7 | 12 P-8 | 13 P-9 |
| Flake-like aluminum pigment (B) | "Alpaste MG600" Average particle diameter (d50): 25 µm, average thickness: 0.40 µm | 26.2 | — | — | — | — | — | — | — | — |
| | "Alpaste TCR 2020" (Note 1) Average particle diameter (d50): 22 µm, average thickness: 0.67 µm | — | 21.8 | — | 15.4 | 7.7 | 15.4 | 32.1 | 44.9 | 57.7 |
| | "Alpaste TCR 2060"(Note 2) Average particle diameter (d50): 18 µm, average thickness: 0.40 µm | — | — | 22.7 | 6.7 | 13.3 | — | — | — | — |
| | "Alpaste MG-2020" (Note 3) Average particle diameter (d50): 29 µm, average thickness: 0.47 µm | — | — | — | — | — | — | — | — | — |
| | "Alpaste 7675NS" (Note 4) Average particle diameter (d50): 16 µm, average thickness: 0.21 µm | — | — | — | — | — | — | — | — | — |
| Flake-like pigment (C) | TWINCLE PEARL SXC-SO (Note 5) Average particle diameter (d50): 22 µm | — | — | — | — | — | — | — | — | — |
| | TWINCLE PEARL SXB-SO Average particle diameter (d50): 13 µm | 4.0 | 4.0 | 4.0 | 4.0 | 4.0 | 4.0 | 4.0 | 4.0 | 4.0 |
| | TWINCLE PEARL SXA (Note 6) Average particle diameter (d50): 9 µm | — | — | — | — | — | — | — | — | — |

TABLE 1-continued

Unit of blending amount: part(s) by mass

| | Pigment dispersion | Production Examples | | | | | | | | |
|---|---|---|---|---|---|---|---|---|---|---|
| | | 5<br>P-1 | 6<br>P-2 | 7<br>P-3 | 8<br>P-4 | 9<br>P-5 | 10<br>P-6 | 11<br>P-7 | 12<br>P-8 | 13<br>P-9 |
| | Magnapearl Exterior CFS 1103 (Note 7)<br>Average particle diameter (d50): 18 μm | — | — | — | — | — | — | — | — | — |
| | Xirallic T60-10 SW Crystal Silver (Note 8)<br>Average particle diameter (d50): 19 μm | — | — | — | — | — | — | — | — | — |
| | IRIODIN 602WNT (Note 9)<br>Average particle diameter (d50): 21 μm | — | — | — | — | — | — | — | — | — |
| | TWINCLE PEARL SXE (Note 10)<br>Average particle diameter (d50): 37 μm | — | — | — | — | — | — | — | — | — |
| | GRAPHITAN 7525 (Note 11)<br>Average particle diameter (d50): 4 μm | — | — | — | — | — | — | — | — | — |
| Organic solvent | 2-ethyl-1-hexanol | 35.0 | 35.0 | 35.0 | 35.0 | 35.0 | 35.0 | 35.0 | 40.0 | 40.0 |
| Binder component (A) | A1-1-3 | 10.5 | 10.5 | 10.5 | 10.5 | 10.0 | 8.0 | 14.5 | 20.0 | 24.0 |

TABLE 2

Unit of blending amount: part(s) by mass

| | Pigment dispersion | Production Examples | | | | | | | | |
|---|---|---|---|---|---|---|---|---|---|---|
| | | 14<br>P-10 | 15<br>P-11 | 16<br>P-12 | 17<br>P-13 | 18<br>P-14 | 19<br>P-15 | 20<br>P-16 | 21<br>P-17 | 22<br>P-18 |
| Flake-like aluminum pigment (B) | "Alpaste MG600"<br>Average particle diameter (d50): 25 μm, average thickness: 0.40 μm | — | — | — | — | — | — | — | — | — |
| | "Alpaste TCR 2020" (Note 1)<br>Average particle diameter (d50): 22 μm, average thickness: 0.67 μm | 15.4 | 15.4 | 15.4 | 15.4 | 15.4 | 15.4 | 15.4 | 15.4 | 15.4 |
| | "Alpaste TCR 2060"(Note 2)<br>Average particle diameter (d50): 18 μm, average thickness: 0.40 μm | 6.7 | 6.7 | 6.7 | 6.7 | 6.7 | 6.7 | 6.7 | 6.7 | 6.7 |
| | "Alpaste MG-2020" (Note 3)<br>Average particle diameter (d50): 29 μm, average thickness: 0.47 μm | | | | | | | | | |
| | "Alpaste 7675NS" (Note 4)<br>Average particle diameter (d50): 16 μm, average thickness: 0.21 μm | — | — | — | — | — | — | — | — | — |
| Flake-like pigment (C) | TWINCLE PEARL SXC-SO (Note 5)<br>Average particle diameter (d50): 22 μm | 4.0 | — | — | — | — | — | — | — | — |
| | TWINCLE PEARL SXB-SO<br>Average particle diameter (d50): 13 μm | — | — | — | — | — | 0.8 | 1.2 | 2.0 | 6.0 |
| | TWINCLE PEARL SXA (Note 6)<br>Average particle diameter (d50): 9 μm | — | 4.0 | — | — | — | — | — | — | — |
| | Magnapearl Exterior CFS 1103 (Note 7)<br>Average particle diameter (d50): 18 μm | — | — | 4.0 | — | — | — | — | — | — |
| | Xirallic T60-10 SW Crystal Silver (Note 8)<br>Average particle diameter (d50): 19 μm | — | — | — | 4.0 | — | — | — | — | — |
| | IRIODIN 602WNT (Note 9)<br>Average particle diameter (d50): 21 μm | — | — | — | — | 4.0 | — | — | — | — |
| | TWINCLE PEARL SXE (Note 10)<br>Average particle diameter (d50): 37 μm | | | | | | | | | |
| | GRAPHITAN 7525 (Note 11)<br>Average particle diameter (d50): 4 μm | | | | | | | | | |
| Organic solvent | 2-ethyl-1-hexanol | 35.0 | 35.0 | 35.0 | 35.0 | 35.0 | 35.0 | 35.0 | 35.0 | 35.0 |
| Binder component (A) | A1-1-3 | 10.5 | 10.5 | 10.5 | 10.5 | 10.5 | 8.9 | 9.1 | 9.5 | 11.5 |

TABLE 3

Unit of blending amount: part(s) by mass

| | Pigment dispersion | Production Examples | | | | | | | | | |
|---|---|---|---|---|---|---|---|---|---|---|---|
| | | 23 P-19 | 24 P-20 | 25 P-21 | 26 P-22 | 27 P-23 | 28 P-24 | 29 P-25 | 30 P-26 | 31 P-27 | 32 P-28 |
| Flake-like aluminum pigment (B) | "Alpaste MG600" Average particle diameter (d50): 25 μm, average thickness: 0.40 μm | — | — | — | — | — | — | — | — | — | — |
| | "Alpaste TCR 2020" (Note 1) Average particle diameter (d50): 22 μm, average thickness: 0.67 μm | 15.4 | — | — | 10.3 | 70.5 | 15.4 | 15.4 | 15.4 | 15.4 | 15.4 |
| | "Alpaste TCR 2060"(Note 2) Average particle diameter (d50): 18 μm, average thickness: 0.40 μm | 6.7 | — | — | — | — | 6.7 | 6.7 | 6.7 | 6.7 | 6.7 |
| | "Alpaste MG-2020" (Note 3) Average particle diameter (d50): 29 μm, average thickness: 0.47 μm | — | 25.4 | — | — | — | — | — | — | — | — |
| | "Alpaste 7675NS" (Note 4) Average particle diameter (d50): 16 μm, average thickness: 0.21 μm | — | — | 26.2 | — | — | — | — | — | — | — |
| Flake-like pigment (C) | TWINCLE PEARL SXC-SO (Note 5) Average particle diameter (d50): 22 μm | — | — | — | — | — | — | — | — | — | — |
| | TWINCLE PEARL SXB-SO Average particle diameter (d50): 13 μm | 8.0 | 4.0 | 4.0 | 4.0 | 4.0 | — | — | — | 0.3 | 12.0 |
| | TWINCLE PEARL SXA (Note 6) Average particle diameter (d50): 9 μm | — | — | — | — | — | — | — | — | — | — |
| | Magnapearl Exterior CFS 1103 (Note 7) Average particle diameter (d50): 18 μm | — | — | — | — | — | — | — | — | — | — |
| | Xirallic T60-10 SW Crystal Silver (Note 8) Average particle diameter (d50): 19 μm | — | — | — | — | — | — | — | — | — | — |
| | IRIODIN 602WNT (Note 9) Average particle diameter (d50): 21 μm | — | — | — | — | — | — | — | — | — | — |
| | TWINCLE PEARL SXE (Note 10) Average particle diameter (d50): 37 μm | — | — | — | — | — | — | 4.0 | — | — | — |
| | GRAPHITAN 7525 (Note 11) Average particle diameter (d50): 4 μm | — | — | — | — | — | — | — | 4.0 | — | — |
| Organic solvent | 2-ethyl-1-hexanol | 35.0 | 35.0 | 35.0 | 35.0 | 40.0 | 35.0 | 35.0 | 35.0 | 35.0 | 35.0 |
| Binder component (A) | A1-1-3 | 12.5 | 10.5 | 10.5 | 6.0 | 28.0 | 8.5 | 10.5 | 10.5 | 8.7 | 14.5 |

The pigments of (Note 1) to (Note 11) in Tables 1 to 3 were as follows.

(Note 1) "Alpaste TCR 2020": trade name, manufactured by Toyo Aluminium K.K. aluminum pigment paste, average particle diameter (d50); 22 μm, average thickness: 0.67 μm, content of aluminum: 78%

(Note 2) "Alpaste TCR 2060": trade name, manufactured by Toyo Aluminium K.K., aluminum pigment paste, average particle diameter (d50): 18 μm, average thickness: 0.40 μm, content of aluminum: 75%

(Note 3) "Alpaste MG-2020": trade name, manufactured by Toyo Aluminium K.K., aluminum pigment paste, average particle diameter (d50): 29 μm, average thickness: 0.47 μm, content of aluminum: 67%

(Note 4) "Alpaste 7675NS": trade name, manufactured by Toyo Aluminium K.K. aluminum pigment paste, average particle diameter (d50): 16 μm, average thickness: 0.21 μm, content of aluminum: 65%

(Note 5) "TWINCLE PEARL SXC-SO": trade name, manufactured by Nihon Koken Kogyo Co., Ltd., synthetic mica pigment coated with titanium oxide, average particle diameter (d50): 22 μm, interference color: silver (Note 6) "TWINCLE PEARL SXA": trade name, manufactured by Nihon Koken Kogyo Co., Ltd., synthetic mica pigment coated with titanium oxide, average particle diameter (d50): 9 μm, interference color: silver (Note 7) "Magnapearl Exterior CPS 1103": trade name, manufactured by BASF, natural mica pigment coated with titanium oxide, average particle diameter (d50): 18 μm, interference color: silver (Note 8) "Xirallic T60-10 SW Crystal Silver": trade name, manufactured by Merck KGaA, aluminum oxide pigment coated with titanium oxide, average particle diameter (d50): 19 μm, interference color: silver (Note 9) "IRIODIN 602WNT": trade name, manufactured by Merck KGaA, mica pigment coated with titanium oxide and iron oxide, average particle diameter (d50): 21 μm, interference color: gray (Note 10) "TWINCLE PEARL SXE": trade name, manufactured by Nihon Koken Kogyo Co., Ltd. synthetic mica pigment coated with titanium oxide, average particle diameter (d50): 37 μm, interference color: silver (Note 11) "GRAPHITAN 7525": trade name, manufactured by BASF, graphite flake pigment, average particle diameter (d50): 4 μm

[(Another Component CD)]
(Production of Pigment Dispersion)

Production Example 33

18.2 parts of the hydroxyl group-containing acrylic resin (A1-1-2) solution (10.0 parts of solid contents) obtained in Production Example 2, 50.0 parts of "JR-806" (trade name, manufactured by Tayca Corporation, rutile titanium dioxide), and 30.0 parts of deionized water were put in a stirring mixing vessel and mixed uniformly, and then, 2-(dimethylamino)ethanol was added thereto, and pH was adjusted to 8.0. Next, the obtained mixed liquid was put in a wide-mouth glass bottle with a capacity of 225 mL, and glass beads with a diameter of about 1.3 mmφ were added thereto as a dispersion media, followed by sealing the glass bottle. The mixed liquid was dispersed for four hours in a paint shaker, thereby obtaining a pigment dispersion (D1).

Example 1

In a stirring mixing vessel, 100.0 parts of the water-dispersible hydroxyl group-containing acrylic resin (A1-1-1) aqueous dispersion (30.0 parts of solid contents) obtained in Production Example 1, 17.7 parts of the hydroxyl group-containing acrylic resin (A1-1-2) solution (9.7 parts of solid contents) obtained in Production Example 2, 35.7 parts of the hydroxyl group-containing polyester resin (A1-2-1) solution (25.0 parts of solid contents) obtained in Production Example 4, 37.5 parts of melamine resin (30.0 parts of solid contents) (trade name "Cymel 325", manufactured by ALLNEX LTD., solid content: 80%), 75.7 parts of the pigment dispersion (P-1) obtained in Production Example 5, and 0.3 parts of the pigment dispersion (D1) obtained in Production Example 33 were uniformly mixed, followed by adding polyacrylic acid thickener (trade name "Primer ASE-60", manufactured by Rohm and Haas Company), 2-(dimethylamino)ethanol, and deionized water thereto, thereby obtaining a coating composition (X1) having a pH of 8.0. a solid content of the coating composition being 25%, and a viscosity of 40 seconds measured by Ford Cup No. 4 at 20° C.
[Preparation of Test Coated Plate]
(Preparation of Test Object)

A thermosetting epoxy resin-based cationic electrodeposition coating composition (trade name "ELECRON GT-10", manufactured by Kansai Paint Co., Ltd.) was electrodeposition-applied to a cold rolled steel plate subjected to zinc phosphate treatment so as to have a thickness of 20 μm, and was cured by heating at 170° C. for 30 minutes. Next, an intermediate coating composition (trade name "TP-65-2", manufactured by Kansai Paint Co., Ltd., polyester resin/amino resin based organic solvent-based coating composition) was applied to this electrodeposition coating film so as to have a thickness of 35 μm, and was cured by heating at 140° C. for 30 minutes. Thus, a test object (1) in which an electrodeposition coating film and an intermediate coating film were formed on/above a steel plate was prepared.
(Formation of Coating Film)

The coating composition (X1) was used as a coating composition for forming base coat in the two-coat one-bake manner of the above method I for forming a coating film to form a multilayer coating film including a base coat and a clear coat, on/above the test object (1) obtained as described above.

Namely, the coating composition (X1) was electrostatic-applied to the test object (1) obtained as described above by using a rotary atomizing electrostatic coating machine, so as to have a thickness of 7.5 μm, thereby forming a first base coating film.

After allowing it to stand for one minute, the coating composition (X1) was electrostatic-applied to the first base coating film by using a rotary atomizing electrostatic coating machine, so as to have a thickness of 7.5 μm, thereby forming a second base coating film.

After allowing it to stand for three minutes, preheating was performed at 80° C. for three minutes, and then, an acrylic resin organic solvent-based overcoat clear coating composition (Y1) (trade name "Magicron KINO-1210", manufactured by Kansai Paint Co., Ltd., base resin/crosslinking agent: a combination of carboxyl group-containing resin/epoxy group-containing resin) was electrostatic-applied to the second base coating film by using a rotary atomizing electrostatic coating machine, so as to have a cured film thickness of 35 μm, thereby forming a clear coating film. After allowing it to stand for seven minutes, heating was performed at 140° C. for 30 minutes, and the above base coating film and the clear coating film were cured simultaneously, thereby preparing a test coated plate.

The obtained test coated plate was used for performing the following evaluation test. The results are shown in Table 4.

Examples 2 to 7, Examples 10 to 20, Comparative Examples 1 to 3, and Comparative Examples 5 to 9

Test coaled plates were prepared in the same manner as in Example 1 except that the coating composition (X1) was changed to coating compositions (X2) to (X7), (X10) to (X20), (X21) to (X23), and (X25) to (X29) which were prepared by blending formulations in Tables 4 to 6, and the test coated plates were subjected to the following evaluation tests. The results are shown in Tables 4 to 6.

Example 8

The coating composition (X30) obtained in the following Production Example 34 was electrostatic-applied to the test object (1) obtained in Example 1 by using a rotary atomizing electrostatic coating machine, so as to have a thickness of 10 μm, thereby forming a first base coating film.

After allowing it to stand for one minute, the coating composition (X8) prepared by the blending formulation in Table 4 was electrostatic-applied to the first base coating film by using a rotary atomizing electrostatic coating machine, so as to have a thickness of 5 μm, thereby forming a second base coating film.

After allowing it to stand for three minutes, preheating was performed at 80° C. for three minutes, and then, an acrylic resin organic solvent-based overcoat clear coating composition (Y1) (trade name "Magicron KINO-1210", manufactured by Kansai Paint Co. Ltd.) was electrostatic-applied to the second base coating film by using a rotary atomizing electrostatic coating machine, so as to have a cured film thickness of 35 μm, thereby forming a clear coating film. After allowing it to stand for seven minutes, heating was performed at 140° C. for 30 minutes, and the above base coating film and the clear coating film were cured simultaneously, thereby preparing a test coated plate.

The obtained test coated plate was used for performing the following evaluation test. The results are shown in Table 4.

Production Example 34

An aluminum pigment dispersion (P-29) was obtained by uniformly mixing, in a stirring mixing vessel, 12.8 parts of "Alpaste TCR2020" (10.0 parts of solid contents) (trade name, manufactured by Toyo Aluminium K.K., aluminum pigment paste, average particle diameter (d50): 22 μm, average thickness: 0.67 μm, content of aluminum: 78%), 35.0 parts of 2-ethyl-1-hexanol, and 5.0 parts of acrylic resin (A1-1-3) solution (2.5 parts of solid contents) having a hydroxyl group and a phosphate group obtained in Production Example 3.

Next, in another stirring mixing vessel, 100.0 parts of the water-dispersible hydroxyl group-containing acrylic resin (A1-1-1) aqueous dispersion (30.0 parts of solid contents) obtained in Production Example 1, 22.7 parts of the hydroxyl group-containing acrylic resin (A1-1-2) solution (12.5 parts of solid contents) obtained in Production Example 2, 35.7 parts of the hydroxyl group-containing polyester resin (A1-2-1) solution (25.0 parts of solid contents) obtained in Production Example 4, 37.5 parts of melamine resin (30.0 parts of solid contents) (trade name "Cymel 325", manufactured by ALLNEX LTD., solid content: 80%), 52.8 parts of the flake-like aluminum pigment dispersion (P-29) and 0.3 parts of the pigment dispersion (D1) obtained in Production Example 33 were uniformly mixed, followed by adding polyacrylic acid thickener (trade name "Primer ASE-60", manufactured by Rohm and Haas Company), 2-(dimethylamino)ethanol, and deionized water thereto, thereby obtaining a coating composition (X30) having a solid content of the coating composition being 30% and a viscosity of 40 seconds measured by Ford Cup No. 4 at 20° C.

Example 9

A test coated plate was prepared in the same manner as in Example 8 except that the coating composition (X8) was changed to a coating composition (X9) prepared by the blending formulation in Table 4, and the test coated plate was subjected to the following evaluation tests. The results are shown in Table 4.

Comparative Example 4

A test coated plate was prepared in the same manner as in Example 8 except that the coating composition (X8) was changed to a coating composition (X24) prepared by the blending formulation in Table 6, and the test coated plate was subjected to the following evaluation tests. The results are shown in Table 6.

The viscosities, measured by Ford Cup No. 4 at 20° C. of the coating compositions (X2) to (X29) were 40 seconds.

Example 21

A test coated plate was prepared in the same manner as in Example 1 except that the coaling composition (X1) was changed to a coating composition (X31) obtained in the following Production Example 35, and the test coated plate was subjected to the following evaluation tests. The results are shown in Table 7.

Production Example 35

In a stirring mixing vessel, 100.0 parts of the water-dispersible hydroxyl group-containing acrylic resin (A1-1-1) aqueous dispersion (30.0 parts of solid contents) obtained in Production Example 1, 17.7 parts of the hydroxyl group-containing acrylic resin (A1-1-2) solution (9.7 parts of solid contents) obtained in Production Example 2, 35.7 parts of the hydroxyl group-containing polyester resin (A1-2-1) solution (25.0 parts of solid contents) obtained in Production Example 4, 37.5 parts of melamine resin (30.0parts of solid contents) (trade name "Cymel 325", manufactured by ALLNEX LTD., solid content: 80%), 75.7 parts of the pigment dispersion (P-1) obtained in Production Example 5, 0.3 parts of the pigment dispersion (D1) obtained in Production Example 33, and 10.0 parts of the pigment dispersion (D2) (1 part of solid content) obtained in the following Production Example 36 were uniformly mixed, followed by adding polyacrylic acid thickener (trade name "Primer ASE-60", manufactured by Rohm and Haas Company), 2-(dimethylamino)ethanol, and deionized water thereto, thereby obtaining a coating composition (X31) having a pH of 8.0, a solid content of the coating composition being 25%, and a viscosity of 40 seconds measured by Ford Cup No. 4 at 20° C.

Production Example 36

1 part of "ACEMATT OK607" (trade name, manufactured by Evonik, ltd, silica) and 9 parts of deionized water were uniformly mixed, thereby obtaining the pigment dispersion (D2).

Examples 22 to 23

Test coated plates were prepared in the same manner as in Example 21 except that the coaling composition (X31) was changed to coating compositions (X32) and (X33) prepared by the blending formulation in Table 7, and the test coated plates were subjected to the following evaluation tests. The results are shown in Table 7.

Example 24

A test coated plate was prepared in the same manner as in Example 10 except that the clear coating composition (Y1) was changed to a clear coating composition (Y2) obtained in the following Production Example 37., and the temperature of heating the clear coating film after allowing it to stand for seven minutes was changed to 120° C., and the test coated plate was subjected to the following evaluation tests. The results are shown in Table 7.

Production Example 37

27 parts of "Swasol 1000" (trade name, manufactured by Cosmo Oil Co. Ltd., aromatic organic solvent) and 5 parts of propylene glycol monomethyl ether acetate were added to a reaction vessel equipped with a thermometer, a thermostat, a stirrer, a reflux condenser, a nitrogen inlet tube and a dropper, the mixture was stirred at 150° C. while blowing a nitrogen gas to the reaction vessel, and a monomer mixture including 20 parts of styrene, 32.5 parts of 2-hydroxypropyl acrylate, 46.8 parts of isobutyl methacrylate, 0.7 parts of acrylic acid, and 6.0 parts of di-tert-amylperoxide (polymerization initiator) was added dropwise to the reaction vessel at a uniform speed over four hours. Thereafter, the mixture obtained above was aged at 150° C. for one hour and then was cooled, and further, 21 parts of isobutyl acetate was added thereto, followed by dilution, thereby obtaining a hydroxyl group-containing acrylic resin (y-1) solution having a solid content of 65 mass %. The obtained hydroxyl group-containing acrylic resin (y-1) had a hydroxyl value of 139 mgKOH/g, an acid value of 5.5 mgKOH/g, a weight average molecular weight of 5,500, and a glass-transition temperature of 38° C.

A main ingredient obtained by uniformly mixing 100 parts of the hydroxyl group-containing acrylic resin (y-1) solution (65 parts of solid contents) obtained as described above and 0.4 parts of "BYK-300" (0.2 parts of solid contents) (trade name, manufactured by BYK, surface conditioner, active ingredient: 52%) was uniformly mixed with 35 parts of a crosslinking agent "Sumidur N3300" (trade name, manufactured by Sumika Covestro Urethane Co., Ltd., isocyanurate of hexamethylene diisocyanate, solid content: 100%) immediately before the coating, and further, butyl acetate was added thereto to adjust the viscosity measured by ford Cup No. 4 at 20° C. to 30 seconds, thereby obtaining a clear coating composition (Y2).

Examples 25 to 27

Test coated plates were prepared in the same manner as in Example 24 except that the coating composition (X10) was changed to coating compositions (X31) to (X33) prepared by the blending formulation in Table 7, and the test coated plates were subjected to the following evaluation tests. The results are shown in Table 7.

Production Example 38

15 parts of ethyl-3-ethoxypropionate and 15 parts of n-butyl propionate were added to a reaction vessel equipped with a thermometer, a thermostat, a stirrer, a reflux condenser, a nitrogen inlet tube, and a dropper, and the temperature was raised to 155° C. Then, a monomer mixture including 10 parts of styrene, 20 parts of methyl methacrylate, 30 parts of isobornyl acrylate, 20 parts of 2-ethylhexyl acrylate, 20 parts of 2-hydroxyethyl acrylate, and 4.5 parts of 2.2-di(t-amyl peroxy) butane (polymerization initiator) was added dropwise to the reaction vessel over five hours, and after the completion of dropwise addition, the mixture was aged for two hours, thereby obtaining a hydroxyl group-containing acrylic resin (A1-1-4) solution having a solid content of 75%. The obtained hydroxyl group-containing acrylic resin had a hydroxyl value of 97 mgKOH/g and a weight average molecular weight of 5,500.

Production Example 39

26.6 parts of the hydroxyl group-containing acrylic resin (A1-1-4) solution (20 parts of resin solid contents) obtained in Production Example 38, 40 parts of "JR-806" (trade name, manufactured by Tayca Corporation, rutile titanium dioxide), and 15 parts of xylene were put in a wide-mouth glass bottle, glass beads were added, followed by sealing the glass bottle, and the mixture was dispersed by a paint shaker for 30 minutes. Then, the glass beads were removed, and a pigment dispersion (D3) was obtained.

Production Example 40

1 part of "ACBMATT OK607" (trade name, manufactured by Evonik, Ltd., silica) and 9 parts of toluene were uniformly mixed, thereby obtaining a pigment dispersion (D4).

Example 28

A test coated plate was prepared in the same manner as in Example 24 except that the coating composition (X10) was changed to a coaling composition (X35) obtained in the following Production Example 41, the time of allowing it to stand after the formation of the second base coating film was changed to five minutes, and preheating was not performed. The test coated plate was subjected to the following evaluation tests. The results are shown in Table 8.

Production Example 41

93.3 parts of the hydroxyl group-containing acrylic resin (A1-1-4) solution (70 parts of resin solid contents) obtained in Production Example 38, 37.5 parts of "Cymel 325" (30 parts of solid contents) (melamine resin, manufactured by ALLNEX LTD., solid content: 80%), 26.2 parts of "Alpaste MG600" (17.0 parts of solid contents) (trade name, manufactured by Toyo Aluminium K.K., aluminum pigment paste, average particle diameter (d50): 25 μm, average thickness: 0.40 μm, content of aluminum: 65%), 4.0 parts of "TWINCLE PEARL SXB-SO" (trade name, manufactured by Nihon Koken Kogyo Co. Ltd., synthetic mica pigment coated with titanium oxide, average particle diameter (d50): 13 μm, interference color: silver), 0.3 parts of the pigment dispersion (D3) obtained in Production Example 39, and 10.0 parts of the pigment dispersion (D4) (1 part of solid content) obtained in Production Example 40 were uniformly mixed. Next, a mixed solvent of xylene and Swasol 1000 (trade name, manufactured by Cosmo Oil Co., Ltd. petroleum aromatic hydrocarbon-based solvent) with a mass ratio of xylene to Swasol 1000 being 50/50 was added to the above mixture, thereby obtaining a coaling composition (X35) having a viscosity of 17 seconds measured by Ford Cup No. 3 at 20° C.

Example 29

A test coated plate was prepared in the same manner as in Example 28 except that the coaling composition (X35) was changed to a coating composition (X36) obtained in the following Production Example 42, and the test coated plate was subjected to the following evaluation tests. The results are shown in Table 8.

Production Example 42

93.3 parts of the hydroxyl group-containing acrylic resin (A1-1-4) solution (70 parts of resin solid contents) obtained in Production Example 38, 37.5 parts of "Cymel 325" (30 parts of solid contents) (melamine resin, manufactured by ALLNEX LTD., solid content: 80%), 22.7 parts of "Alpaste TCR2060" (17.0 parts of sol id contents) (trade name, manufactured by Toyo Aluminium K.K., aluminum pigment paste, average particle diameter (d50): 18 μm, average thickness: 0.40 μm, content of aluminum: 75%), 4.0 parts of "TWINCLE PEARL SXB-SO" (trade name, manufactured by Nihon Koken Kogyo Co., Ltd., synthetic mica pigment coated with titanium oxide, average particle diameter (d50): 13 μm, interference color: silver), 0.3 parts of the pigment dispersion (D3) obtained in Production Example 39, and 10.0 parts of the pigment dispersion (D4) (1 part of solid content) obtained in Production Example 40 were uniformly mixed. Next, a mixed solvent of xylene and Swasol 1000 (trade name, manufactured by Cosmo Oil Co., Ltd. petroleum aromatic hydrocarbon-based solvent) with a mass ratio of xylene to Swasol 1000 being 50/50 was added to the above mixture, thereby obtaining a coating composition (X36) having a viscosity of 17 seconds measured by Ford Cup No. 3 at 20° C.

Example 30

A test coated plate was prepared in the same manner as in Example 28 except that the coating composition (X35) was changed to a coating composition (X37) obtained in the following Production Example 43, and the test coaled plate was subjected to the following evaluation tests. The results are shown in Table 8.

Production Example 43

93.3 parts of the hydroxyl group-containing acrylic resin (A1-1-4) solution (70 parts of resin solid contents) obtained in Production Example 38, 37.5 parts of "Cymel 325" (30 parts of solid contents) (melamine resin, manufactured by ALLNEX LTD., solid content: 80%). 15.4 parts of "Alpaste TCR2020" (12.0 parts of solid contents) (trade name, manufactured by Toyo Aluminium K.K. aluminum pigment paste, average particle diameter (d50): 22 μm, average thickness: 0.67 μm, content of aluminum: 78%), 6.7 parts of "Alpaste TCR2060" (5.0 parts of solid contents) (trade name, manufactured by Toyo Aluminium K.K., aluminum pigment paste, average particle diameter (d50): 18 μm, average thickness: 0.40 m, content of aluminum: 75%). 4.0 parts of "TWINCLE PEARL SXC-SO" (trade name, manufactured by Nihon Koken Kogyo Co. Ltd., synthetic mica pigment coate with titanium oxide, average particle diameter (d50): 22 μm, interference color: silver), 0.3 parts of the pigment dispersion (D3) obtained in Production Example 39, and 10.0 parts of the pigment dispersion (D4) (1 part of solid content) obtained in Production Example 40 were uniformly mixed. Next, a mixed solvent of xylene and Swasol 1000 (trade name, manufactured by Cosmo Oil Co. Ltd., petroleum aromatic hydrocarbon-based solvent) with a mass ratio of xylene to Swasol 1000 being 50/50 was added to the above mixture, thereby obtaining a coating composition (X37) having a viscosity of 17 seconds measured by Ford Cup No. 3 at 20° C.

Examples 31 to 33

Test coated plates were prepared in the same manner as in Examples 28 to 30 except that the clear coating composition (Y2) was changed to the clear coating composition (Y1) and the temperature of heating the clear coating film after allowing it to stand for seven minutes was changed to 140° C., and the test coated plates were subjected to the following evaluation tests. The results are shown in Table 8.

Examples 34 to 36

Test coated plates were prepared in the same manner as in Examples 31 to 33 except that the clear coating composition (Y1) was changed to a clear coating composition (Y3) obtained in the following Production Example 44, and the test coated plates were subjected to the following evaluation tests. The results are shown in Table 8.

Production Example 44

100 parts of the hydroxyl group-containing acrylic resin (y-1) solution (65 parts of solid contents) obtained in Production Example 37, 58 parts of "Urban 20SE60" (35 parts of solid contents) (trade name, manufactured by Mitsui Chemicals, Inc., melamine resin, solid content: 60%), and 0.4 parts of "BYK-300" (0.2 parts of solid contents) were uniformly mixed, and further, butyl acetate was added thereto to adjust the viscosity measured by Ford Cup No. 4 at 20° C. to 30 seconds, thereby obtaining a clear coating composition (Y3).

Comparative Example 10

A test coated plate was prepared in the same manner as in Comparative Example 5 except that the clear coating composition (Y1) was changed to the clear coating composition (Y2) obtained in Production Example 37, and the temperature of heating the clear coating film after allowing it to stand for seven minutes was changed to 120° C., and the test coated plate was subjected to the following evaluation tests. The results are shown in Table 9.

Comparative Example 11

A test coated plate was prepared in the same manner as in Example 28 except that the coating composition (X35) was changed to a coating composition (X38) obtained in the following Production Example 45, and the test coated plate was subjected to the following evaluation tests. The results are shown in Table 9.

Production Example 45

93.3 parts of the hydroxyl group-containing acrylic resin (A1-1-4) solution (70 parts of resin solid contents) obtained in Production Example 38, 37.5 parts of "Cymel 325" (30 parts of solid contents) (melamine resin, manufactured by ALLNEX LTD., solid content: 80%), 15.4 parts of "Alpaste TCR2020" (12.0 parts of solid contents) (trade name, manufactured by Toyo Aluminium K.K., aluminum pigment paste, average particle diameter (d50): 22 μm, average thickness: 0.67 μm, content of aluminum: 78%), 6.7 parts of "Alpaste TCR2060" (5.0 parts of solid contents) (trade name, manufactured by Toyo Aluminium K.K. aluminum pigment paste, average particle diameter (d50): 18 μm, average thickness: 0.40 μm, content of aluminum: 75%), 0.3 parts of the pigment dispersion (D3) obtained in Production Example 39, and 10.0 parts of the pigment dispersion (D4) (1 part of solid content) obtained in Production Example 40 were uniformly mixed. Next, a mixed solvent of xylene and Swasol 1000 (trade name, manufactured by Cosmo Oil Co., Ltd, petroleum aromatic hydrocarbon-based solvent) with a mass ratio of xylene to Swasol 1000 being 50/50 was added to the above mixture, thereby obtaining a coating composition (X38) having a viscosity of 17 seconds measured by Ford Cup No. 3 at 20° C.

Comparative Example 12

A test coated plate was prepared in the same manner as in Comparative Example 11 except that the clear coating composition (Y2) was changed to the clear coaling composition (Y1) and the temperature of heating the clear coating film after allowing it to stand for seven minutes was changed to 140° C., and the test coated plate w as subjected to the following evaluation tests. The results are shown in Table 9.

Comparative Example 13

A test coated plate was prepared in the same manner as in Comparative Example 12 except that the clear coating composition (Y1) was changed to the clear coating composition (Y3), and the test coated plate was subjected to the following evaluation tests. The results are shown in Table 9.

Example 37

A coating composition (X1) was chained in the same manner as in Example 1.
[Preparation of Test Coated Plate]
(Preparation of Test Object)
A thermosetting epoxy resin-based cationic electrodeposition coating composition (trade name "ELECRON GT-10", manufactured by Kansai Paint Co., Ltd.) was electrodeposition-applied to a cold rolled steel plate subjected to zinc phosphate treatment so as to have a thickness of 20 μm, and was cured by heating at 170° C. for 30 minutes. Next, an aqueous intermediate coating composition a obtained in the following Production Example 46 was applied to this electrodeposition coaling film so as to have a thickness of 20 μm, followed by allowing it to stand for two minutes, and then preheating was performed at 80° C. for three minutes. Thus, a test object (2) in which a cured electrodeposition coaling film and an uncured intermediate coaling film were formed on/above a steel plate was prepared.

(Formation of Coating Film)

The coating composition (X1) was used as a coating composition for forming base coat in the three-coat one-bake manner of the above method II for forming a coating film, thereby forming a multilayer coaling film including a base coat and a clear coat on/above the test object (2) obtained as described above.

Namely, the coating composition (X1) was electrostatic-applied to the test object (2) obtained as described above by using a rotary atomizing electrostatic coating machine, so as to have a thickness of 7.5 µm, thereby forming a first base coating film.

After allowing it to stand for one minute, the coating composition (X1) was electrostatic-applied to the first base coating film by using a rotary atomizing electrostatic coating machine, so as to have a thickness of 7.5 µm, thereby forming a second base coating film.

After allowing it to stand for three minutes, preheating was performed at 80° C. for three minutes, and then, an acrylic resin organic solvent-based overcoat clear coating composition (Y1) (trade name "Magicron KINO-1210", manufactured by Kansai Paint Co., Ltd.) was electrostatic-applied to the second base coating film by using a rotary atomizing electrostatic coating machine, so as to have a cured film thickness of 35 µm, thereby forming a clear coating film. After allowing it to stand for seven minutes, heating was performed at 140° C. for 30 minutes, and the above base coating film and the clear coating Film were cured simultaneously, thereby preparing a test coated plate.

The obtained test coated plate was used for performing the following evaluation test. The results are shown in Table 10.

Production Example 46

174 parts of trimethylolpropane, 327 parts of neopentyl glycol, 352 parts of adipic acid, 109 parts of isophthalic acid, and 101 parts of 1,2-cyclohexanedicarboxylic anhydride were added to a reaction vessel equipped with a thermometer, a thermostat, a stirrer, a reflux condenser, and a water separator, the temperature was raised from 160° C. to 230° C. over three hours, and then the mixture was allowed to react at a temperature kept at 230° C. until an acid value was equal to or less than 3 mgKOH/g while distilling off the generated condensation water with the water separator. 59 parts of trimellitic anhydride was added to this reaction product, and an addition reaction was performed at 170° C. for 30 minutes, then the resulting product was cooled to 50° C. or less, and neutralization is performed by adding 2-(dimethylamino)ethanol in an amount equivalent to the acid group, followed by adding deionized water slowly, thereby obtaining a hydroxyl group-containing polyester resin (A1-2-2) solution having a solid content concentration of 45% and a pH of 7.2. The obtained hydroxyl group-containing polyester resin had an acid value of 35 mgKOH/g, a hydroxyl value of 128 mgKOH/g, and a weight average molecular weight of 13,000.

56 parts of the hydroxyl group-containing polyester resin (A1-2-2) solution (25 parts of solid contents) obtained as described above, 90 parts of "JR-806" (manufactured by Tayca Corporation, trade name, rutile titanium dioxide), and 5 parts of deionized water were put in a stirring mixing vessel, and then, 2-(dimethylamino)ethanol was added thereto, and pH of the mixture was adjusted to 8.0. Next, the obtained mixed liquid was put in a wide-mouth glass bottle, and glass beads with a diameter of about 1.3 mmφ were added thereto as a dispersion media, followed by sealing the glass bottle. The mixed liquid was dispersed for 30 minutes by a paint shaker, thereby obtaining a white pigment dispersion (P-100).

Next, 151 parts of the white pigment dispersion (P-100) obtained as described above, 27 parts of the hydroxyl group-containing acrylic resin (A1-1-2) solution (15 parts of resin solid contents) obtained in Production Example 2, 11 parts of the hydroxyl group-containing polyester resin (A1-2-1) solution (5 parts of resin solid contents) obtained in Production Example 4, 43 parts of "U Coat UX-8100" (15 parts of resin solid contents) (trade name, manufactured by Sanyo Chemical Industries, Ltd., urethane emulsion, solid content: 35%), 37.5 parts of "Cymel 325" (30 parts of resin solid contents) (trade name, manufactured by ALLNEX, melamine resin, solid content: 80%), and 26 parts of "Bayhydur VPLS2310" (10 parts of resin solid contents) (trade name, manufactured by Sumika Bayer Urethane Co., Ltd., blocked polyisocyanate compound, solid content: 38%) were uniformly mixed.

Next, to the obtained mixture, "PRIMAL ASE-60" (trade name, manufactured by Dow Chemical, thickener), 2-(dimethylamino)ethanol, and deionized water were added, and an aqueous intermediate coating composition α having a pH of 8.0, a solid content of the coating composition being 48% and a viscosity of 30 seconds measured by Ford Cup No. 4 at 20° C., was obtained.

Examples 38 to 43, 46 to 59, and Comparative Example 14

Test coated plates were prepared in the same manner as in Example 37 except that the coating composition (X1) was changed to coating compositions shown in Tables 10 to 12, and 14, and the test coated plates were subjected to the follow ing evaluation tests. The results are shown in Tables 10 to 12, and 14.

Example 44

The coating composition (X30) obtained in Production Example 34 was electrostatic-applied to the test object (2) drained in Example 37 by using a rotary atomizing electrostatic coating machine, so as to have a thickness of 10 µm, thereby forming a first base coating film.

After allowing it to stand for one minute, the coating composition (X8) prepared by the blending formulation in Table 4 was electrostatic-applied to the first base coating film by using a rotary atomizing electrostatic coating machine, so as to have a thickness of 5 µm, thereby forming a second base coating film.

After allowing it to stand for three minutes, preheating was performed at 80° C. for three minutes, and then, an acrylic resin organic solvent-based overcoat clear coating composition (Y1) (trade name "Magicron KINO-1210", manufactured by Kansai Paint Co., Ltd.) was electrostatic-applied to the second base coating film by using a rotary atomizing electrostatic coating machine, so as to have a cured film thickness of 35 µm, thereby forming a clear coating film. After allowing it to stand for seven minutes, heating was performed at 140° C. for 30 minutes, and the above base coating film and the clear coating film were cured simultaneously, thereby preparing a test coated plate.

The obtained test coated plate was used for performing the following evaluation test. The results are shown in Table 11.

Example 45

A test coated plate was prepared in the same manner as in Example 44 except that the coating composition (X8) was changed to a coating composition shown in Table 11, and the test coated plate was subjected to the following evaluation tests. The results are shown in Table 11.

Examples 60 and 61, 65 to 68, and Comparative Example 15

Test coated plates were prepared in the same manner as in Example 37 except that the coating composition (X1) was changed to coating compositions shown in Tables 13 and 14, the clear coating composition (Y1) was changed to the clear coating composition (Y2) obtained in Production Example 37, and the temperature of heating the clear coating film after allowing it to stand for seven minutes was changed to 120° C. The test coated plates were subjected to the following evaluation tests. The results are shown in Tables 13 and 14.

Example 62

A test coated plate was prepared in the same manner as in Example 44 except that the coating composition (X8) was changed to a coating composition (X34) obtained in the following Production Example 47, the clear coating composition (Y1) was changed to the clear coating composition (Y2) obtained in Production Example 37, and the temperature of heating the clear coating film after allowing it to stand for seven minutes was changed to 120° C. The test coated plate was subjected to the following evaluation tests. The results are shown in Table 13.

Production Example 47

A pigment dispersion (P-200) was obtained by uniformly mixing, in a stirring mixing vessel, 25.6 parts of "Alpaste TCP2020" (20.0 parts of solid contents) (trade name, manufactured by Toyo Aluminium K.K., aluminum pigment paste, average particle diameter (d50): 22 µm, average thickness: 0.67 µm, content of aluminum: 78%), 4.0 parts of "TWINCLE PEARL SXB-SO" (trade name, manufactured by Nihon Koken Kogyo Co. Ltd., synthetic mica pigment coated with titanium oxide, average particle diameter (d50): 13 µm, interference color: silver), 40.0 parts of 2-ethyl-1-hexanol, and 12.0 parts of the acrylic resin (A1-1-3) solution (6.0 parts of solid contents) having a hydroxyl group and a phosphate group obtained in Production Example 3.

In a stirring mixing vessel, 100.0 parts of the water-dispersible hydroxyl group-containing acrylic resin (A1-1-1) aqueous dispersion (30.0 parts of solid contents) obtained in Production Example 1, 17.7 parts of the hydroxyl group-containing acrylic resin (A1-1-2) solution (9.7 parts of solid contents) obtained in Production Example 2, 35.7 parts of the hydroxyl group-containing polyester resin (A1-2-1) solution (25.0 parts of solid contents) obtained in Production Example 4, 37.5 parts of melamine resin (30.0 parts of solid contents) (trade name "Cymel 325" manufactured by ALLNEX LTD., solid content: 80%), 81.6 parts of the pigment dispersion (P-29), and 0.3 parts of the pigment dispersion (D1) obtained in Production Example 33 were uniformly mixed, followed by adding polyacrylic acid thickener (trade name "Primer ASE-60" manufactured by Rohm and Haas Company), 2-(dimethylamino)ethanol, and deionized water thereto, thereby obtaining a coating composition (X34) having a pH of 8.0, a solid content of the coating composition being 15%, and a viscosity of 40 seconds measured by Ford Cup No. 4 at 20° C.

Examples 63 and 64

Test coated plates were prepared in the same manner as in Examples 44 and 45 except that the clear coating composition (Y1) was changed to the clear coating composition (Y2) obtained in Production Example 37, and the temperature of heating the clear coating film after allowing it to stand for seven minutes was changed to 120° C., and the test coated plates were subjected to the following evaluation tests. The results are shown in Table 13.

[Evaluation Test]

(Particle Feeling (Visual))

The obtained test coaled plates were visually observed and evaluated based on the following criteria. The evaluation was performed by consultation by five people in total, i.e., two designers and three engineers who have been engaged in color developments for three or more years. A and B represent acceptable levels.

A: The particle feeling was extremely high.
B: The particle feeling was high.
C: The particle feeling was slightly low.
D: The particle feeling was low.

(Particle Feeling (G Value))

Regarding the obtained test coated plates, the graininess value (G value) was measured using "BYK-mac" (trade name, manufactured by BYK Gardner). The larger the graininess value (G value) is, the higher the particle feeling is. For example, in the case where a coating film having a high particle feeling is intended to be obtained, the graininess value (G value) is preferably 5.0 or more.

(Metallic Unevenness)

The obtained test coated plates were visually observed and evaluated based on the following criteria. The evaluation was performed by consultation by five people in total, i.e., two designers and three engineers who have been engaged in color development for three or more years. A and B represent acceptable levels.

A: The metallic unevenness was hardly recognized, and the test coated plates had an extremely excellent appearance of a coating film.
B: Slight metallic unevenness was observed, and the test coated plates had an excellent appearance of a coating film.
C: The metallic unevenness was observed, and an appearance of a coating film was slightly poor.
D: A large number of metallic unevenness was observed, and an appearance of a coating film was poor.

(FF Value)

The FF values of coating films on the test coated plates were calculated by the following formula using measured $L^*$ value at a light receiving angle of 15° ($L^*15$ value) and $L^*$ value at a light receiving angle of 75° ($L^*75$ value) for the obtained test coated plates, the $L^*$ values being measured by using a multi-angle spectrophotometer (trade name "MA-6811", manufactured by X-Rite), and evaluation was made based on the following criteria. A, B and C represent acceptable levels.

FF value=$L^*15$ value/$L^*75$ value

A: The FF value was 4.0 or more.
B: The FF value was 2.5 or more and less than 4.0.
C: The FF value was 2.0 or more and less than 2.5.
D: The FF value was 1.5 or more and less than 2.0.
E: The FF value was less than 1.5.

(Distinctness of Image)

Regarding the obtained test coated plates, the Short Wave (SW) value was measured by using "Wave Scan" (trade name, manufactured by BYK Gardner), and evaluation was made based on the following criteria. The smaller the SW value is, the higher the distinctness of image of a coating surface is. A, B and C represent acceptable levels.

A: The SW value was less than 5.0.
B: The SW value was 5.0 or more and less than 7.0.
C: The SW value was 7.0 or more and less than 9.0.
D: The SW value was 9.0 or more and less than 10.0.
E: The SW value was 10.0 or more.

TABLE 4

Unit of blending amount: part(s) by mass

| | | | | | Examples | | | | | | | | | |
|---|---|---|---|---|---|---|---|---|---|---|---|---|---|---|
| | | | | 1 | 2 | 3 | 4 | 5 | 6 | 7 | 8 | 9 | 10 |
| Base coating composition | | | | X1 | X2 | X3 | X4 | X5 | X6 | X7 | X8 | X9 | X10 |
| Binder component (A) | Hydroxyl group-containing resin (A1) | Hydroxyl group-containing acrylic resin (A1-1) | (A1-1-1) aqueous dispersion | | | | | | 100.0 | | | | |
| | | | (A1-1-2) solution | 17.7 | 17.7 | 17.7 | 17.7 | 18.2 | 20.0 | 14.1 | 9.1 | 5.4 | 17.7 |
| | | | (A1-1-4) solution | — | — | — | — | — | — | — | — | — | — |
| | | Hydroxyl-containing polyester resin (A1-2) | (A1-2-1) solution | 35.7 | 35.7 | 35.7 | 35.7 | 35.7 | 35.7 | 35.7 | 35.7 | 35.7 | 35.7 |
| | Curing agent (A3) Melamine resin "Cymel 325" | | | | | | | | 37.5 | | | | |
| | Blending amount of total solid content of binder component (A) | | | | | | | | 100.0 | | | | |
| Flake-like aluminum pigment (B) and flake-like pigment (C) | Pigment dispersion containing flake-like aluminum pigment (B) and flake-like pigment (C) | | Kind | P-1 | P-2 | P-3 | P-4 | P-5 | P-6 | P-7 | P-8 | P-9 | P-10 |
| | | | Blending amount | 75.7 | 71.3 | 72.2 | 71.6 | 70.0 | 62.4 | 85.6 | 108.9 | 125.7 | 71.6 |
| | Flake-like aluminum pigment (B) | Blending amount of solid content | | 17.0 | 17.0 | 17.0 | 17.0 | 16.0 | 12.0 | 25.0 | 35.0 | 45.0 | 17.0 |
| | | Average particle diameter (d50) [μm] | | 25 | 22 | 18 | 21 | 20 | 22 | 22 | 22 | 22 | 21 |
| | Flake-like pigment (C) | Blending amount of solid content | | 4.0 | 4.0 | 4.0 | 4.0 | 4.0 | 4.0 | 4.0 | 4.0 | 4.0 | 4.0 |
| | | Average particle diameter (d50) [μm] | | 13 | 13 | 13 | 13 | 13 | 13 | 13 | 13 | 13 | 22 |
| | Content ratio ((B)/(C)) of flake-like aluminum pigment (B) to flake-like pigment (C) [mass ratio] | | | 4.3 | 4.3 | 4.3 | 4.3 | 4.0 | 3.0 | 6.3 | 8.8 | 11.3 | 4.3 |
| Component (D) | Coloring pigment (pigment dispersion) | | (D1) | 0.3 | 0.3 | 0.3 | 0.3 | 0.3 | 0.3 | 0.3 | 0.3 | 0.3 | 0.3 |
| | | | (D2) | — | — | — | — | — | — | — | — | — | — |
| | | | (D3) | — | — | — | — | — | — | — | — | — | — |
| | | | (D4) | — | — | — | — | — | — | — | — | — | — |
| Solid content of coating composition [%] | | | | 25 | 25 | 25 | 25 | 25 | 25 | 25 | 15 | 15 | 25 |
| First base coating composition | Kind | | | X1 | X2 | X3 | X4 | X5 | X6 | X7 | X30 | X30 | X10 |
| | Thickness (μm) | | | 7.5 | 7.5 | 7.5 | 7.5 | 7.5 | 7.5 | 7.5 | 10.0 | 10.0 | 7.5 |
| Second base coating composition | Kind | | | X1 | X2 | X3 | X4 | X5 | X6 | X7 | X8 | X9 | X10 |
| | Thickness (μm) | | | 7.5 | 7.5 | 7.5 | 7.5 | 7.5 | 7.5 | 7.5 | 5.0 | 5.0 | 7.5 |
| Clear coating composition | | | | Y1 | Y1 | Y1 | Y1 | Y1 | Y1 | Y1 | Y1 | Y1 | Y1 |
| Evaluation | Particle feeling | | Visual | A | A | A | A | A | A | A | A | A | A |
| | | | G value | 9.3 | 8.4 | 8.0 | 8.3 | 8.1 | 8.2 | 8.5 | 8.8 | 9.0 | 9.0 |
| | Metallic unevenness | | | B | B | A | A | A | B | B | B | B | A |
| | Flip-flop property | | | A | A | A | A | A | A | A | A | A | A |
| | Distinctness of image | | | C | C | B | B | B | B | C | C | C | B |

TABLE 5

Unit of blending amount: part(s) by mass

| | | | | Examples | | | | | | | | | |
|---|---|---|---|---|---|---|---|---|---|---|---|---|---|
| | | | | 11 | 12 | 13 | 14 | 15 | 16 | 17 | 18 | 19 | 20 |
| Base coating composition | | | | X11 | X12 | X13 | X14 | X15 | X16 | X17 | X18 | X19 | X20 |
| Binder component (A) | Hydroxyl group-containing resin (A1) | Hydroxyl group-containing acrylic resin (A1-1) | (A1-1-1) aqueous dispersion | | | | | | 100.0 | | | | |
| | | | (A1-1-2) solution | 17.7 | 17.7 | 17.7 | 17.7 | 19.2 | 19.0 | 18.6 | 16.8 | 15.9 | 17.7 |
| | | | (A1-1-4) solution | — | — | — | — | — | — | — | — | — | — |

TABLE 5-continued

Unit of blending amount: part(s) by mass

| | | | | Examples | | | | | | | | | |
|---|---|---|---|---|---|---|---|---|---|---|---|---|---|
| | | | | 11 | 12 | 13 | 14 | 15 | 16 | 17 | 18 | 19 | 20 |
| Base coating composition | | | | X11 | X12 | X13 | X14 | X15 | X16 | X17 | X18 | X19 | X20 |
| | | Hydroxyl-containing polyester resin (A1-2) | (A1-2-1) solution | 35.7 | 35.7 | 35.7 | 35.7 | 35.7 | 35.7 | 35.7 | 35.7 | 35.7 | 35.7 |
| | Curing agent (A3) | Melamine resin "Cymel 325" | | | | | | 37.5 | | | | | |
| | Blending amount of total solid content of binder component (A) | | | | | | | 100.0 | | | | | |
| Flake-like aluminum pigment (B) and flake-like pigment (C) | Pigment dispersion containing flake-like aluminum pigment (B) and flake-like pigment (C) | Kind | | P-11 | P-12 | P-13 | P-14 | P-15 | P-16 | P-17 | P-18 | P-19 | P-4 |
| | | Blending amount | | 71.6 | 71.6 | 71.6 | 71.6 | 66.8 | 67.4 | 68.6 | 74.6 | 77.6 | 71.6 |
| | Flake-like aluminum pigment (B) | Blending amount of solid content | | 17.0 | 17.0 | 17.0 | 17.0 | 17.0 | 17.0 | 17.0 | 17.0 | 17.0 | 17.0 |
| | | Average particle diameter (d50) [μm] | | 21 | 21 | 21 | 21 | 21 | 21 | 21 | 21 | 21 | 21 |
| | Flake-like pigment (C) | Blending amount of solid content | | 4.0 | 4.0 | 4.0 | 4.0 | 0.8 | 1.2 | 2.0 | 6.0 | 8.0 | 4.0 |
| | | Average particle diameter (d50) [μm] | | 9 | 18 | 19 | 21 | 13 | 13 | 13 | 13 | 13 | 13 |
| | Content ratio ((B)/(C)) of flake-like aluminum pigment (B) to flake-like pigment (C) [mass ratio] | | | 4.3 | 4.3 | 4.3 | 4.3 | 21.3 | 14.2 | 8.5 | 2.8 | 2.1 | 4.3 |
| Component (D) | Coloring pigment (pigment dispersion) | (D1) | | 0.3 | 0.3 | 0.3 | 0.3 | 0.3 | 0.3 | 0.3 | 0.3 | 0.3 | — |
| | | (D2) | | — | — | — | — | — | — | — | — | — | — |
| | | (D3) | | — | — | — | — | — | — | — | — | — | — |
| | | (D4) | | — | — | — | — | — | — | — | — | — | — |
| Solid content of coating composition [%] | | | | 25 | 25 | 25 | 25 | 25 | 25 | 25 | 25 | 25 | 25 |
| First base coating composition | Kind | | | X11 | X12 | X13 | X14 | X15 | X16 | X17 | X18 | X19 | X20 |
| | Thickness (μm) | | | 7.5 | 7.5 | 7.5 | 7.5 | 7.5 | 7.5 | 7.5 | 7.5 | 7.5 | 7.5 |
| Second base coating composition | Kind | | | X11 | X12 | X13 | X14 | X15 | X16 | X17 | X18 | X19 | X20 |
| | Thickness (μm) | | | 7.5 | 7.5 | 7.5 | 7.5 | 7.5 | 7.5 | 7.5 | 7.5 | 7.5 | 7.5 |
| Clear coating composition | | | | Y1 | Y1 | Y1 | Y1 | Y1 | Y1 | Y1 | Y1 | Y1 | Y1 |
| Evaluation | Particle feeling | | Visual | A | A | A | A | A | A | A | A | A | A |
| | | | G value | 7.0 | 8.4 | 8.5 | 8.0 | 6.8 | 7.0 | 8.3 | 8.0 | 7.9 | 8.5 |
| | Metallic unevenness | | | A | A | A | B | B | B | B | A | A | B |
| | Flip-flop property | | | A | A | A | A | A | A | A | B | B | A |
| | Distinctness of image | | | B | B | B | C | B | B | B | C | C | B |

TABLE 6

Unit of blending amount: part(s) by mass

| | | | | Comparative Examples | | | | | | | | |
|---|---|---|---|---|---|---|---|---|---|---|---|---|
| | | | | 1 | 2 | 3 | 4 | 5 | 6 | 7 | 8 | 9 |
| Base coating composition | | | | X21 | X22 | X23 | X24 | X25 | X26 | X27 | X28 | X29 |
| Binder component (A) | Hydroxyl group-containing resin (A1) | Hydroxyl group-containing acrylic resin (A1-1) | (A1-1-1) aqueous dispersion | | | | | 100.0 | | | | |
| | | | (A1-1-2) solution | 17.7 | 17.7 | 21.8 | 7.2 | 19.5 | 17.7 | 17.7 | 19.4 | 14.1 |
| | | | (A1-1-4) solution | — | — | — | — | — | — | — | — | — |
| | | Hydroxyl-containing polyester resin (A1-2) | (A1-2-1) solution | 35.7 | 35.7 | 35.7 | 31.4 | 35.7 | 35.7 | 35.7 | 35.7 | 35.7 |
| | Curing agent (A3) | Melamine resin "Cymel 325" | | | | | | 37.5 | | | | |
| | Blending amount of total solid content of binder component (A) | | | | | | | 100.0 | | | | |
| Flake-like aluminum pigment (B) and flake-like pigment (C) | Pigment dispersion containing flake-like aluminum pigment (B) and flake-like pigment (C) | Kind | | P-20 | P-21 | P-22 | P-23 | P-24 | P-25 | P-26 | P-27 | P-28 |
| | | Blending amount | | 74.9 | 75.7 | 55.3 | 142.5 | 65.6 | 71.6 | 71.6 | 66.0 | 83.6 |
| | Flake-like aluminum pigment (B) | Blending amount of solid content | | 0.0 | 0.0 | 8.0 | 55.0 | 17.0 | 17.0 | 17.0 | 17.0 | 17.0 |
| | | Average particle diameter (d50) [μm] | | — | — | 22 | 22 | 21 | 21 | 21 | 21 | 21 |
| | Flake-like pigment (C) | Blending amount of solid content | | 4.0 | 4.0 | 4.0 | 4.0 | 0.0 | 0.0 | 0.0 | 0.3 | 12.0 |
| | | Average particle diameter (d50) [μm] | | 13 | 13 | 13 | 13 | — | — | — | 13 | 13 |
| | Content ratio ((B)/(C)) of flake-like aluminum pigment (B) to flake-like pigment (C) [mass ratio] | | | 0.0 | 0.0 | 2.0 | 13.8 | — | — | — | 56.7 | 1.4 |

TABLE 6-continued

Unit of blending amount: part(s) by mass

| | | | | Comparative Examples | | | | | | | | |
|---|---|---|---|---|---|---|---|---|---|---|---|---|
| | | | | 1 | 2 | 3 | 4 | 5 | 6 | 7 | 8 | 9 |
| Base coating composition | | | | X21 | X22 | X23 | X24 | X25 | X26 | X27 | X28 | X29 |
| Component (D) | Coloring pigment | | (D1) | 0.3 | 0.3 | 0.3 | 0.3 | 0.3 | 0.3 | 0.3 | 0.3 | 0.3 |
| | (pigment dispersion) | | (D2) | — | — | — | — | — | — | — | — | — |
| | | | (D3) | — | — | — | — | — | — | — | — | — |
| | | | (D4) | — | — | — | — | — | — | — | — | — |
| Solid content of coating composition [%] | | | | 25 | 25 | 25 | 15 | 25 | 25 | 25 | 25 | 25 |
| First base coating composition | Kind | | | X21 | X22 | X23 | X30 | X25 | X26 | X27 | X28 | X29 |
| | Thickness (μm) | | | 7.5 | 7.5 | 7.5 | 10.0 | 7.5 | 7.5 | 7.5 | 7.5 | 7.5 |
| Second base coating composition | Kind | | | X21 | X22 | X23 | X24 | X25 | X26 | X27 | X28 | X29 |
| | Thickness (μm) | | | 7.5 | 7.5 | 7.5 | 5.0 | 7.5 | 7.5 | 7.5 | 7.5 | 7.5 |
| Clear coating composition | | | | Y1 | Y1 | Y1 | Y1 | Y1 | Y1 | Y1 | Y1 | Y1 |
| Evaluation | Particle feeling | | Visual | A | C | B | A | A | A | B | A | A |
| | | | G value | 9.5 | 4.7 | 5.2 | 8.5 | 6.5 | 9.4 | 6.0 | 6.7 | 7.7 |
| | Metallic unevenness | | | D | A | C | C | D | B | C | D | B |
| | Flip-flop property | | | A | B | C | A | A | A | A | A | B |
| | Distinctness of image | | | D | A | A | D | B | D | B | B | D |

TABLE 7

Unit of blending amount: part(s) by mass

| | | | | Examples | | | | | | |
|---|---|---|---|---|---|---|---|---|---|---|
| | | | | 21 | 22 | 23 | 24 | 25 | 26 | 27 |
| Base coating composition | | | | X31 | X32 | X33 | X10 | X31 | X32 | X33 |
| Binder component (A) | Hydroxyl group-containing resin (A1) | Hydroxyl group-containing acrylic resin (A1-1) | (A1-1-1) aqueous dispersion | | | | 100.0 | | | |
| | | | (A1-1-2) solution | 17.7 | 17.7 | 17.7 | 17.7 | 17.7 | 17.7 | 17.7 |
| | | | (A1-1-4) solution | — | — | — | — | — | — | — |
| | | Hydroxyl-containing polyester resin (A1-2) | (A1-2-1) solution | 35.7 | 35.7 | 35.7 | 35.7 | 35.7 | 35.7 | 35.7 |
| | Curing agent (A3) Melamine resin "Cymel 325" | | | | | | 37.5 | | | |
| | Blending amount of total solid content of binder component (A) | | | | | | 100 | | | |
| Flake-like aluminum pigment (B) and flake-like pigment (C) | Pigment dispersion containing flake-like aluminum pigment (B) and flake-like pigment (C) | | Kind | P-1 | P-3 | P-10 | P-10 | P-1 | P-3 | P-10 |
| | | | Blending amount | 75.7 | 72.2 | 71.6 | 71.6 | 75.7 | 72.2 | 71.6 |
| | Flake-like aluminum pigment (B) | Blending amount of solid content | | 17.0 | 17.0 | 17.0 | 17.0 | 17.0 | 17.0 | 17.0 |
| | | Average particle diameter (d50) [μm] | | 25 | 18 | 21 | 21 | 25 | 18 | 21 |
| | Flake-like pigment (C) | Blending amount of solid content | | 4.0 | 4.0 | 4.0 | 4.0 | 4.0 | 4.0 | 4.0 |
| | | Average particle diameter (d50) [μm] | | 13 | 13 | 22 | 22 | 13 | 13 | 22 |
| | Content ratio ((B)/(C)) of flake-like aluminum pigment (B) to flake-like pigment (C) [mass ratio] | | | 4.3 | 4.3 | 4.3 | 4.3 | 4.3 | 4.3 | 4.3 |
| Component (D) | Coloring pigment | | (D1) | 0.3 | 0.3 | 0.3 | 0.3 | 0.3 | 0.3 | 0.3 |
| | (pigment dispersion) | | (D2) | 10.0 | 10.0 | 10.0 | — | 10.0 | 10.0 | 10.0 |
| | | | (D3) | — | — | — | — | — | — | — |
| | | | (D4) | — | — | — | — | — | — | — |
| Solid content of coating composition [%] | | | | 25 | 25 | 25 | 25 | 25 | 25 | 25 |
| First base coating composition | Kind | | | X31 | X32 | X33 | X10 | X31 | X32 | X33 |
| | Thickness (μm) | | | 7.5 | 7.5 | 7.5 | 7.5 | 7.5 | 7.5 | 7.5 |
| Second base coating composition | Kind | | | X31 | X32 | X33 | X10 | X31 | X32 | X33 |
| | Thickness (μm) | | | 7.5 | 7.5 | 7.5 | 7.5 | 7.5 | 7.5 | 7.5 |
| Clear coating composition | | | | Y1 | Y1 | Y1 | Y2 | Y2 | Y2 | Y2 |
| Evaluation | Particle feeling | | Visual | A | A | A | A | A | A | A |
| | | | G value | 9.8 | 8.5 | 9.5 | 9.2 | 9.9 | 8.7 | 9.7 |
| | Metallic unevenness | | | B | B | B | A | B | B | B |
| | Flip-flop property | | | B | B | B | A | B | B | B |
| | Distinctness of image | | | C | C | C | B | C | C | C |

TABLE 8

Unit of blending amount: part(s) by mass

| | | | | Examples | | | | | | | | |
|---|---|---|---|---|---|---|---|---|---|---|---|---|
| | | | | 28 | 29 | 30 | 31 | 32 | 33 | 34 | 35 | 36 |
| Base coating composition | | | | X35 | X36 | X37 | X35 | X36 | X37 | X35 | X36 | X37 |
| Binder component (A) | Hydroxyl group-containing resin (A1) | Hydroxyl group-containing acrylic resin (A1-1) | (A1-1-1) aqueous dispersion | — | — | — | — | — | — | — | — | — |
| | | | (A1-1-2) solution | — | — | — | — | — | — | — | — | — |
| | | | (A1-1-4) solution | 93.3 | 93.3 | 93.3 | 93.3 | 93.3 | 93.3 | 93.3 | 93.3 | 93.3 |
| | | Hydroxyl-containing polyester resin (A1-2) | (A1-2-1) solution | — | — | — | — | — | — | — | — | — |
| | Curing agent (A3) | Melamine resin "Cymel 325" | | | | | | 37.5 | | | | |
| | Blending amount of total solid content of binder component (A) | | | | | | | 100 | | | | |
| Flake-like aluminum pigment (B) and flake-like pigment (C) | Pigment dispersion containing flake-like aluminum pigment (B) and flake-like pigment (C) | Kind | | — | — | — | — | — | — | — | — | — |
| | | Blending amount | | — | — | — | — | — | — | — | — | — |
| | Flake-like aluminum pigment (B) | Blending amount of solid content | | 17.0 | 17.0 | 17.0 | 17.0 | 17.0 | 17.0 | 17.0 | 17.0 | 17.0 |
| | | Average particle diameter (d50) [μm] | | 25 | 18 | 21 | 25 | 18 | 21 | 25 | 18 | 21 |
| | Flake-like pigment (C) | Blending amount of solid content | | 4.0 | 4.0 | 4.0 | 4.0 | 4.0 | 4.0 | 4.0 | 4.0 | 4.0 |
| | | Average particle diameter (d50) [μm] | | 13 | 13 | 22 | 13 | 13 | 22 | 13 | 13 | 22 |
| | Content ratio ((B)/(C)) of flake-like aluminum pigment (B) to flake-like pigment (C) [mass ratio] | | | 4.3 | 4.3 | 4.3 | 4.3 | 4.3 | 4.3 | 4.3 | 4.3 | 4.3 |
| Component (D) | Coloring pigment (pigment dispersion) | | (D1) | — | — | — | — | — | — | — | — | — |
| | | | (D2) | — | — | — | — | — | — | — | — | — |
| | | | (D3) | 0.3 | 0.3 | 0.3 | 0.3 | 0.3 | 0.3 | 0.3 | 0.3 | 0.3 |
| | | | (D4) | 10.0 | 10.0 | 10.0 | 10.0 | 10.0 | 10.0 | 10.0 | 10.0 | 10.0 |
| Solid content of coating composition [%] | | | | 25 | 25 | 25 | 25 | 25 | 25 | 25 | 25 | 25 |
| First base coating composition | Kind | | | X35 | X36 | X37 | X35 | X36 | X37 | X35 | X36 | X37 |
| | Thickness (μm) | | | 7.5 | 7.5 | 7.5 | 7.5 | 7.5 | 7.5 | 7.5 | 7.5 | 7.5 |
| Second base coating composition | Kind | | | X35 | X36 | X37 | X35 | X36 | X37 | X35 | X36 | X37 |
| | Thickness (μm) | | | 7.5 | 7.5 | 7.5 | 7.5 | 7.5 | 7.5 | 7.5 | 7.5 | 7.5 |
| Clear coating composition | | | | Y2 | Y2 | Y2 | Y1 | Y1 | Y1 | Y3 | Y3 | Y3 |
| Evaluation | Particle feeling | | Visual | A | A | A | A | A | A | A | A | A |
| | | | G value | 9.5 | 8.2 | 9.2 | 9.3 | 8.0 | 9.1 | 9.6 | 8.2 | 9.2 |
| | Metallic unevenness | | | B | B | B | B | B | B | B | B | B |
| | Flip-flop property | | | A | A | A | A | A | A | B | B | B |
| | Distinctness of image | | | C | C | C | C | C | C | C | C | C |

TABLE 9

Unit of blending amount: part(s) by mass

| | | | | Comparative Examples | | | |
|---|---|---|---|---|---|---|---|
| | | | | 10 | 11 | 12 | 13 |
| Base coating composition | | | | X25 | X38 | X38 | X38 |
| Binder component (A) | Hydroxyl group-containing resin (A1) | Hydroxyl group-containing acrylic resin (A1-1) | (A1-1-1) aqueous dispersion | 100.0 | — | — | — |
| | | | (A1-1-2) solution | 19.5 | — | — | — |
| | | | (A1-1-4) solution | — | 93.3 | 93.3 | 93.3 |
| | | Hydroxyl-containing polyester resin (A1-2) | (A1-2-1) solution | 35.7 | — | — | — |
| | Curing agent (A3) | Melamine resin "Cymel 325" | | | 37.5 | | |
| | Blending amount of total solid content of binder component (A) | | | | 100 | | |

TABLE 9-continued

Unit of blending amount: part(s) by mass

| | Base coating composition | | | Comparative Examples | | | |
|---|---|---|---|---|---|---|---|
| | | | | 10 X25 | 11 X38 | 12 X38 | 13 X38 |
| Flake-like aluminum pigment (B) and flake-like pigment (C) | Pigment dispersion containing flake-like aluminum pigment (B) and flake-like pigment (C) | Kind | | P-24 | — | — | — |
| | | Blending amount | | 65.6 | — | — | — |
| | Flake-like aluminum pigment (B) | Blending amount of solid content | | 17.0 | 17.0 | 17.0 | 17.0 |
| | | Average particle diameter (d50) [μm] | | 21 | 21 | 21 | 21 |
| | Flake-like pigment (C) | Blending amount of solid content | | — | — | — | — |
| | | Average particle diameter (d50) [μm] | | — | — | — | — |
| | Content ratio ((B)/(C)) of flake-like aluminum pigment (B) to flake-like pigment (C) [mass ratio] | | | — | — | — | — |
| Component (D) | Coloring pigment (pigment dispersion) | (D1) | | 0.3 | — | — | — |
| | | (D2) | | — | — | — | — |
| | | (D3) | | — | 0.3 | 0.3 | 0.3 |
| | | (D4) | | — | 10.0 | 10.0 | 10.0 |
| Solid content of coating composition [%] | | | | 25 | 25 | 25 | 25 |
| First base coating composition | Kind | | | X25 | X38 | X38 | X38 |
| | Thickness (μm) | | | 7.5 | 7.5 | 7.5 | 10 |
| Second base coating composition | Kind | | | X25 | X38 | X38 | X38 |
| | Thickness (μm) | | | 7.5 | 7.5 | 7.5 | 5 |
| Clear coating composition | | | | Y2 | Y2 | Y1 | Y3 |
| Evaluation | Particle feeling | Visual | | A | A | A | A |
| | | G value | | 7.2 | 7.7 | 7.8 | 7.8 |
| | Metallic unevenness | | | D | D | D | D |
| | Flip-flop property | | | A | A | A | B |
| | Distinctness of image | | | B | C | C | C |

TABLE 10

Unit of blending amount: part(s) by mass

| | Base coating composition | | | Examples | | | | | | |
|---|---|---|---|---|---|---|---|---|---|---|
| | | | | 37 X1 | 38 X2 | 39 X3 | 40 X4 | 41 X5 | 42 X6 | 43 X7 |
| Binder component (A) | Hydroxyl group-containing resin (A1) | Hydroxyl group-containing acrylic resin (A1-1) | (A1-1-1) aqueous dispersion | | | | | 100.0 | | |
| | | | (A1-1-2) solution | 17.7 | 17.7 | 17.7 | 17.7 | 18.2 | 20.0 | 14.1 |
| | | | (A1-1-4) solution | — | — | — | — | — | — | — |
| | | Hydroxyl-containing polyester resin (A1-2) | (A1-2-1) solution | 35.7 | 35.7 | 35.7 | 35.7 | 35.7 | 35.7 | 35.7 |
| | Curing agent (A3) Melamine resin "Cymel 325" | | | | | | | 37.5 | | |
| | Blending amount of total solid content of binder component (A) | | | | | | | 100 | | |
| Flake-like aluminum pigment (B) and flake-like pigment (C) | Pigment dispersion containing flake-like aluminum pigment (B) and flake-like pigment (C) | Kind | | P-1 | P-2 | P-3 | P-4 | P-5 | P-6 | P-7 |
| | | Blending amount | | 75.7 | 71.3 | 72.2 | 71.6 | 70.0 | 62.4 | 85.6 |
| | Flake-like aluminum pigment (B) | Blending amount of solid content | | 17.0 | 17.0 | 17.0 | 17.0 | 16.0 | 12.0 | 25.0 |
| | | Average particle diameter (d50) [μm] | | 25 | 22 | 18 | 21 | 19.5 | 22 | 22 |
| | Flake-like pigment (C) | Blending amount of solid content | | 4.0 | 4.0 | 4.0 | 4.0 | 4.0 | 4.0 | 4.0 |
| | | Average particle diameter (d50) [μm] | | 13 | 13 | 13 | 13 | 13 | 13 | 13 |
| | Content ratio ((B)/(C)) of flake-like aluminum pigment (B) to flake-like pigment (C) [mass ratio] | | | 4.3 | 4.3 | 4.3 | 4.3 | 4.0 | 3.0 | 6.3 |
| Component (D) | Coloring pigment (pigment dispersion) | (D1) | | 0.3 | 0.3 | 0.3 | 0.3 | 0.3 | 0.3 | 0.3 |
| | | (D2) | | — | — | — | — | — | — | — |
| | | (D3) | | — | — | — | — | — | — | — |
| | | (D4) | | — | — | — | — | — | — | — |
| Solid content of coating composition [%] | | | | 25 | 25 | 25 | 25 | 25 | 25 | 25 |
| First base coating composition | Kind | | | X1 | X2 | X3 | X4 | X5 | X6 | X7 |
| | Thickness (μm) | | | 7.5 | 7.5 | 7.5 | 7.5 | 7.5 | 7.5 | 7.5 |

TABLE 10-continued

Unit of blending amount: part(s) by mass

|  |  |  | Examples | | | | | | |
| --- | --- | --- | --- | --- | --- | --- | --- | --- | --- |
|  |  |  | 37 | 38 | 39 | 40 | 41 | 42 | 43 |
| Base coating composition | | | X1 | X2 | X3 | X4 | X5 | X6 | X7 |
| Second base coating composition | Kind | | X1 | X2 | X3 | X4 | X5 | X6 | X7 |
| | Thickness (μm) | | 7.5 | 7.5 | 7.5 | 7.5 | 7.5 | 7.5 | 7.5 |
| Clear coating composition | | | Y1 | Y1 | Y1 | Y1 | Y1 | Y1 | Y1 |
| Evaluation | Particle feeling | Visual | A | A | A | A | A | A | A |
| | | G value | 8.9 | 8.0 | 7.6 | 7.9 | 7.7 | 7.8 | 8.1 |
| | Metallic unevenness | | B | B | A | A | A | B | B |
| | Flip-flop property | | A | A | A | A | A | A | A |
| | Distinctness of image | | C | C | B | B | B | B | C |

TABLE 11

Unit of blending amount: part(s) by mass

|  |  |  |  | Examples | | | | | | | |
| --- | --- | --- | --- | --- | --- | --- | --- | --- | --- | --- | --- |
|  |  |  |  | 44 | 45 | 46 | 47 | 48 | 49 | 50 | 51 |
| Base coating composition | | | | X8 | X9 | X10 | X11 | X12 | X13 | X14 | X15 |
| Binder component (A) | Hydroxyl group-containing resin (A1) | Hydroxyl group-containing acrylic resin (A1-1) | (A1-1-1) aqueous dispersion | | | | 100.0 | | | | |
| | | | (A1-1-2) solution | 9.1 | 5.4 | 17.7 | 17.7 | 17.7 | 17.7 | 17.7 | 19.2 |
| | | | (A1-1-4) solution | — | — | — | — | — | — | — | — |
| | | Hydroxyl-containing polyester resin (A1-2) | (A1-2-1) solution | 35.7 | 35.7 | 35.7 | 35.7 | 35.7 | 35.7 | 35.7 | 35.7 |
| | Curing agent (A3) Melamine resin "Cymel 325" | | | | | | 37.5 | | | | |
| | Blending amount of total solid content of binder component (A) | | | | | | 100 | | | | |
| Flake-like aluminum pigment (B) and flake-like pigment (C) | Pigment dispersion containing flake-like aluminum pigment (B) and flake-like pigment (C) | Kind | | P-8 | P-9 | P-10 | P-11 | P-12 | P-13 | P-14 | P-15 |
| | | Blending amount | | 108.9 | 125.7 | 71.6 | 71.6 | 71.6 | 71.6 | 71.6 | 66.8 |
| | Flake-like aluminum pigment (B) | Blending amount of solid content | | 35.0 | 45.0 | 17.0 | 17.0 | 17.0 | 17.0 | 17.0 | 17.0 |
| | | Average particle diameter (d50) [μm] | | 22 | 22 | 21 | 21 | 21 | 21 | 21 | 21 |
| | Flake-like pigment (C) | Blending amount of solid content | | 4.0 | 4.0 | 4.0 | 4.0 | 4.0 | 4.0 | 4.0 | 0.8 |
| | | Average particle diameter (d50) [μm] | | 13 | 13 | 22 | 9 | 18 | 19 | 21 | 13 |
| | Content ratio ((B)/(C)) of flake-like aluminum pigment (B) to flake-like pigment (C) [mass ratio] | | | 8.8 | 11.3 | 4.3 | 4.3 | 4.3 | 4.3 | 4.3 | 21.3 |
| Component (D) | Coloring pigment (pigment dispersion) | (D1) | | 0.3 | 0.3 | 0.3 | 0.3 | 0.3 | 0.3 | 0.3 | 0.3 |
| | | (D2) | | — | — | — | — | — | — | — | — |
| | | (D3) | | — | — | — | — | — | — | — | — |
| | | (D4) | | — | — | — | — | — | — | — | — |
| Solid content of coating composition [%] | | | | 15 | 15 | 25 | 25 | 25 | 25 | 25 | 25 |
| First base coating composition | Kind | | | X30 | X30 | X10 | X11 | X12 | X13 | X14 | X15 |
| | Thickness (μm) | | | 10 | 10 | 7.5 | 7.5 | 7.5 | 7.5 | 7.5 | 7.5 |
| Second base coating composition | Kind | | | X8 | X9 | X10 | X11 | X12 | X13 | X14 | X15 |
| | Thickness (μm) | | | 5 | 5 | 7.5 | 7.5 | 7.5 | 7.5 | 7.5 | 7.5 |
| Clear coating composition | | | | Y1 | Y1 | Y1 | Y1 | Y1 | Y1 | Y1 | Y1 |
| Evaluation | Particle feeling | Visual | | A | A | A | A | A | A | A | A |
| | | G value | | 8.6 | 8.8 | 8.6 | 6.6 | 8.0 | 8.1 | 7.6 | 6.3 |
| | Metallic unevenness | | | B | B | A | A | A | A | B | B |
| | Flip-flop property | | | A | A | A | A | A | A | A | A |
| | Distinctness of image | | | C | C | B | B | B | B | C | B |

TABLE 12

Unit of blending amount: part(s) by mass

| | | | | Examples | | | | | | | |
|---|---|---|---|---|---|---|---|---|---|---|---|
| | | | | 52 X16 | 53 X17 | 54 X18 | 55 X19 | 56 X20 | 57 X21 | 58 X22 | 59 X23 |
| Base coating composition | | | | | | | | | | | |
| Binder component (A) | Hydroxyl group-containing resin (A1) | Hydroxyl group-containing acrylic resin (A1-1) | (A1-1-1) aqueous dispersion | | | | | 100.0 | | | |
| | | | (A1-1-2) solution | 19.0 | 18.6 | 16.8 | 15.9 | 17.7 | 17.7 | 17.7 | 17.7 |
| | | | (A1-1-4) solution | — | — | — | — | — | — | — | — |
| | | Hydroxyl-containing polyester resin (A1-2) | (A1-2-1) solution | 35.7 | 35.7 | 35.7 | 35.7 | 35.7 | 35.7 | 35.7 | 35.7 |
| | Curing agent (A3) | Melamine resin "Cymel 325" | | | | | | 37.5 | | | |
| | Blending amount of total solid content of binder component (A) | | | | | | | 100 | | | |
| Flake-like aluminum pigment (B) and flake-like pigment (C) | Pigment dispersion containing flake-like aluminum pigment (B) and flake-like pigment (C) | Kind | | P-16 | P-17 | P-18 | P-19 | P-4 | P-1 | P-3 | P-10 |
| | | Blending amount | | 67.4 | 68.6 | 74.6 | 77.6 | 71.6 | 75.7 | 72.2 | 71.6 |
| | Flake-like aluminum pigment (B) | Blending amount of solid content | | 17.0 | 17.0 | 17.0 | 17.0 | 17.0 | 17.0 | 17.0 | 17.0 |
| | | Average particle diameter (d50) [µm] | | 21 | 21 | 21 | 21 | 21 | 25 | 18 | 21 |
| | Flake-like pigment (C) | Blending amount of solid content | | 1.2 | 2.0 | 6.0 | 8.0 | 4.0 | 4.0 | 4.0 | 4.0 |
| | | Average particle diameter (d50) [µm] | | 13 | 13 | 13 | 13 | 13 | 13 | 13 | 22 |
| | Content ratio ((B)/(C)) of flake-like aluminum pigment (B) to flake-like pigment (C) [mass ratio] | | | 14.2 | 8.5 | 2.8 | 2.1 | 4.3 | 4.3 | 4.3 | 4.3 |
| Component (D) | Coloring pigment (pigment dispersion) | (D1) | | 0.3 | 0.3 | 0.3 | 0.3 | — | 0.3 | 0.3 | 0.3 |
| | | (D2) | | — | — | — | — | — | 10.0 | 10.0 | 10.0 |
| | | (D3) | | — | — | — | — | — | — | — | — |
| | | (D4) | | — | — | — | — | — | — | — | — |
| Solid content of coating composition [%] | | | | 25 | 25 | 25 | 25 | 25 | 25 | 25 | 25 |
| First base coating composition | Kind | | | X16 | X17 | X18 | X19 | X20 | X21 | X22 | X23 |
| | Thickness (µm) | | | 7.5 | 7.5 | 7.5 | 7.5 | 7.5 | 7.5 | 7.5 | 7.5 |
| Second base coating composition | Kind | | | X16 | X17 | X18 | X19 | X20 | X21 | X22 | X23 |
| | Thickness (µm) | | | 7.5 | 7.5 | 7.5 | 7.5 | 7.5 | 7.5 | 7.5 | 7.5 |
| Clear coating composition | | | | Y1 | Y1 | Y1 | Y1 | Y1 | Y1 | Y1 | Y1 |
| Evaluation | Particle feeling | Visual | | A | A | A | A | A | A | A | A |
| | | G value | | 6.5 | 7.8 | 7.7 | 7.6 | 8.2 | 9.3 | 8.2 | 9.4 |
| | Metallic unevenness | | | B | B | A | A | B | B | B | B |
| | Flip-flop property | | | A | A | A | A | A | A | B | B |
| | Distinctness of image | | | B | B | C | C | B | C | C | C |

TABLE 13

Unit of blending amount: part(s) by mass

| | | | | Examples | | | | | | | | |
|---|---|---|---|---|---|---|---|---|---|---|---|---|
| | | | | 60 X1 | 61 X3 | 62 X34 | 63 X8 | 64 X9 | 65 X10 | 66 X31 | 67 X32 | 68 X33 |
| Base coating composition | | | | | | | | | | | | |
| Binder component (A) | Hydroxyl group-containing resin (A1) | Hydroxyl group-containing acrylic resin (A1-1) | (A1-1-1) aqueous dispersion | | | | | 100.0 | | | | |
| | | | (A1-1-2) solution | 17.7 | 17.7 | 16.3 | 9.1 | 5.4 | 17.7 | 17.7 | 17.7 | 17.7 |
| | | | (A1-1-4) solution | — | — | — | — | — | — | — | — | — |
| | | Hydroxyl-containing polyester resin (A1-2) | (A1-2-1) solution | 35.7 | 35.7 | 35.7 | 35.7 | 35.7 | 35.7 | 35.7 | 35.7 | 35.7 |
| | Curing agent (A3) | Melamine resin "Cymel 325" | | | | | | 37.5 | | | | |
| | Blending amount of total solid content of binder component (A) | | | | | | | 100.0 | | | | |
| Flake-like aluminum pigment (B) and flake-like pigment (C) | Pigment dispersion containing flake-like aluminum pigment (B) and flake-like pigment (C) | Kind | | P-1 | P-3 | P-29 | P-8 | P-9 | P-10 | P-1 | P-3 | P-10 |
| | | Blending amount | | 75.7 | 72.2 | 81.6 | 108.9 | 125.7 | 71.6 | 75.7 | 72.2 | 71.6 |
| | Flake-like aluminum pigment (B) | Blending amount of solid content | | 17.0 | 17.0 | 20.0 | 35.0 | 45.0 | 17.0 | 17.0 | 17.0 | 17.0 |
| | | Average particle diameter (d50) [µm] | | 25 | 18 | 22 | 22 | 22 | 21 | 25 | 18 | 21 |

TABLE 13-continued

Unit of blending amount: part(s) by mass

| | | | Examples | | | | | | | | |
|---|---|---|---|---|---|---|---|---|---|---|---|
| | | | 60 | 61 | 62 | 63 | 64 | 65 | 66 | 67 | 68 |
| Base coating composition | | | X1 | X3 | X34 | X8 | X9 | X10 | X31 | X32 | X33 |
| Flake-like pigment (C) | Blending amount of solid content | | 4.0 | 4.0 | 4.0 | 4.0 | 4.0 | 4.0 | 4.0 | 4.0 | 4.0 |
| | Average particle diameter (d50) [μm] | | 13 | 13 | 13 | 13 | 13 | 22 | 13 | 13 | 22 |
| Content ratio ((B)/(C)) of flake-like aluminum pigment (B) to flake-like pigment (C) [mass ratio] | | | 4.3 | 4.3 | 5.0 | 8.8 | 11.3 | 4.3 | 4.3 | 4.3 | 4.3 |
| Component (D) | Coloring pigment (pigment dispersion) | (D1) | 0.3 | 0.3 | 0.3 | 0.3 | 0.3 | 0.3 | 0.3 | 0.3 | 0.3 |
| | | (D2) | — | — | — | — | — | — | 10.0 | 10.0 | 10.0 |
| | | (D3) | — | — | — | — | — | — | — | — | — |
| | | (D4) | — | — | — | — | — | — | — | — | — |
| Solid content of coating composition [%] | | | 25 | 25 | 15 | 15 | 15 | 25 | 25 | 25 | 25 |
| First base coating composition | Kind | | X1 | X3 | X30 | X30 | X30 | X10 | X31 | X32 | X33 |
| | Thickness (μm) | | 7.5 | 7.5 | 10 | 10 | 10 | 7.5 | 7.5 | 7.5 | 7.5 |
| Second base coating composition | Kind | | X1 | X3 | X34 | X8 | X9 | X10 | X31 | X32 | X33 |
| | Thickness (μm) | | 7.5 | 7.5 | 5 | 5 | 5 | 7.5 | 7.5 | 7.5 | 7.5 |
| Clear coating composition | | | Y2 | Y2 | Y2 | Y2 | Y2 | Y2 | Y2 | Y2 | Y2 |
| Evaluation | Particle feeling | Visual | A | A | A | A | A | A | A | A | A |
| | | G value | 9.9 | 8.6 | 9.0 | 9.2 | 9.4 | 9.6 | 9.9 | 8.6 | 9.6 |
| | Metallic unevenness | | B | B | B | B | B | A | B | B | B |
| | Flip-flop property | | A | B | B | A | A | A | B | B | B |
| | Distinctness of image | | C | C | C | C | C | B | C | C | C |

TABLE 14

Unit of blending amount: part(s) by mass

| | | | Comparative Examples | |
|---|---|---|---|---|
| | | | 14 | 15 |
| Base coating composition | | | X25 | X25 |
| Binder component (A) | Hydroxyl group-containing resin (A1) | Hydroxyl group-containing acrylic resin (A1-1) | (A1-1-1) aqueous dispersion | 100.0 | |
| | | | (A1-1-2) solution | 19.5 | 19.5 |
| | | | (A1-1-4) solution | — | — |
| | | Hydroxyl-containing polyester resin (A1-2) | (A1-2-1) solution | 35.7 | 35.7 |
| | Curing agent (A3) | Melamine resin "Cymel 325" | | 37.5 | |
| | Blending amount of total solid content of binder component (A) | | | 100 | |
| Flake-like aluminum pigment (B) and flake-like pigment (C) | Pigment dispersion containing flake-like aluminum pigment (B) and flake-like pigment (C) | Kind | P-24 | P-24 |
| | | Blending amount | 65.6 | 65.6 |
| | Flake-like aluminum pigment (B) | Blending amount of solid content | 17.0 | 17.0 |
| | | Average particle diameter (d50) [μm] | 21 | 21 |
| | Flake-like pigment (C) | Blending amount of solid content | — | — |
| | | Average particle diameter (d50) [μm] | — | — |
| | Content ratio ((B)/(C)) of flake-like aluminum pigment (B) to flake-like pigment (C) [mass ratio] | | — | — |
| Component (D) | Coloring pigment (pigment dispersion) | (D1) | 0.3 | 0.3 |
| | | (D2) | — | — |
| | | (D3) | — | — |
| | | (D4) | — | — |
| Solid content of coating composition [%] | | | 25 | 25 |
| First base coating composition | Kind | | X25 | X25 |
| | Thickness (μm) | | 7.5 | 7.5 |
| Second base coating composition | Kind | | X25 | X25 |
| | Thickness (μm) | | 7.5 | 7.5 |

TABLE 14-continued

Unit of blending amount: part(s) by mass

| | | | Comparative Examples | |
| --- | --- | --- | --- | --- |
| | | | 14 | 15 |
| Base coating composition | | | X25 | X25 |
| Clear coating composition | | | Y1 | Y2 |
| Evaluation | Particle feeling | Visual | A | A |
| | | G value | 6.3 | 7.0 |
| | Metallic unevenness | | D | D |
| | Flip-flop property | | A | A |
| | Distinctness of image | | B | B |

From the above results, it was found that the coating composition in the present invention can form a coating film having a high particle feeling and preventing occurrence of metallic unevenness.

Although the present invention is described in detail with reference to the specific embodiment, it will be apparent to those skilled in the art that various changes and modifications can be made without departing from the spirit and scope of the present invention. The present application is based on a Japanese Patent Application No. 2017-254157 filed on Dec. 28, 2017, contents of which are incorporated herein by reference.

The invention claimed is:

1. A coating composition comprising:
a binder component (A);
a flake-like aluminum pigment (B) having an average particle diameter (d50) within a range of 18 μm to 25 μm; and
a flake-like pigment (C) being a flake-like pigment other than flake-like aluminum pigments and having an average particle diameter (d50) within a range of 9 μm to 22 μm,
wherein a content of the flake-like aluminum pigment (B) is within a range of 10 parts by mass to 45 parts by mass based on 100 parts by mass of the binder component (A), and a content of the flake-like pigment (C) being a flake-like pigment other than flake-like aluminum pigments is within a range of 0.8 parts by mass to 8 parts by mass based on 100 parts by mass of the binder component (A),
a content ratio (B)/(C) of the flake-like aluminum pigment (B) to the flake-like pigment (C) being a flake-like pigment other than flake-like aluminum pigments is within a range of 2.1/1 to 21.3/1 in terms of a solid content mass ratio,
the binder component (A) comprises a combination of a hydroxyl group-containing resin (A1) and a curing agent (A3),
the flake-like pigment (C) being a flake-like pigment other than flake-like aluminum pigments contains at least one kind selected from the group consisting of mica pigments coated with titanium oxide, mica pigments coated with titanium oxide and iron oxide, aluminum oxide pigments coated with titanium oxide, and aluminum oxide pigments coated with titanium oxide and iron oxide,
the flake-like pigment (C) comprises a flake-like pigment (C1) being a flake-like pigment other than flake-like aluminum pigments and having a silver interference color, and a content of the flake-like pigment (C1) is within a range of 60 mass % to 100 mass % based on the flake-like pigment (C), and
a cured coating film obtained by curing the coating composition has a flip-flop value, at a thickness of 15 μm, within a range of 2.0 to 30.0, the flip-flop value being determined by the following formula:

Flip-flop value=L*15 value/L*75 value wherein L*15 value is a L* value at a light receiving angle of 15°, and L*75 value is a L* value at a light receiving angle of 75°.

2. The coating composition according to claim 1, wherein an average thickness of the flake-like aluminum pigment (B) is within a range of 0.10 μm to 0.80 μm.

3. The coating composition according to claim 1, wherein an average thickness of the flake-like pigment (C) being a flake-like pigment other than flake-like aluminum pigments is within a range of 0.20 μm to 0.60 μm.

4. The coating composition according to claim 1, wherein the cured coating film obtained by curing the coating composition has a graininess value (G value), at a thickness of 15 μm, within a range of 5.0 to 10.0.

5. The coating composition according to claim 1, wherein the content of the flake-like pigment (C1) is within a range of 80 mass % to 100 mass % based on the flake-like pigment (C).

* * * * *